US010852893B2

(12) United States Patent
Jinbo et al.

(10) Patent No.: US 10,852,893 B2
(45) Date of Patent: Dec. 1, 2020

(54) DISPLAY PANEL, INPUT/OUTPUT DEVICE, DATA PROCESSING DEVICE, AND METHOD FOR MANUFACTURING DISPLAY PANEL

(71) Applicant: SEMICONDUCTOR ENERGY LABORATORY CO., LTD., Atsugi (JP)

(72) Inventors: Yasuhiro Jinbo, Kanagawa (JP); Shingo Eguchi, Kanagawa (JP); Hisao Ikeda, Kanagawa (JP); Tetsuji Ishitani, Kanagawa (JP); Taisuke Kamada, Saitama (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 16/517,806

(22) Filed: Jul. 22, 2019

(65) Prior Publication Data
US 2019/0339800 A1    Nov. 7, 2019

Related U.S. Application Data

(62) Division of application No. 15/378,120, filed on Dec. 14, 2016, now Pat. No. 10,429,999.

(30) Foreign Application Priority Data

Dec. 18, 2015   (JP) ................. 2015-247412

(51) Int. Cl.
*H01L 21/00*   (2006.01)
*G06F 3/044*   (2006.01)
*G09G 3/36*    (2006.01)

(52) U.S. Cl.
CPC .......... *G06F 3/044* (2013.01); *G09G 3/3648* (2013.01); *G06F 2203/04102* (2013.01); *G06F 2203/04103* (2013.01); *G09G 2300/0426* (2013.01)

(58) Field of Classification Search
CPC .......... G06F 3/044; G06F 2203/04102; G06F 2203/04103; G09G 3/3648; G09G 2300/0426
See application file for complete search history.

(56) References Cited

U.S. PATENT DOCUMENTS 5,258,325 A * 11/1993 Spitzer .................. A61B 3/113
                                                    438/107
5,528,397 A *  6/1996 Zavracky ............... A61B 3/113
                                                     349/42

(Continued)

FOREIGN PATENT DOCUMENTS

CN    001403856 A    3/2003
CN    001714380 A   12/2005

(Continued)

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.

(Continued)

*Primary Examiner* — Richard A Booth
(74) *Attorney, Agent, or Firm* — Nixon Peabody LLP; Jeffrey L. Costellia

(57) ABSTRACT

To provide a novel display panel that is highly convenient or reliable. To provide a novel input and output device that is highly convenient or reliable. To provide a novel data processing device that is highly convenient or reliable. To provide a method for manufacturing a novel display panel that is highly convenient or reliable. The display panel includes a pixel, a third conductive film electrically connected to the pixel, an insulating film including an opening portion overlapping with the third conductive film, and an electrode including a first region in contact with the third (Continued)

conductive film and a second region functioning as a contact point.

16 Claims, 31 Drawing Sheets

(56) References Cited

U.S. PATENT DOCUMENTS

| | | | |
|---|---|---|---|
| 5,821,597 A | 10/1998 | Nakajima et al. |
| 6,331,722 B1 | 12/2001 | Yamazaki et al. |
| 6,714,268 B2 | 3/2004 | Wang et al. |
| 6,819,045 B2 | 11/2004 | Okita et al. |
| 7,038,641 B2 | 5/2006 | Hirota et al. |
| 7,084,936 B2 | 8/2006 | Kato |
| 7,102,704 B2 | 9/2006 | Mitsui et al. |
| 7,176,991 B2 | 2/2007 | Mitsui et al. |
| 7,239,361 B2 | 7/2007 | Kato |
| 7,248,235 B2 | 7/2007 | Fujii et al. |
| 7,385,654 B2 | 6/2008 | Mitsui et al. |
| 7,485,511 B2 | 2/2009 | Yamada et al. |
| 7,863,188 B2 | 1/2011 | Tsurume et al. |
| 8,138,502 B2 | 3/2012 | Nakamura et al. |
| 8,264,144 B2 | 9/2012 | Oikawa et al. |
| 8,610,155 B2 | 12/2013 | Hatano et al. |
| 8,830,424 B2 | 9/2014 | Hirakata et al. |
| 9,257,449 B2 | 2/2016 | Yamazaki et al. |
| 9,337,244 B2 | 5/2016 | Hatano et al. |
| 9,337,344 B2 | 5/2016 | Hanaoka |
| 9,356,054 B2 | 5/2016 | Miyairi et al. |
| 2002/0146893 A1 | 10/2002 | Shimoda et al. |
| 2003/0052869 A1 | 3/2003 | Fujii et al. |
| 2003/0193457 A1 | 10/2003 | Wang et al. |
| 2003/0201960 A1 | 10/2003 | Fujieda |
| 2006/0072047 A1 | 4/2006 | Sekiguchi |
| 2008/0180618 A1 | 7/2008 | Fujieda |
| 2010/0171905 A1 | 7/2010 | Huang et al. |
| 2011/0267297 A1 | 11/2011 | Yamazaki et al. |
| 2012/0217516 A1 | 8/2012 | Hatano et al. |
| 2013/0300456 A1 | 11/2013 | Lennon |
| 2014/0014960 A1 | 1/2014 | Yamazaki et al. |
| 2014/0325249 A1 | 10/2014 | Toyotaka |
| 2014/0326992 A1 | 11/2014 | Hondo et al. |
| 2015/0154730 A1 | 6/2015 | Hirakata et al. |
| 2015/0187814 A1 | 7/2015 | Miyairi et al. |
| 2015/0214256 A1 | 7/2015 | Miyairi |
| 2015/0270288 A1 | 9/2015 | Yamazaki et al. |
| 2015/0303392 A1 | 10/2015 | Ohsawa et al. |
| 2015/0309637 A1 | 10/2015 | Sakuishi et al. |
| 2015/0348909 A1 | 12/2015 | Yamazaki et al. |
| 2016/0103649 A1 | 4/2016 | Yoshitani et al. |
| 2016/0109998 A1 | 4/2016 | Watanabe |
| 2016/0179259 A1 | 6/2016 | Watanabe et al. |
| 2016/0195983 A1 | 7/2016 | Miyake |
| 2016/0240685 A1 | 8/2016 | Tanaka |
| 2016/0349558 A1* | 12/2016 | Shishido ............. G02F 1/13338 |
| 2017/0025444 A1 | 1/2017 | Hirakata |
| 2017/0063374 A1 | 3/2017 | Yamamoto |
| 2017/0227823 A1 | 8/2017 | Cao et al. |

FOREIGN PATENT DOCUMENTS

| | | |
|---|---|---|
| DE | 102013213552 | 1/2014 |
| JP | 11-212116 A | 8/1999 |
| JP | 2001-066593 A | 3/2001 |
| JP | 2002-040467 A | 2/2002 |
| JP | 2002-082627 A | 3/2002 |
| JP | 2002-196702 A | 7/2002 |
| JP | 2002-328630 A | 11/2002 |
| JP | 2003-076302 A | 3/2003 |
| JP | 2003-086362 A | 3/2003 |
| JP | 2003-157026 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-296162 A | 10/2004 |
| JP | 2007-232882 A | 9/2007 |
| JP | 4161574 | 10/2008 |
| JP | 2010-206040 A | 9/2010 |
| JP | 2011-191750 A | 9/2011 |
| JP | 2012-19079 A | 10/2012 |
| JP | 2013-221965 A | 10/2013 |
| JP | 2014-032960 A | 2/2014 |
| JP | 2014-071734 A | 4/2014 |
| JP | 2015-082178 A | 4/2015 |
| JP | 2015-125563 A | 7/2015 |
| JP | 2016-167045 A | 9/2016 |
| KR | 2003-0022049 A | 3/2003 |
| KR | 2014-0009024 A | 1/2014 |
| KR | 2014-0052969 A | 5/2014 |
| TW | 544944 | 8/2003 |
| TW | 588185 | 5/2004 |
| TW | 201244204 | 11/2012 |
| TW | 201407225 | 2/2014 |
| TW | 201626352 | 7/2016 |
| WO | WO-2004/053819 | 6/2004 |
| WO | WO-2012/115016 | 8/2012 |
| WO | WO-2016/055897 | 4/2016 |

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.
International Search Report (Application No. PCT/IB2016/057396) dated Feb. 21, 2017.
Written Opinion (Application No. PCT/IB2016/057396) dated Feb. 21, 2017.

* cited by examiner

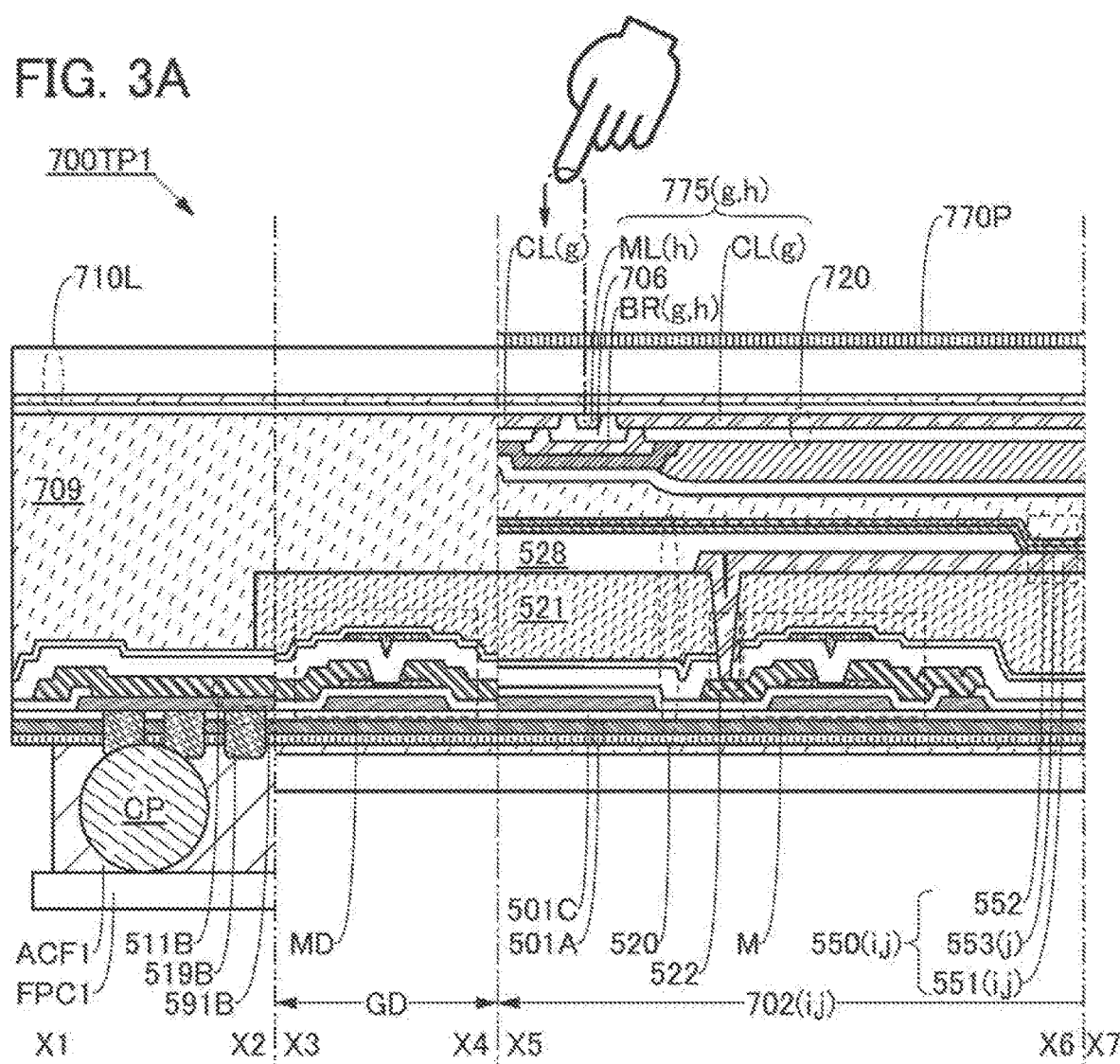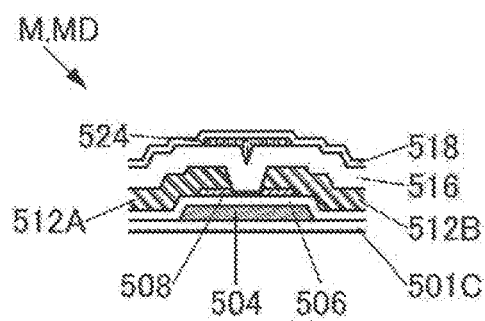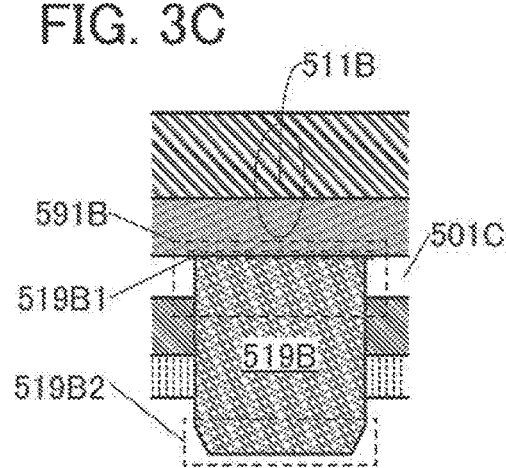

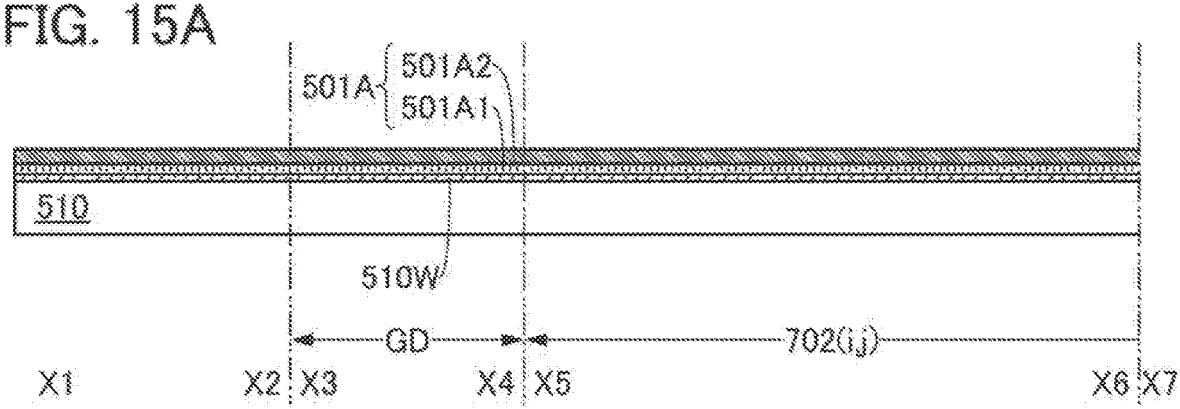
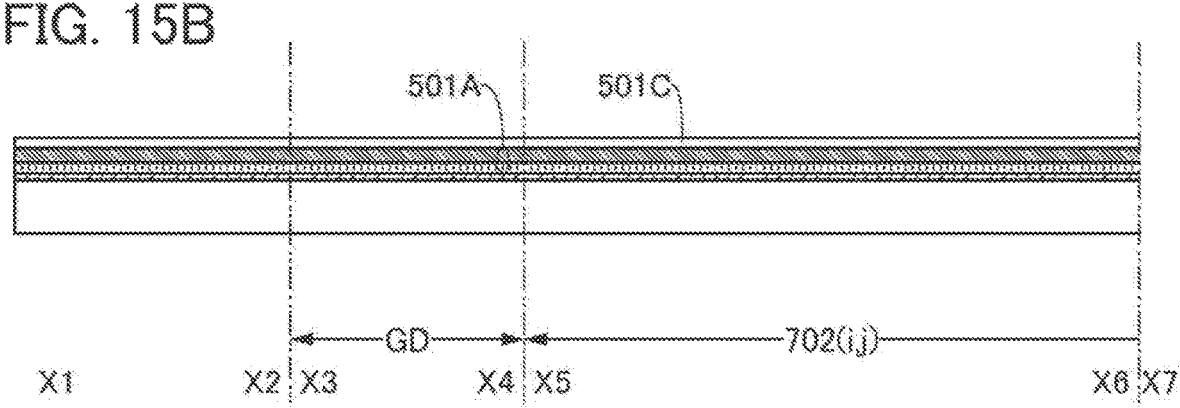
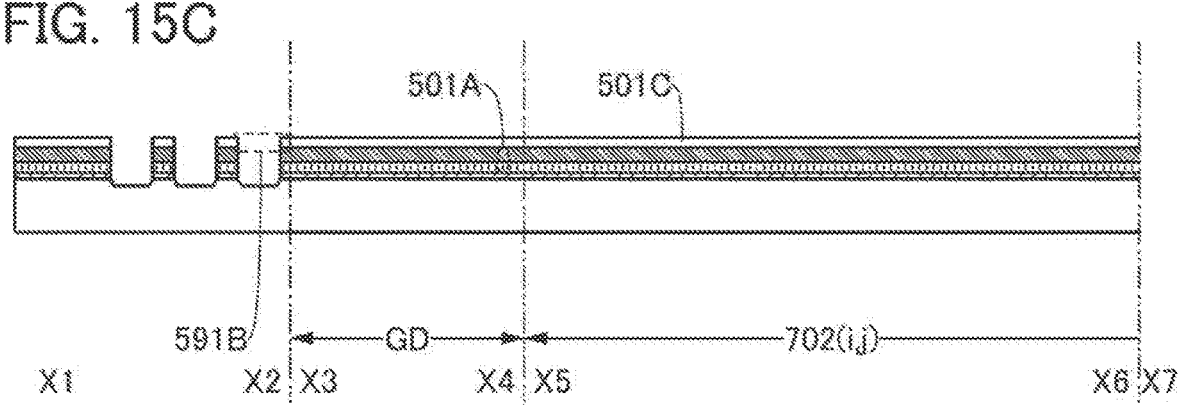

DISPLAY PANEL, INPUT/OUTPUT DEVICE, DATA PROCESSING DEVICE, AND METHOD FOR MANUFACTURING DISPLAY PANEL

TECHNICAL FIELD

One embodiment of the present invention relates to a display panel, an input/output device, a data processing device, a semiconductor device, or a method for manufacturing a display panel.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

For example, portable data processing devices are often used outdoors, and force might be accidentally applied by dropping to the data processing devices and display devices included in them. As an example of a display device that is not easily broken, a display device having high adhesiveness between a structure body by which a light-emitting layer is divided and a second electrode layer is known (Patent Document 1).

As other examples, a liquid crystal display device in which a light-condensing means and a pixel electrode are provided on the same surface side of a substrate and a region transmitting visible light in the pixel electrode is provided to overlap with an optical axis of the light-condensing means, and a liquid crystal display device that includes an anisotropic light-condensing means having a condensing direction X and a non-condensing direction Y that is along a longitudinal direction of a region transmitting visible light in a pixel electrode are known (Patent Document 2).

REFERENCES

Patent Documents

[Patent Document 1] Japanese Published Patent Application No. 2012-190794
[Patent Document 2] Japanese Published Patent Application No. 2011-191750

DISCLOSURE OF INVENTION

An object of one embodiment of the present invention is to provide a novel display panel that is highly convenient or reliable. Another object is to provide a novel input/output device that is highly convenient or reliable. Another object is to provide a novel data processing device that is highly convenient or reliable. Another object is to provide a method for manufacturing a novel display panel that is highly convenient or reliable. Another object is to provide a novel display panel, a novel input/output device, a novel data processing device, a novel semiconductor device, or a method for manufacturing a novel display device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

(1) One embodiment of the present invention is a display panel including a pixel, an insulating film, a third conductive film, and an electrode.

The insulating film includes a region overlapping with the pixel, and the insulating film includes an opening portion.

The third conductive film is electrically connected to the pixel, the third conductive film includes a region overlapping with the insulating film, and the third conductive film includes a region overlapping with the opening portion.

The electrode is electrically connected to the third conductive film, and the electrode includes a first region and a second region.

The first region is in contact with the third conductive film. The second region functions as a contact point.

The opening portion includes a region occupied by the third conductive film or the electrode.

(2) One embodiment of the present invention is the display panel in which the insulating film has a thickness larger than or equal to 0.2 μm and smaller than or equal to 1.5 μm and the insulating film has a water vapor transmission rate lower than or equal to $10^{-3}$ g/(m$^2$·day), preferably lower than or equal to $10^{-4}$ g/(m$^2$·day), more preferably lower than or equal to $10^{-5}$ g/(m$^2$·day).

(3) One embodiment of the present invention is the display panel that includes a first base and a second base.

The first base includes a region overlapping with the insulating film. The second base includes a region that is positioned so that the insulating film is between the first base and the region of the second base.

The display panel of one embodiment of the present invention includes the pixel, the third conductive film electrically connected to the pixel, the insulating film including the opening portion overlapping with the third conductive film, and the electrode including the first region in contact with the third conductive film and the second region functioning as a contact point. Thus, a signal, electric power, or the like can be supplied to the pixel protected by the insulating film. As a result, a novel display panel that is highly convenient or reliable can be provided.

(4) One embodiment of the present invention is the display panel that includes one group of pixels, the other group of pixels, a signal line, and a scan line.

The pixel is included in the one group of pixels. The one group of pixels are arranged in a row direction.

The pixel is included in the other group of pixels. The other group of pixels are arranged in a column direction intersecting with the row direction.

The one group of pixels are electrically connected to the scan line.

The other group of pixels are electrically connected to the signal line.

The scan line or the signal line is electrically connected to the third conductive film.

(5) One embodiment of the present invention is the display panel that includes a driver circuit.

The driver circuit is configured to supply an image signal, and the driver circuit is electrically connected to the second region. The signal line is electrically connected to the third conductive film.

(6) One embodiment of the present invention is the display panel in which the first base and the second base have flexibility. The pixel includes a pixel circuit and a display element.

The pixel circuit is electrically connected to the signal line, and the display element is electrically connected to the pixel circuit.

The display panel of one embodiment of the present invention includes the first base having flexibility, the second base having flexibility, and the display element electrically connected to the pixel circuit overlapping with the insulating film positioned between the first base and the second base. Thus, the display element can be bent between the first base and the second base. As a result, a novel display panel that is highly convenient or reliable can be provided.

(7) One embodiment of the present invention is the display panel in which the pixel includes a pixel circuit, a first conductive film, a first display element, and a second display element.

The pixel circuit is electrically connected to the signal line.

The first conductive film includes a first region overlapping with the second conductive film. The first conductive film includes a second region that is positioned so that the insulating film is between the second region of the first conductive film and the second conductive film. The first conductive film includes a third region that is positioned so that the opening portion is between the third region of the first conductive film and the second conductive film. The first conductive film is electrically connected to the second conductive film in the opening portion.

The first display element is electrically connected to the first conductive film. The second display element is electrically connected to the pixel circuit.

Thus, the first display element and the second display element that displays an image using a method different from that of the first display element can be driven using a pixel circuit that can be formed in one process, for example. Specifically, a reflective display element is used as the first display element, whereby the power consumption can be reduced. In addition, an image with high contrast can be favorably displayed in an environment with bright external light. In addition, the second display element which emits light is used, whereby an image can be favorably displayed in a dark environment. Furthermore, using the insulating film, impurity diffusion between the first display element and the second display element or between the first display element and the pixel circuit can be suppressed. As a result, a novel display device that is highly convenient or reliable can be provided.

(8) One embodiment of the present invention is the display panel in which the second display element is positioned so that display using the second display element can be seen from part of a region where display using the first display element can be seen.

Accordingly, display using the second display element can be seen from part of the region where display using the first display element can be seen. Alternatively, a user can see the display without changing the attitude or the like of the display panel. Thus, a novel display panel that is highly convenient or reliable can be provided.

(9) One embodiment of the present invention is an input/output device that includes the display panel and an input portion.

The input portion includes a region overlapping with the display panel, and the input portion includes a control line, a sensing signal line, and a sensing element.

The sensing element is electrically connected to the control line and the sensing signal line.

The control line is configured to supply a control signal.

The sensing element receives the control signal and has a function of supplying the control signal and a sensor signal which changes in accordance with a distance between the sensing element and an object approaching the region overlapping with the display panel.

The sensing signal line is configured to be supplied with the sensing signal.

The sensing element has a light-transmitting property, and the sensing element includes a first electrode and a second electrode.

The first electrode is electrically connected to the control line, the second electrode is electrically connected to the sensing signal line, and the second electrode is positioned so that an electric field which is partly blocked by the object that approaches the region overlapping with the display panel is generated between the second electrode and the first electrode.

Thus, the object that approaches the region overlapping with the display panel can be sensed while image data is displayed by the display panel. As a result, a novel input/output device that is highly convenient or reliable can be provided.

(10) One embodiment of the present invention is a data processing device that includes at least one of a keyboard, a hardware button, a pointing device, a touch sensor, an illuminance sensor, an imaging device, an audio input device, a gaze input device, and a pose detection device, and the input/output device.

Thus, an arithmetic device can generate image data or control data on the basis of positional data supplied using the input/output device. As a result, a novel data processing device that is highly convenient or reliable can be provided.

(11) One embodiment of the present invention is a method for manufacturing the display panel that includes first to eleventh steps.

In the first step, a separation film is formed over a substrate for use in a manufacturing process (hereinafter referred to as process substrate).

In the second step, a first insulating film including a region overlapping with the separation film is formed.

In the third step, the first insulating film is heated.

In the fourth step, the second insulating film including a region overlapping with the first insulating film is formed.

In the fifth step, the opening portion is formed in the second insulating film and an opening portion overlapping with the opening portion is formed in the first insulating film and the separation film.

In the sixth step, the electrode in contact with the process substrate is formed in the opening portion.

In the seventh step, the conductive film in contact with the electrode and the pixel circuit electrically connected to the conductive film are formed.

In the eighth step, the display element electrically connected to the pixel circuit is formed.

In the ninth step, the second base is stacked to overlap with the second insulating film.

In the tenth step, separation from the process substrate is performed.

In the eleventh step, the first base is stacked.

The method for manufacturing the display panel of one embodiment of the present invention includes the following steps: forming a separation film over a process substrate; forming an opening portion in a second insulating film and an opening portion overlapping with the opening portion in the separation film; forming an electrode in contact with the process substrate in the opening portion; forming a conductive film in contact with the electrode, a pixel circuit electrically connected to the conductive film, and a display element electrically connected to the pixel circuit; and performing separation from the process substrate. Thus, the electrode can have one end in contact with the conductive film and the other end exposed at the opening portion. As a result, a method for manufacturing a novel display panel that is highly convenient or reliable can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of a transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, connection means not only direct connection but also indirect connection through a circuit element such as a wiring, a resistor, a diode, or a transistor so that current, a potential, or voltage can be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

Further, in this specification, one of a first electrode and a second electrode of a transistor refers to a source electrode and the other refers to a drain electrode.

According to one embodiment of the present invention, a novel display panel that is highly convenient or reliable can be provided. According to another embodiment of the present invention, a novel input/output device that is highly convenient or reliable can be provided. According to another embodiment of the present invention, a novel data processing device that is highly convenient or reliable can be provided. According to another embodiment of the present invention, a method for manufacturing a novel display panel that is highly convenient or reliable can be provided. According to another embodiment of the present invention, a novel display panel, a novel input/output device, a novel data processing device, a novel semiconductor device, or a method for manufacturing a novel display panel can be provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

FIGS. 3A to 3C are cross-sectional views illustrating a structure of an input/output device of one embodiment.

FIGS. 7A, 7B-1, and 7B-2 are top views illustrating a structure of an input/output device of one embodiment.

FIGS. 15A to 15C are cross-sectional views illustrating a method for manufacturing an input/output device of one embodiment.

BEST MODE FOR CARRYING OUT THE INVENTION

Figure 1A:
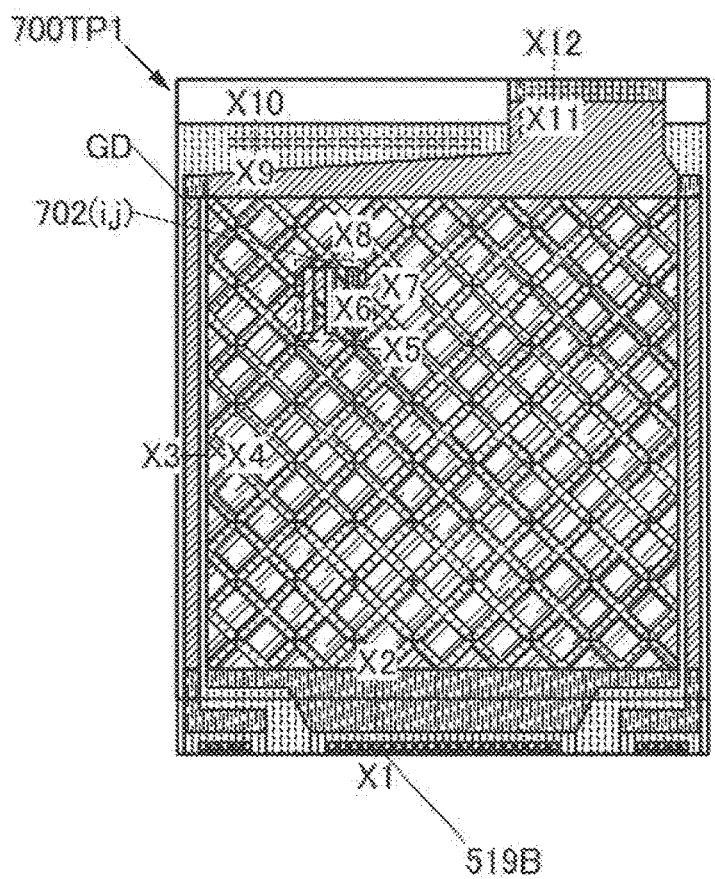
FIGS. 1A, 1B-1, 1B-2, and 1C illustrate a structure of an input/output device of one embodiment.

A display panel of one embodiment of the present invention includes a pixel, a third conductive film electrically connected to the pixel, an insulating film including an opening portion overlapping with the third conductive film, and an electrode including a first region in contact with the third conductive film and a second region functioning as a contact point.

Thus, a signal, electric power, or the like can be supplied to the pixel protected by the insulating film. As a result, a novel display panel that is highly convenient or reliable can be provided.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments. Note that in structures of the present invention described below, the same portions or portions having similar functions are denoted by the same reference numerals in different drawings, and a description thereof is not repeated.

Embodiment 1

In this embodiment, a structure of an input/output device of one embodiment of the present invention will be described with reference to FIGS. 1A, 1B-1, 1B-2, and 1C, FIGS. 2A and 2B, FIGS. 3A to 3C, FIG. 4, FIG. 5, and FIGS. 6A and 6B.

Figures 1, 1B:
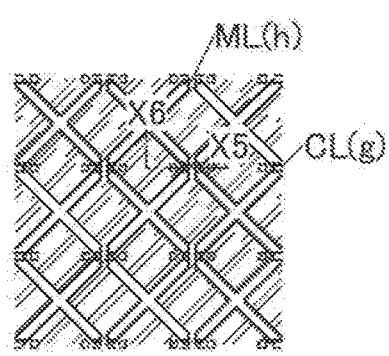
Figures 1, 1B, 2:
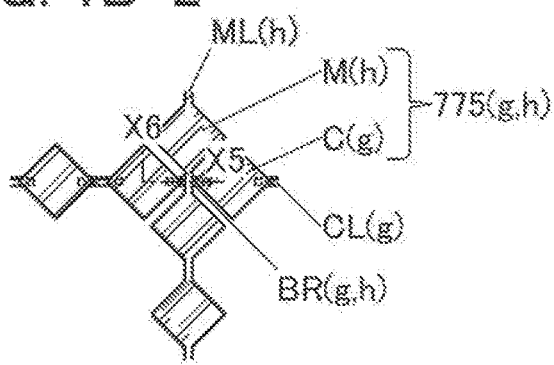
Figure 1C:
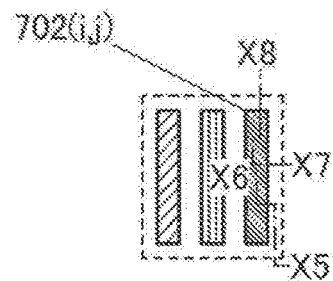

FIGS. 1A, 1B-1, 1B-2, and 1C illustrate a structure of an input/output device of one embodiment of the present invention. FIG. 1A is a top view of the input/output device of one embodiment of the present invention. FIG. 1B-1 is a schematic view illustrating a part of an input portion of the input/output device of one embodiment of the present invention. FIG. 1B-2 is a schematic view illustrating a part of FIG. 1B-1. FIG. 1C is a schematic view illustrating a part of a display panel of the input/output device of one embodiment of the present invention.

Figure 2A:
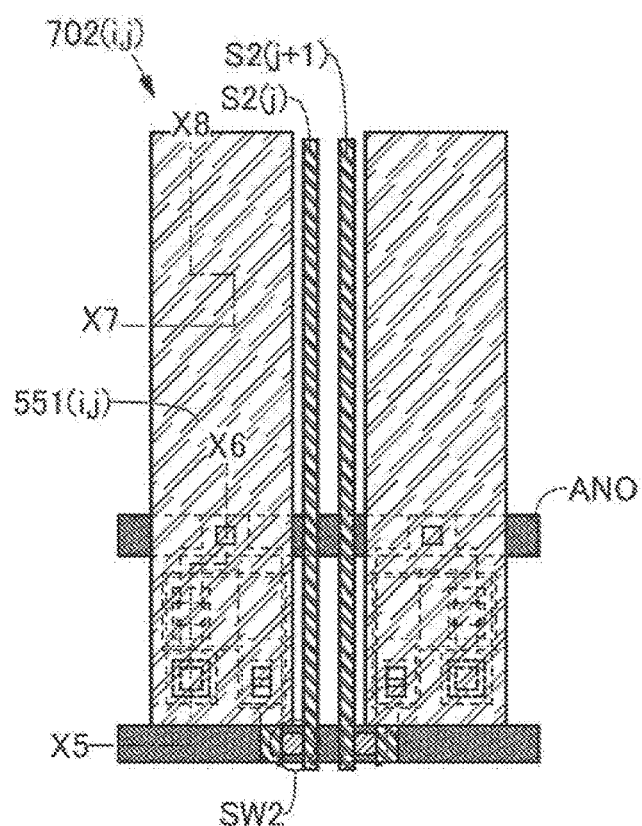
FIGS. 2A and 2B illustrate a pixel structure of an input/output device of one embodiment.
Figure 2B:
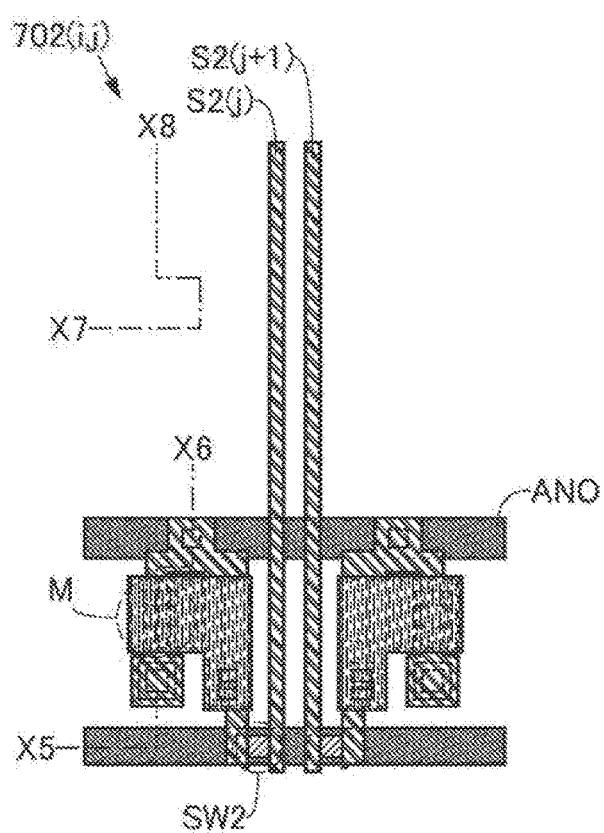

FIGS. 2A and 2B illustrate a pixel structure of the input/output device of one embodiment of the present invention. FIG. 2A is a top view of pixels of the input/output device of one embodiment of the present invention, and FIG. 2B illustrates a part of FIG. 2A.

FIGS. 3A to 3C and FIG. 4 are cross-sectional views illustrating a structure of the input/output device of one embodiment of the present invention. FIG. 3A is a cross-sectional view taken along the cutting plane lines X1-X2, X3-X4, and X5-X6 in FIG. 1A. FIG. 3B illustrates a part of FIG. 3A. FIG. 3C is a schematic view illustrating a part of FIG. 3A.

Figure 4:
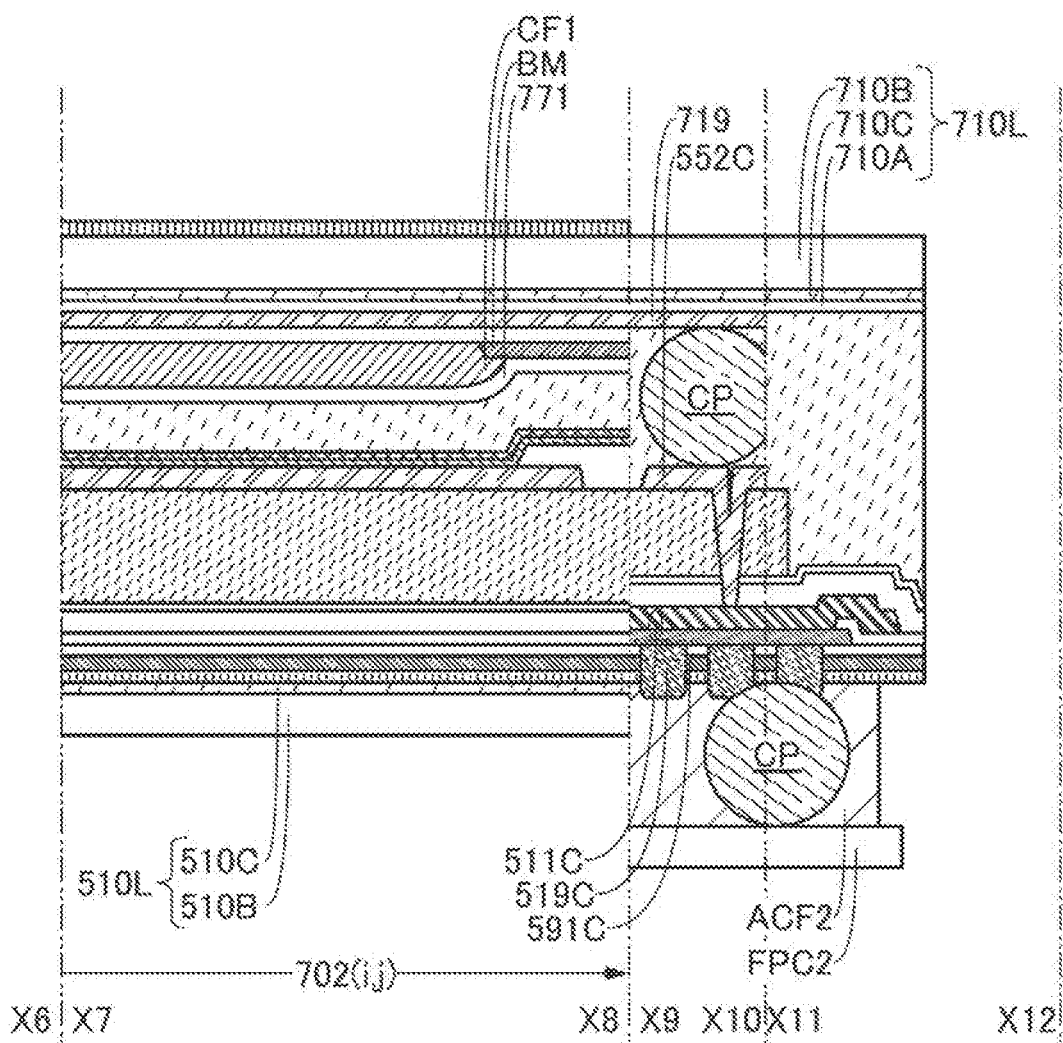
FIG. 4 is a cross-sectional view illustrating a structure of an input/output device of one embodiment.

FIG. 4 is a cross-sectional view taken along the cutting plane lines X7-X8, X9-X10, and X11-X12 in FIG. 1A.

Figure 5:
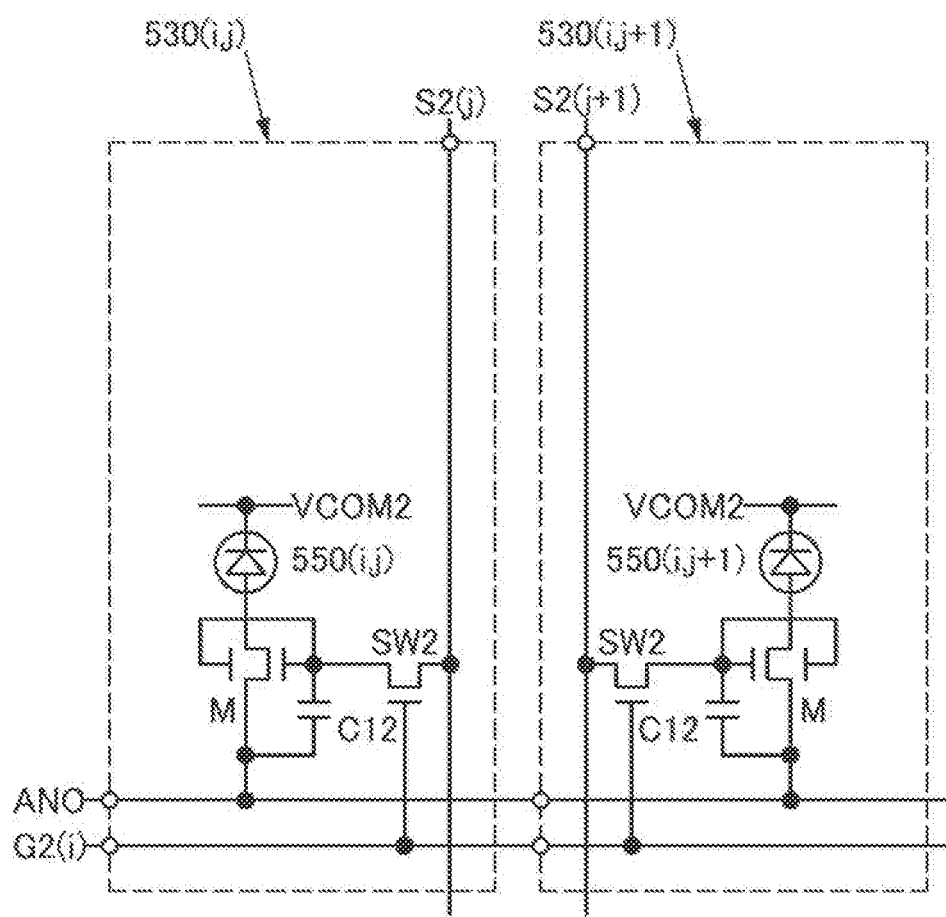
FIG. 5 is a circuit diagram illustrating a structure of a pixel circuit of an input/output device of one embodiment.

FIG. 5 is a circuit diagram illustrating a structure of pixel circuits of the input/output device of one embodiment of the present invention.

Figure 6A:
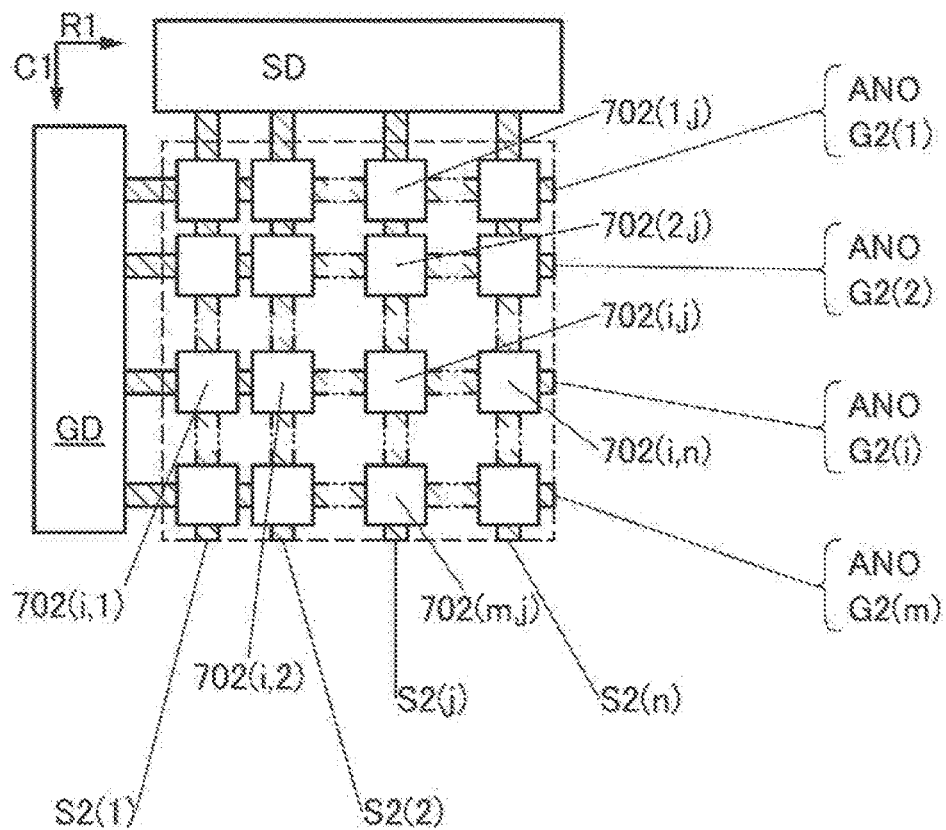
FIGS. 6A and 6B are block diagrams illustrating a structure of an input/output device of one embodiment.
Figure 6B:
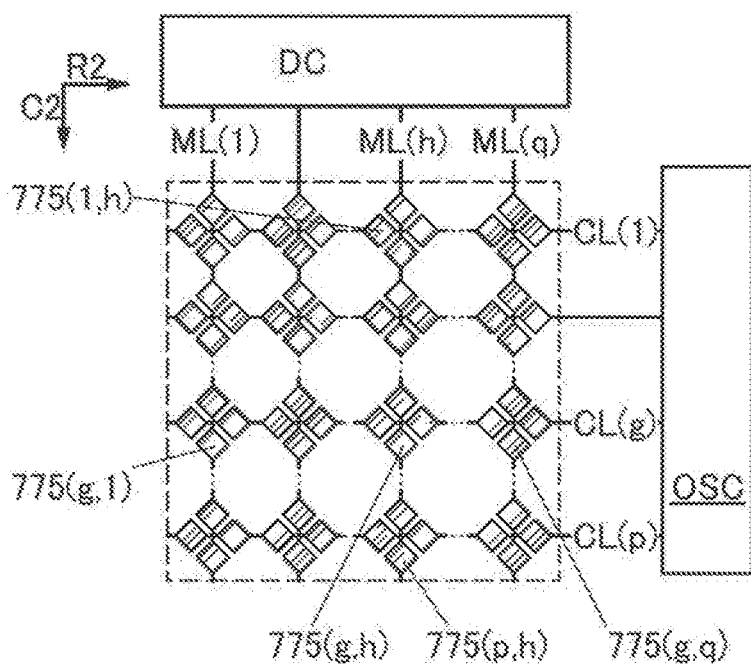

FIGS. 6A and 6B are block diagrams illustrating a structure of the input/output device of one embodiment of the present invention. FIG. 6A is a block diagram illustrating a structure of the display panel of one embodiment of the present invention. FIG. 6B is a block diagram illustrating a structure of the input portion of the input/output device of one embodiment of the present invention.

Structure Example 1 of Input/Output Device

An input/output device 700TP1 described in this embodiment includes the display panel and the input portion (see FIGS. 3A to 3C or FIGS. 6A and 6B).

Structure Example of Display Panel

The display panel of the input/output device described in this embodiment includes a pixel 702(i,j), an insulating film 501C, a third conductive film 511B, and an electrode 519B (see FIG. 3A).

The insulating film 501C includes a region overlapping with the pixel 702(i,j). The insulating film 501C includes an opening portion 591B.

The third conductive film 511B is electrically connected to the pixel 702(i,j). The third conductive film 511B includes a region overlapping with the insulating film 501C. The third conductive film 511B includes a region overlapping with the opening portion 591B.

The electrode 519B is electrically connected to the third conductive film 511B. The electrode 519B includes a first region 519B1 and a second region 519B2 (see FIG. 3C).

The first region 519B1 is in contact with the third conductive film 511B. The second region 519B2 functions as a contact point. The opening portion 591B includes a region occupied by the third conductive film 511B or the electrode 519B. The third conductive film 511B or the electrode 519B that occupies a part of the opening portion 591B in the insulating film 501C can be referred to as through electrode. In other words, the third conductive film 511B or the electrode 519B that fills a part of the opening portion 591B can be referred to as through electrode. The second region 519B2 has a shape projecting from a surface of an insulating film 501A, for example.

The insulating film 501C has a thickness larger than or equal to 0.2 μm and smaller than or equal to 1.5 μm and has a water vapor transmission rate lower than or equal to $10^{-3}$ g/(m²·day), preferably lower than or equal to $10^{-4}$ g/(m²·day), more preferably lower than or equal to $10^{-5}$ g/(m²·day).

The display panel of the input/output device described in this embodiment includes a first base 510L and a second base 710L (see FIG. 4).

The first base 510L includes a region overlapping with the insulating film 501C. The second base 710L includes a region that is provided so that the insulating film 501C is positioned between the region of the second base 710L and the first base 510L.

The display panel of the input/output device described in this embodiment includes the pixel, the third conductive film electrically connected to the pixel, the insulating film including the opening portion overlapping with the third conductive film, and the electrode including the first region in contact with the third conductive film and the second region functioning as a contact point. Thus, a signal, electric power, or the like can be supplied to the pixel protected by the insulating film. As a result, a novel display panel that is highly convenient or reliable can be provided.

The display panel of the input/output device described in this embodiment includes one group of pixels 702($i$,1) to 702($i$,$n$), the other group of pixels 702(1,$j$) to 702($m$,$j$), a signal line S2($j$), and a scan line G2($i$) (see FIG. 6A). Note that i is an integer greater than or equal to 1 and less than or equal to m, j is an integer greater than or equal to 1 and less than or equal to n, and one of m and n is an integer greater than 1.

The one group of pixels 702($i$,1) to 702($i$,$n$) include the pixel 702($i$,$j$). The one group of pixels 702($i$,1) to 702($i$,$n$) are arranged in a row direction (indicated by an arrow R1 in the drawing).

The other group of pixels 702(1,$j$) to 702($m$,$j$) include the pixel 702($i$,$j$). The other group of pixels 702(1,$j$) to 702($m$,$j$) are arranged in a column direction (indicated by an arrow C1 in the drawing) that intersects with the row direction.

The scan line G2($i$) is electrically connected to the one group of pixels 702($i$,1) to 702($i$,$n$).

The other group of pixels 702(1,$j$) to 702($m$,$j$) are electrically connected to the signal line S2($j$).

The scan line G2($i$) or the signal line S2($j$) is electrically connected to the third conductive film 511B.

The display panel of the input/output device described in this embodiment includes a driver circuit SD (see FIG. 6A). The driver circuit SD has a function of supplying an image signal. The driver circuit SD is electrically connected to the second region 519B2. The signal line S2($j$) is electrically connected to the third conductive film 511B.

Note that the electrode 519B can be electrically connected to a flexible printed circuit FPC1 using a conductive material ACF1, for example.

The first base 510L and the second base 710L have flexibility (see FIG. 3A or FIG. 4).

The pixel 702($i$,$j$) of the display panel of the input/output device described in this embodiment includes a pixel circuit 530($i$,$j$) and a display element 550($i$,$j$).

The pixel circuit 530($i$,$j$) is electrically connected to the signal line S2($j$), and the display element 550($i$,$j$) is electrically connected to the pixel circuit 530($i$,$j$) (see FIG. 3A or FIG. 5).

The display panel of the input/output device described in this embodiment includes the first base having flexibility, the second base having flexibility, the insulating film positioned between the first base and the second base, and the display element electrically connected to the pixel circuit overlapping with the insulating film. Thus, the display element can be bent between the first base and the second base. As a result, a novel display panel that is highly convenient or reliable can be provided.

The display panel described in this embodiment includes the insulating film 501A (see FIG. 3A or FIG. 4). The insulating film 501A includes an opening portion overlapping with the opening portion 591B and an opening portion overlapping with an opening portion 591C.

The display panel described in this embodiment includes a conductive film ANO (see FIGS. 6A and 6B).

The display element 550($i$,$j$) of the display panel described in this embodiment includes a third electrode 551($i$,$j$), a fourth electrode 552, and a layer 553($j$) containing a light-emitting material (see FIG. 3A). Note that the third electrode 551($i$,$j$) is electrically connected to the conductive film ANO, and the fourth electrode 552 is electrically connected to a fourth conductive film VCOM2 (see FIG. 5).

The third electrode 551($i$,$j$) is electrically connected to the pixel circuit 530($i$,$j$) at a connection portion 522 (see FIG. 3A).

The fourth electrode 552 includes a region overlapping with the third electrode 551($i$,$j$). The layer 553($j$) containing a light-emitting material includes a region between the third electrode 551($i$,$j$) and the fourth electrode 552.

The display panel described in this embodiment includes a light-blocking film BM, an insulating film 771, a functional film 770P. Furthermore, the display panel includes a coloring film CF1 (see FIG. 3A and FIG. 4).

The light-blocking film BM includes an opening portion in a region overlapping with the display element 550($i$,$j$).

The coloring film CF1 includes a region between the second base 710L and the display element 550($i$,$j$) and a region overlapping with the display element 550($i$,$j$).

The insulating film 771 includes a region between the coloring film CF1 and the display element 550($i$,$j$) or between the light-blocking film BM and the display element 550($i$,$j$). Thus, unevenness due to the thickness of the coloring film CF1 can be reduced, or impurities can be prevented from diffusing from the light-blocking film BM, the coloring film CF1, or the like to the display element 550($i$,$j$).

The functional film 770P includes a region overlapping with the display element 550($i$,$j$).

The display panel described in this embodiment includes the first base 510L, the second base 710L, and a functional layer 520.

The second base 710L includes a region overlapping with the first base 510L. The second base 710L includes an insulating film 710A, a base 710B, and a bonding layer 710C. The insulating film 710A includes a region overlapping with the base 710B, and the bonding layer 710C includes a region between the insulating film 710A and the base 710B.

The first base 510L includes a base 510B and a bonding layer 510C. The bonding layer 510C includes a region overlapping with the base 510B.

The functional layer 520 includes a region between the first base 510L and the second base 710L. The functional layer 520 includes the pixel circuit 530($i$,$j$), display element 550($i$,$j$), an insulating film 521, and an insulating film 528. The functional layer 520 includes an insulating film 518 and an insulating film 516 (see FIGS. 3A and 3B).

The insulating film 521 includes a region between the pixel circuit 530($i$,$j$) and the display element 550($i$,$j$).

The insulating film 528 includes a region between the insulating film 521 and the second base 710L. The insulating film 528 includes an opening portion in a region overlapping with the display element 550(*i,j*).

The insulating film 528 formed along the periphery of the third electrode 551(*i,j*) prevents a short circuit between the third electrode 551(*i,j*) and the fourth electrode.

The insulating film 518 includes a region between the insulating film 521 and the pixel circuit 530(*i,j*). The insulating film 516 includes a region between the insulating film 518 and the pixel circuit 530(*i,j*) (see FIG. 3B).

A bonding layer 709 includes a region between the functional layer 520 and the second base 710L and has a function of bonding the functional layer 520 and the second base 710L to each other.

An electrode 519C is electrically connected to a conductive film 511C (see FIG. 4). The electrode 519C includes a first region and a second region. The first region is in contact with the conductive film 511C, and the second region functions as a contact point. The opening portion 591C includes a region occupied by the conductive film 511C or the electrode 519C. The second region has a shape projecting from the surface of the insulating film 501A, for example.

The display panel described in this embodiment includes a driver circuit GD and the driver circuit SD (see FIGS. 1A, 1B-1, 1B-2, and 1C and FIGS. 6A and 6B).

The driver circuit GD is electrically connected to the scan line G2(*i*). The driver circuit GD includes a transistor MD, for example (see FIG. 3A). Specifically, a semiconductor film that can be formed in the same process as the semiconductor film of the transistor included in the pixel circuit 530(*i,j*) can be used for the transistor MD.

Structure Example of Input Portion

The input portion of the input/output device described in this embodiment includes a region overlapping with the display panel (see FIG. 1A, FIG. 3A, and FIG. 4).

The input portion includes a control line CL(g), a sensing signal line ML(h), and a sensing element 775(*g,h*) (see FIG. 1B-2).

The sensing element 775(*g,h*) is electrically connected to the control line CL(g) and the sensing signal line ML(h).

The control line CL(g) has a function of supplying a control signal.

The sensing element 775(*g,h*) receives the control signal and has a function of supplying the control signal and a sensor signal which changes in accordance with a distance between the sensing element 775(*g,h*) and an object approaching the region overlapping with the display panel.

The sensing signal line ML(h) has a function of being supplied with the sensing signal.

The sensing element 775(*g,h*) has a light-transmitting property. The sensing element 775(*g,h*) includes a first electrode C(g) and a second electrode M(h).

The first electrode C(g) is electrically connected to the control line CL(g). The second electrode M(h) is electrically connected to the sensing signal line ML(h), and the second electrode M(h) is provided so that an electric field which is partly blocked by the object that approaches the region overlapping with the display panel is generated between the second electrode M(h) and the first electrode C(g).

Thus, the object that approaches the region overlapping with the display panel can be sensed while image data is displayed by the display panel. As a result, a novel input/output device that is highly convenient or reliable can be provided.

The input portion described in this embodiment includes a region between the second base 710L and the bonding layer 709 (see FIG. 3A or FIG. 4).

The input portion described in this embodiment includes the functional film 770P. The functional film 770P is provided so that the sensing element 775(*g,t*) is positioned between the functional film 770P and the display element 550(*i,j*). Thus, the intensity of light reflected by the sensing element 775(*g,t*) can be reduced, for example.

The input portion described in this embodiment includes one group of sensing elements 775(*g,*1) to 775(*g,q*) and the other group of sensing elements 775(1,*h*) to 775(*p,h*) (see FIG. 6B). Note that g is an integer greater than or equal to 1 and less than or equal to p, h is an integer greater than or equal to 1 and less than or equal to q, and each of p and q is an integer greater than or equal to 1.

The one group of sensing elements 775(*g,*1) to 775(*g,q*) include the sensing element 775(*g,h*). The one group of sensing elements 775(*g,*1) to 775(*g,q*) are arranged in a row direction (the direction indicated by an arrow R2 in the drawing). Note that the direction indicated by the arrow R2 in FIG. 6B may be the same as or different from the direction indicated by the arrow R1 in FIG. 6A.

The other group of sensing elements 775(1,*h*) to 775(*p,h*) include the sensing element 775(*g,h*) and are arranged in a column direction (the direction indicated by an arrow C2 in the drawing) that intersects with the row direction.

The one group of sensing elements 775(*g,*1) to 775(*g,q*) arranged in the row direction include the electrode C(g) that is electrically connected to the control line CL(g).

The other group of sensing elements 775(1,*h*) to 775(*p,h*) arranged in the column direction include the electrode M(h) that is electrically connected to the sensing signal line ML(h).

The control line CL(g) of the input/output device described in this embodiment includes a conductive film BR(g,h) (see FIG. 3A). The conductive film BR(g,h) includes a region overlapping with the sensing signal line ML(h).

An insulating film 706 includes a region between the sensing signal line ML(h) and the conductive film BR(g,h). Thus, a short circuit between the sensing signal line ML(h) and the conductive film BR(g,h) can be avoided.

The input/output device described in this embodiment includes an oscillator circuit OSC and a sensor circuit DC (see FIG. 6B).

The oscillator circuit OSC is electrically connected to the control line CL(g). The oscillator circuit OSC has a function of supplying a control signal. For the control signal, a rectangular wave, a sawtooth wave, a triangular wave, or the like can be used.

The sensor circuit DC is electrically connected to the sensing signal line ML(h). The sensor circuit DC has a function of supplying a sensing signal in accordance with a change in the potential of the sensing signal line ML(h).

The input portion described in this embodiment includes a functional layer 720.

The functional layer 720 includes a region between the display element 550(*i,j*) and the base 710L. The functional layer 720 includes the sensing element 775(*g,h*) and the insulating film 706.

The input portion described in this embodiment includes a terminal 719, an electrode 552C, and a conductive material CP (see FIG. 4).

The terminal 719 is electrically connected to the control line CL(g) or the sensing signal line ML(h). The electrode 552C is electrically connected to the conductive film 511C.

The conductive material CP includes a region between the terminal 719 and the conductive film 511C. The terminal 719 and the conductive film 511C are electrically connected to each other using the conductive material CP.

Note that the terminal 719 can be electrically connected to a flexible printed circuit FPC2 using a conductive material ACF2, for example (see FIG. 4).

Components constituting the input/output device will be described below. Note that these components cannot be clearly distinguished and one component may also serve as another component or include part of another component.

Structure Example

The input/output device of one embodiment of the present invention includes the display panel or the input portion.

The display panel of one embodiment of the present invention includes the base 510L, the base 710L, or the bonding layer 709.

The display panel of one embodiment of the present invention includes the functional layer 520, the insulating film 521, or the insulating film 528.

The display panel of one embodiment of the present invention includes the signal line S2(j), the scan line G2(i), or the conductive film ANO.

The display panel of one embodiment of the present invention includes the electrode 519B, the electrode 519C, the conductive film 511B, or the conductive film 511C.

The display panel of one embodiment of the present invention includes the pixel circuit 530(i,j) or a switch SW2.

The display panel of one embodiment of the present invention includes the coloring film CF1, the light-blocking film BM, the insulating film 771, or the functional film 770P.

The display panel of one embodiment of the present invention includes the display element 550(i,j), the third electrode 551(i,j), the fourth electrode 552, or the layer 553(j) containing a light-emitting material.

The display panel of one embodiment of the present invention includes the insulating film 501A and the insulating film 501C.

The display panel of one embodiment of the present invention includes the driver circuit GD or the driver circuit SD.

Base 510L

The base 510L or the like can be formed using a material having heat resistance high enough to withstand heat treatment in the manufacturing process. For example, a material with a thickness of more than or equal to 0.1 mm and less than or equal to 0.7 mm can be used as the base 510L. Specifically, a material polished to a thickness of approximately 0.1 mm can be used.

For example, a large-sized glass substrate having any of the following sizes can be used as the base 510L or the like the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the base 510L or the like, an organic material, an inorganic material, a composite material of an organic material and an inorganic material, or the like can be used. For example, an inorganic material such as glass, ceramic, or metal can be used for the base 510L or the like.

Specifically, non-alkali glass, soda-lime glass, potash glass, crystal glass, aluminosilicate glass, tempered glass, chemically tempered glass, quartz, sapphire, or the like can be used for the base 510L or the like. Specifically, an inorganic oxide film, an inorganic nitride film, an inorganic oxynitride film, or the like can be used for the base 510L or the like. For example, a silicon oxide film, a silicon nitride film, a silicon oxynitride film, an aluminum oxide film, or the like can be used for the base 510L or the like. Stainless steel, aluminum, or the like can be used for the base 510L or the like.

For example, a single crystal semiconductor substrate or a polycrystalline semiconductor substrate of silicon or silicon carbide, a compound semiconductor substrate of silicon germanium or the like, an SOI substrate, or the like can be used for the base 510L or the like. Thus, a semiconductor element can be provided over the base 510L or the like.

For example, an organic material such as a resin, a resin film, or plastic can be used for the base 510L or the like. Specifically, a resin film or a resin plate of polyester, polyolefin, polyamide, polyimide, polycarbonate, an acrylic resin, or the like can be used for the base 510L or the like.

For example, a stacked-layer material having flexibility can be used for the base 510L. Specifically, a stacked-layer material in which the bonding layer 510C and the base 510B are stacked can be used for the base 510L. Note that the bonding layer 510C has a function of bonding the insulating film 501A and the base 510B to each other.

For example, a composite material formed by attaching a metal plate, a thin glass plate, or a film of an inorganic material to a resin film or the like can be used for the base 510L or the like. For example, a composite material formed by dispersing a fibrous or particulate metal, glass, an inorganic material, or the like into a resin film can be used for the base 510L or the like. For example, a composite material formed by dispersing a fibrous or particulate resin, an organic material, or the like into an inorganic material can be used for the base 510L or the like.

Furthermore, a single-layer material or a layered material in which a plurality of layers are stacked can be used for the base 510L or the like. For example, a layered material in which a base, an insulating film that prevents diffusion of impurities contained in the base, and the like are stacked can be used for the base 510L or the like. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the base 510L or the like. Alternatively, a layered material in which a resin and a film for preventing diffusion of impurities that penetrate the resin, such as a silicon oxide film, a silicon nitride film, or a silicon oxynitride film, are stacked can be used for the base 510L or the like.

Specifically, a resin film, a resin plate, a layered material, or the like of polyester, polyolefin, polyamide, polyimide, polycarbonate, an acrylic resin, or the like can be used for the base 510L or the like.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the base 510L or the like.

Specifically, polyethylene terephthalate (PET), polyethylene naphthalate (PEN), polyethersulfone (PES), an acrylic resin, or the like can be used for the base 510L or the like.

Alternatively, paper, wood, or the like can be used for the base 510L or the like.

For example, a flexible substrate can be used for the base 510L or the like.

Note that a transistor, a capacitor, or the like can be directly formed on the substrate. Alternatively, a transistor, a capacitor, or the like can be formed on a substrate which is for use in the manufacturing process and can withstand heat applied in the manufacturing process, and then the transistor, the capacitor, or the like can be transferred to the base 510L or the like. Thus, a transistor, a capacitor, or the like can be formed over a flexible substrate, for example.

Base 710L

For example, a light-transmitting material can be used for the base 710L. Specifically, any of the materials that can be used for the base 510L can be used for the base 710L.

For example, aluminosilicate glass, tempered glass, chemically tempered glass, sapphire, or the like can be favorably used for the base 710L that is provided on the user side of the display panel. This can prevent damage or a crack of the display panel caused by the use thereof.

Moreover, a material having a thickness of more than or equal to 0.1 mm and less than or equal to 0.7 mm, for example, can be used for the base 710L. Specifically, a substrate polished for reducing the thickness can be used.

For example, a stacked-layer material having flexibility can be used for the base 710L. Specifically, a stacked-layer material in which the insulating film 710A and the base 710B are bonded to each other using the bonding layer 710C can be used for the base 710L.

Bonding Layer 709

For the bonding layer 709 or the like, an inorganic material, an organic material, a composite material of an inorganic material and an organic material, or the like can be used.

For example, an organic material such as a resin having thermal fusibility or a curable resin can be used for the bonding layer 709 or the like.

For example, an organic material, such as a reactive curable adhesive, a light curable adhesive, a thermosetting adhesive, and/or an anaerobic adhesive, can be used for the bonding layer 709 or the like.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin, or the like can be used for the bonding layer 709 or the like.

Insulating Film 521

For example, an insulating inorganic material, an insulating organic material, an insulating composite material containing an inorganic material and an organic material, or the like can be used for the insulating film 521 or the like.

Specifically, for example, an inorganic oxide film, an inorganic nitride film, an inorganic oxynitride film, or a material obtained by stacking any of these films and the like can be used for the insulating film 521 or the like. For example, a film including any of a silicon oxide film, a silicon nitride film, a silicon oxynitride film, an aluminum oxide film, and the like, or a film including a material obtained by stacking any of these films can be used for the insulating film 521 or the like.

Specifically, polyester, polyolefin, polyamide, polyimide, polycarbonate, polysiloxane, an acrylic resin, or the like, or a layered or composite material of a plurality of kinds of resins selected from these can be used for the insulating film 521 or the like. Alternatively, a photosensitive material may be used.

Thus, steps due to various components overlapping with the insulating film 521, for example, can be reduced.

Insulating Film 528

For example, any of the materials that can be used for the insulating film 521 can be used for the insulating film 528 or the like. Specifically, a 1-µm-thick polyimide-containing film can be used as the insulating film 528.

Insulating Film 501A

For example, any of the materials that can be used for the insulating film 521 can be used for the insulating film 501A. For example, a material having a function of supplying hydrogen can be used for the insulating film 501A.

Specifically, a material obtained by stacking a material containing silicon and oxygen and a material containing silicon and nitrogen can be used for the insulating film 501A. For example, a material having a function of releasing hydrogen by heating or the like to supply the hydrogen to another component can be used for the insulating film 501A. Specifically, a material having a function of releasing hydrogen taken in the manufacturing process, by heating or the like, to supply the hydrogen to another component can be used for the insulating film 501A.

For example, a film containing silicon and oxygen that is formed by a chemical vapor deposition method using silane or the like as a source gas can be used as the insulating film 501A.

Specifically, a material obtained by stacking a material containing silicon and oxygen and having a thickness of more than or equal to 200 nm and less than or equal to 600 nm and a material containing silicon and nitrogen and having a thickness of approximately 200 nm can be used for the insulating film 501A.

For example, a material in which a 600-nm-thick material containing silicon and oxygen and a 200-nm-thick material containing silicon and nitrogen are stacked can be used for the insulating film 501A. As another example, a material in which a 600-nm-thick material containing silicon and oxygen and a 280-nm-thick material containing silicon and nitrogen are stacked can be used for the insulating film 501A.

Insulating Film 501C

For example, any of the materials that can be used for the insulating film 521 can be used for the insulating film 501C. Specifically, a material containing silicon and oxygen can be used for the insulating film 501C. Thus, diffusion of impurities into the pixel circuit, the display element, or the like can be suppressed.

For example, a 200-nm-thick film containing silicon, oxygen, and nitrogen can be used as the insulating film 501C. For example, a material in which a 600-nm-thick film containing silicon, oxygen, and nitrogen, a 200-nm-thick film containing silicon and nitrogen, and a 350-nm-thick film containing silicon and nitrogen are stacked can be used as the insulating film 501C.

As another example, a 200-nm-thick film containing silicon, oxygen, and nitrogen, a 100-nm-thick film containing silicon and nitrogen, and a 100-nm-thick film containing silicon, oxygen, and nitrogen are stacked can be used as the insulating film 501C.

As another example, a 180-nm-thick film containing silicon, oxygen, and nitrogen, a 140-nm-thick film containing silicon and nitrogen, and a 215-nm-thick film containing silicon, oxygen, and nitrogen are stacked can be used as the insulating film 501C.

Wiring, Electrode, Terminal, and Conductive Film

A conductive material can be used for the wiring or the like. Specifically, the conductive material can be used for the signal line S2(j), the scan line G2(i), the conductive film ANO, the electrode 519B, the electrode 519C, the terminal 719, the conductive film 511B, the conductive film 511C, or the like.

For example, an inorganic conductive material, an organic conductive material, a metal, conductive ceramics, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, any of the following structures can be used for the wiring or the like: a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like.

Specifically, a conductive oxide, such as indium oxide, indium tin oxide, indium zinc oxide, zinc oxide, or zinc oxide to which gallium is added, can be used for the wiring or the like.

Specifically, a film containing graphene or graphite can be used for the wiring or the like.

For example, a film including graphene oxide is formed and is subjected to reduction, so that a film including graphene can be formed. As a reducing method, a method with application of heat, a method using a reducing agent, or the like can be employed.

For example, a film including a metal nanowire can be used for the wiring or the like. Specifically, a nanowire including silver can be used.

Specifically, a conductive high molecule can be used for the wiring or the like.

Pixel Circuit 530(i,j)

The pixel circuit 530(i,j) is electrically connected to the signal line S2(j), the scan line G2(i), and the conductive film ANO (see FIG. 5).

The pixel circuit 530(i,j) includes the switch SW2, a transistor M, and a capacitor C12.

For example, a transistor including a gate electrode electrically connected to the scan line G2(i) and a first electrode electrically connected to the signal line S2(j) can be used as the switch SW2.

The transistor M includes a gate electrode electrically connected to the second electrode of the transistor used as the switch SW2 and includes a first electrode electrically connected to the conductive film ANO.

A transistor including a conductive film having a region that is provided so that a semiconductor film is provided between the region and a gate electrode can be used as the transistor M. For example, a conductive film electrically connected to a wiring that can supply a potential the same as that of the gate electrode of the transistor M can be used as the conductive film.

The capacitor C12 includes a first electrode electrically connected to a second electrode of the transistor used as the switch SW2 and a second electrode electrically connected to the first electrode of the transistor M.

Note that the third electrode and the fourth electrode of the display element 550(i,j) are electrically connected to the second electrode of the transistor M and the fourth conductive film VCOM2, respectively. This enables the display element 550(i,j) to be driven.

Switch SW2, Transistor M, and Transistor MD

For example, a bottom-gate or top-gate transistor or the like can be used as the switch SW2, the transistor M, the transistor MD, or the like.

For example, a transistor including a semiconductor containing an element belonging to Group 14 in a semiconductor film can be used. Specifically, a semiconductor containing silicon can be used for a semiconductor film. For example, a transistor including single crystal silicon, polysilicon, microcrystalline silicon, amorphous silicon, or the like in a semiconductor film can be used.

For example, a transistor including an oxide semiconductor in a semiconductor film can be used. Specifically, an oxide semiconductor containing indium or an oxide semiconductor containing indium, gallium, and zinc can be used for a semiconductor film.

The transistor M includes a semiconductor film 508 and a conductive film 504 including a region overlapping with the semiconductor film 508 (see FIG. 3B). The transistor M includes the conductive film 512A and the conductive film 512B that are electrically connected to the semiconductor film 508.

Note that the conductive film 504 and the insulating film 506 serve as a gate electrode and a gate insulating film, respectively. The conductive film 512A has one of a function of a source electrode and a function of a drain electrode, and the conductive film 512B has the other.

A transistor including a conductive film 524 having a region that is provided so that the semiconductor film 508 is positioned between the region and the conductive film 504 can be used as the transistor M.

A conductive film in which a 10-nm-thick film containing tantalum and nitrogen and a 300-nm-thick film containing copper are stacked in this order can be used as the conductive film 504, for example.

A material in which a 400-nm-thick film containing silicon and nitrogen and a 200-nm-thick film containing silicon, oxygen, and nitrogen are stacked can be used for the insulating film 506, for example.

A 25-nm-thick film containing indium, gallium, and zinc can be used as the semiconductor film 508, for example.

A conductive film in which a 50-nm-thick film containing tungsten, a 400-nm-thick film containing aluminum, and a 100-nm-thick film containing titanium are stacked in this order can be used as the conductive film 512A or the conductive film 512B, for example.

Light-Blocking Film BM

The light-blocking film BM can be formed of a material that prevents light transmission and can thus be used as a black matrix, for example.

Insulating Film 771

The insulating film 771 can be formed of polyimide, an epoxy resin, an acrylic resin, or the like, for example.

Functional Film 770P

For example, an anti-reflection film, a polarizing film, a retardation film, a light diffusion film, a condensing film, or the like can be used as the functional film 770P.

Alternatively, an antistatic film preventing the attachment of a foreign substance, a water repellent film suppressing the attachment of stain, a hard coat film suppressing a scratch in use, or the like can be used as the functional film 770P.

Specifically, a circularly polarizing film can be used as the functional film 770P.

Display Element 550(i,j)

For example, the display element 550(i,j) can be a light-emitting element. Specifically, an organic electroluminescent element, an inorganic electroluminescent element, a light-emitting diode, or the like can be used as the display element 550(i,j).

For example, a light-emitting organic compound can be used for the layer 553(j) containing a light-emitting material.

For example, quantum dots can be used for the layer 553(j) containing a light-emitting material. Accordingly, the half width becomes narrow, and light of a bright color can be emitted.

For example, a layered material for emitting blue light, green light, or red light, or the like can be used for the layer 553(j) containing a light-emitting material.

For example, a belt-like layered material that extends in the column direction along the signal line S2(j) can be used for the layer 553(j) containing a light-emitting material.

Alternatively, a layered material for emitting white light can be used for the layer 553(j) containing a light-emitting material. Specifically, a layered material in which a layer containing a light-emitting material inducting a fluorescent material that emits blue light, and a layer containing a material that is other than a fluorescent material and that emits green light and/or red light or a layer containing a material that is other than a fluorescent material and that emits yellow light are stacked can be used for the layer 553(j) containing a light-emitting material.

For example, a material that can be used for the wiring or the like can be used for the third electrode 551(i,j).

For example, a material that reflects visible light and is selected from materials capable of being used for the wiring or the like can be used for the third electrode 551(i,j).

For example, a material that can be used for the wiring or the like can be used for the fourth electrode 552. Specifically, a material that transmits visible light can be used for the fourth electrode 552.

More specifically, conductive oxide, indium-containing conductive oxide, indium oxide, indium tin oxide, indium zinc oxide, zinc oxide, zinc oxide to which gallium is added, or the like can be used for the third electrode 551(i,j). Alternatively, a metal film that is thin enough to transmit light can be used as the third electrode 551(i,j). Further alternatively, a metal film that transmits part of light and reflects another part of light can be used for the third electrode 551(i,j). Thus, the display element 550(i,j) can be provided with a microcavity structure. Consequently, light of a predetermined wavelength can be extracted more efficiently than light of the other wavelengths.

Driver Circuit GD

Any of a variety of sequential circuits, such as a shift register, can be used as the driver circuit GD. For example, the transistor MD, a capacitor, and the like can be used in the driver circuit GD. Specifically, a transistor that includes a semiconductor film and can be formed in the same process as the transistor M can be used as the transistor MD. For example, a transistor having the same structure as the transistor M can be used as the transistor MD. Alternatively, a transistor having a structure different from that of the transistor M can be used as the transistor MD.

Driver Circuit SD

The driver circuit SD has a function of supplying an image signal.

For example, any of a variety of sequential circuits, such as a shift register, can be used as the driver circuit SD. Specifically, an integrated circuit formed over a silicon substrate can be used as the driver circuit SD.

For example, the driver circuit SD can be mounted on the electrode 519B by a chip on glass (COG) method. Specifically, an anisotropic conductive film can be used to mount an integrated circuit on the electrode 519B. Alternatively, a chip on film (COF) may be used to mount an integrated circuit on the electrode 519B.

Method for Controlling Resistivity of Oxide Semiconductor Film

A method for controlling the resistivity of an oxide semiconductor film will be described.

An oxide semiconductor film with a certain resistivity can be used as the semiconductor film 508, the conductive film 524, or the like.

For example, a method for controlling the concentration of impurities such as hydrogen and water contained in the oxide semiconductor film and/or the oxygen vacancies in the film can be used as the method for controlling the resistivity of an oxide semiconductor film.

Specifically, plasma treatment can be used as a method for increasing or decreasing the concentration of impurities such as hydrogen and water and/or the oxygen vacancies in the film.

Specifically, plasma treatment using a gas containing one or more kinds selected from a rare gas (He, Ne, Ar, Kr, or Xe), hydrogen, boron, phosphorus, and nitrogen can be employed. For example, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, or plasma treatment in a nitrogen atmosphere can be employed. Thus, the oxide semiconductor film can have a high carrier density and a low resistivity.

Alternatively, hydrogen, boron, phosphorus, or nitrogen is added to the oxide semiconductor film by an ion implantation method, an ion doping method, a plasma immersion ion implantation method, or the like, so that the oxide semiconductor film can have a low resistivity.

Alternatively, an insulating film containing hydrogen is formed in contact with the oxide semiconductor film, and the hydrogen is diffused from the insulating film to the oxide semiconductor film, so that the oxide semiconductor film can have a high carrier density and a low resistivity.

For example, an insulating film with a hydrogen concentration of greater than or equal to $1 \times 10^{22}$ atoms/cm$^3$ is formed in contact with the oxide semiconductor film, whereby hydrogen can be effectively supplied to the oxide semiconductor film. Specifically, a silicon nitride film can be used as the insulating film formed in contact with the oxide semiconductor film.

Hydrogen contained in the oxide semiconductor film reacts with oxygen bonded to a metal atom to be water, and an oxygen vacancy is formed in a lattice from which oxygen is released (or a portion from which oxygen is released). Due to entry of hydrogen into the oxygen vacancy, an electron serving as a carrier is generated in some cases. Furthermore, bonding of part of hydrogen to oxygen bonded to a metal atom causes generation of an electron serving as a carrier in some cases. Thus, the oxide semiconductor film can have a high carrier density and a low resistivity.

Specifically, an oxide semiconductor with a hydrogen concentration measured by secondary ion mass spectrometry (SIMS) of greater than or equal to $8 \times 10^{19}$ atoms/cm$^3$, preferably greater than or equal to $1 \times 10^{20}$ atoms/cm$^3$, further preferably greater than or equal to $5 \times 10^{20}$ atoms/cm$^3$ can be suitably used for the conductive film 524.

Meanwhile, an oxide semiconductor with a high resistivity can be used for a semiconductor film where a channel of a transistor is formed, specifically, the semiconductor film 508.

For example, an insulating film containing oxygen, in other words, an insulating film capable of releasing oxygen, is formed in contact with an oxide semiconductor film, and the oxygen is supplied from the insulating film to the oxide semiconductor film, so that oxygen vacancies in the film or at the interface can be filled. Thus, the oxide semiconductor film can have a high resistivity.

For example, a silicon oxide film or a silicon oxynitride film can be used as the insulating film capable of releasing oxygen.

The oxide semiconductor film in which oxygen vacancies are filled and the hydrogen concentration is reduced can be referred to as a highly purified intrinsic or substantially highly purified intrinsic oxide semiconductor film. The term "substantially intrinsic" refers to the state in which an oxide semiconductor film has a carrier density lower than $8 \times 10^{11}$/cm$^3$, preferably lower than $1 \times 10^{11}$/cm$^3$, further preferably lower than $1 \times 10^{10}$/cm$^3$. A highly purified intrinsic or substantially highly purified intrinsic oxide semiconductor film has few carrier generation sources and thus can have a low carrier density. The highly purified intrinsic or substantially highly purified intrinsic oxide semiconductor film has a low density of defect states and accordingly can have a low density of trap states.

Furthermore, a transistor including the highly purified intrinsic or substantially highly purified intrinsic oxide semiconductor film has an extremely low off-state current; even when an element has a channel width of $1 \times 10^6$ μm and a channel length L of 10 μm, the off-state current can be lower than or equal to the measurement limit of a semiconductor parameter analyzer, that is, lower than or equal to $1 \times 10^{-13}$ A, at a voltage (drain voltage) between a source electrode and a drain electrode of from 1 V to 10 V.

The transistor in which a channel region is formed in the oxide semiconductor film that is a highly purified intrinsic or substantially highly purified intrinsic oxide semiconductor film can have a small change in electrical characteristics and high reliability.

Specifically, an oxide semiconductor whose hydrogen concentration measured by secondary ion mass spectrometry (SIMS) is lower than or equal to $2 \times 10^{20}$ atoms/cm$^3$, preferably lower than or equal to $5 \times 10^{19}$ atoms/cm$^3$, further preferably lower than or equal to $1 \times 10^{19}$ atoms/cm$^3$, further preferably lower than $5 \times 10^{18}$ atoms/cm$^3$, further preferably lower than or equal to $1 \times 10^{18}$ atoms/cm$^3$, further preferably lower than or equal to $5 \times 10^{17}$ atoms/cm$^3$, further preferably lower than or equal to $1 \times 10^{16}$ atoms/cm$^3$ can be favorably used as a semiconductor where a channel of a transistor is formed.

Note that an oxide semiconductor film that has a higher hydrogen concentration and/or a larger amount of oxygen vacancies and that has a lower resistivity than the semiconductor film 508 is used as the conductive film 524.

A film whose hydrogen concentration is twice or more, preferably ten times or more that of the semiconductor film 508 can be used as the conductive film 524.

A film whose resistivity is greater than or equal to $1 \times 10^{-8}$ times and less than $1 \times 10^{-1}$ times that of the semiconductor film 508 can be used as the conductive film 524.

Specifically, a film whose resistivity is higher than or equal to $1 \times 10^{-3}$ Ωcm and lower than $1 \times 10^4$ Ωcm, preferably higher than or equal to $1 \times 10^{-3}$ Ωcm and lower than $1 \times 10^{-1}$ Ωcm can be used as the conductive film 524.

Sensing Element 775(g,h)

As the sensing element 775(g,h), an element that senses electrostatic capacitance, illuminance, magnetic force, a radio wave, pressure, or the like and supplies data based on the sensed physical value can be used, for example.

Specifically, a capacitor, a photoelectric conversion element, a magnetic sensing element, a piezoelectric element, a resonator, or the like can be used as the sensing element 775(g,h).

When a finger or the like having a higher dielectric constant than that of the air approaches a conductive film in the air, for example, electrostatic capacitance between the finger or the like and the conductive film changes. This electrostatic capacitance change can be sensed, and the sensed data can be supplied. Specifically, a self-capacitive sensing element can be used.

The electrode C(g) and the electrode M(h) can be used for the sensing element, for example. Specifically, the electrode C(g) to which a control signal is supplied and the electrode M(h) that is positioned so that an electric field which is partly blocked by an approaching object is generated between the electrode M(h) and the electrode C(g) can be used. Thus, the electric field that is changed when blocked by the approaching object can be sensed using the potential of the sensing signal line ML(h), and a sensing signal can be supplied. As a result, the approaching object that blocks the electric field can be sensed. Specifically, a mutual capacitive sensing element can be used.

Control Line CL(g), Sensing Signal Line ML(h), and Conductive Film BR(g,h)

A material having a viable-light transmitting property and conductivity can be used for the control line CL(g), the sensing signal line ML(h), or the conductive film BR(g,h). For example, a material having a visible-light transmitting property that is selected from materials capable of being used as wirings and the like can be used for the control line CL(g), the sensing signal line ML(h), or the conductive film BR(g,h).

For example, a conductive oxide, a metal film thin enough to transmit light, or a metal nanowire can be used for the control line CL(g), the sensing signal line ML(h), or the conductive film BR(g,h).

Specifically, a conductive oxide containing indium can be used for the control line CL(g), the sensing signal line ML(h), or the conductive film BR(g,h). A metal thin film with a thickness of 1 nm or more and 10 nm or less can be used for the control line CL(g), the sensing signal line ML(h), or the conductive film BR(g,h). A metal nanowire containing silver can be used for the control line CL(g), the sensing signal line ML(h), or the conductive film BR(g,h).

Specifically, indium oxide, indium tin oxide, indium zinc oxide, zinc oxide, zinc oxide to which gallium is added, zinc oxide to which aluminum is added, or the like can be used for the control line CL(g), the sensing signal line ML(h), or the conductive film BR(g,h).

Insulating Film 706

Any of the materials that can be used for the insulating film 521 can be used for the insulating film 706 or the like, for example. Specifically, a film containing silicon and oxygen can be used for the insulating film 706.

Structure Example 2 of Input/Output Device

A structure of an input/output device of one embodiment of the present invention will be described with reference to FIGS. 31A to 31C.

Figure 31A:
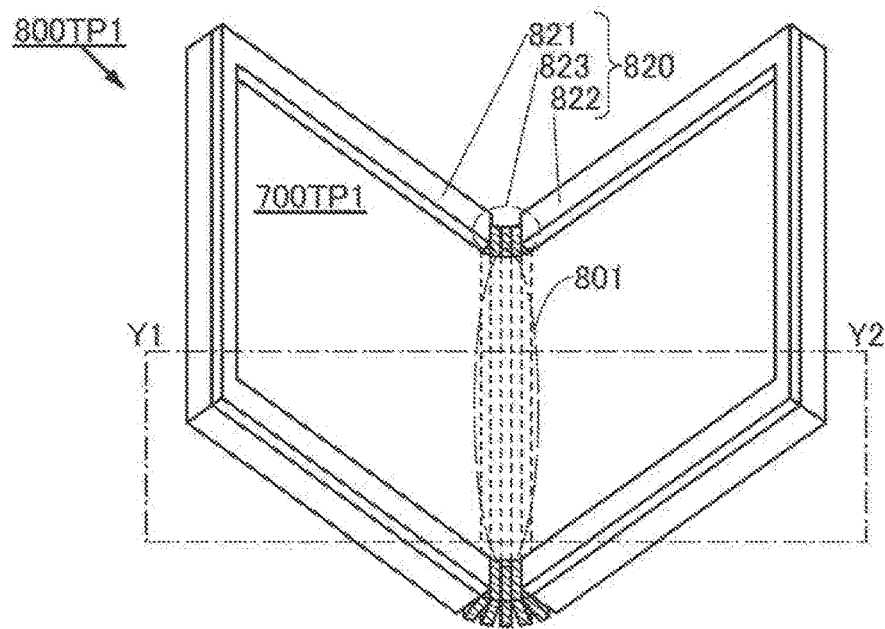
FIGS. 31A to 31C illustrate a structure of an input/output device of one embodiment.
Figure 31B:
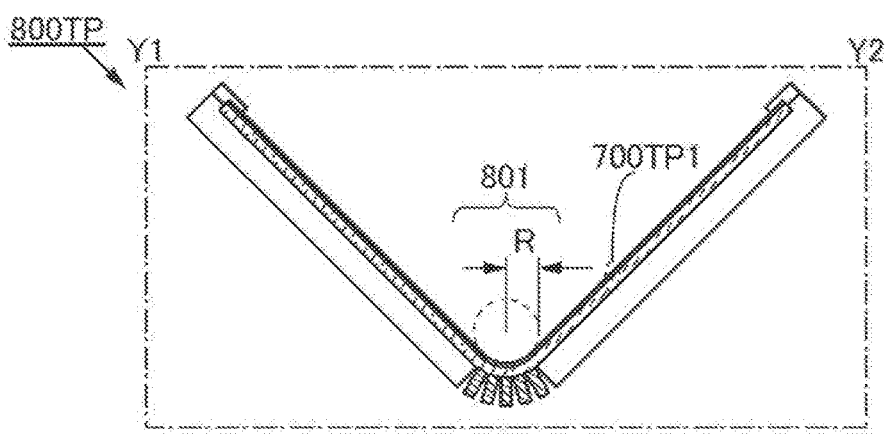
Figure 31C:
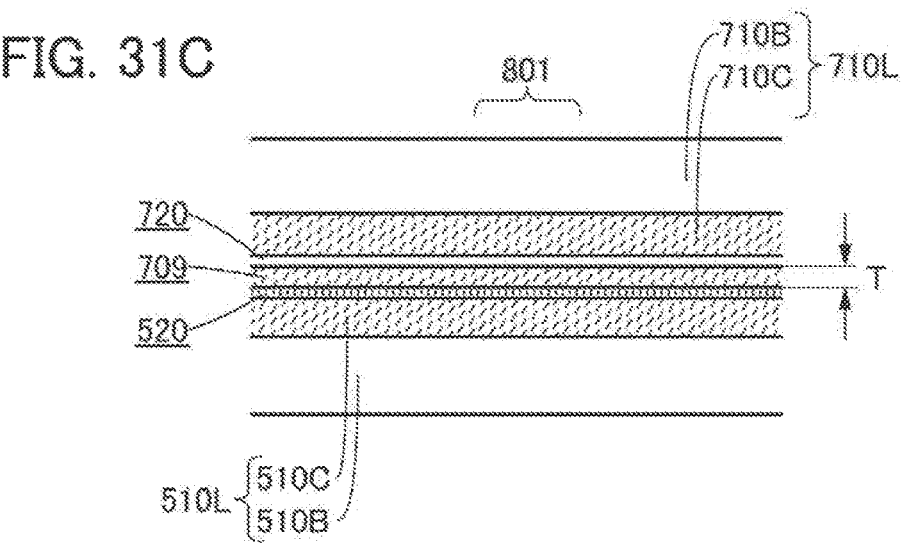

FIGS. 31A to 31C illustrate a structure of an input/output device 800TP1 of one embodiment of the present invention. A projection view shown in FIG. 31A illustrates a structure of the input/output device that is bent. A cross-sectional view shown in FIG. 31B illustrates a cross-sectional structure taken along the cutting plane line Y1-Y2 in FIG. 31A. A cross-sectional view shown in FIG. 31C illustrates a detailed structure of a flexible region of the input/output device.

The input/output device 800TP1 described in this embodiment includes a display panel, an input portion, and a housing 820 (see FIG. 31A).

The input portion includes a region overlapping with the display panel, and the region includes a region 801 having flexibility. The input/output device 700TP1 described above can be used for the display panel and the input portion, for example.

The housing 820 has a function of bending the region 801 so that a curved surface with a curvature radius of R (mm) or more is provided in the region 801 (see FIG. 31B). The housing 820 includes, for example, a component 821, a component 822, and a hinge portion 823 (see FIG. 31A). The hinge portion 823 has a function of rotatably connecting the component 822 to the component 821. The hinge portion 823 has a function of forming the curved surface with a curvature radius of R or more in the region 801 overlapping with the hinge portion 823.

Note that the component 821 and the component 822 can have a shape that allows the component 821 and the component 822 to come in contact with each other in a state where the hinge portion 823 is bent so that the region 801 has a curved surface with a curvature radius of R (mm), for example. With the use of the shape, formation of a curved surface with a curvature radius less than R (mm) in the region 801 can be prevented. As a result, a novel display panel that is highly convenient or reliable can be provided. Furthermore, the input/output device 700TP1 can be prevented from being broken by excessive folding with an extremely small curvature radius. Still furthermore, for example, a folding and unfolding operation of the input/output device 800TP1 can be repeated 100,000 times or more.

The region 801 includes the functional layer 520, the functional layer 720, and the bonding layer 709 (see FIG. 31C). The functional layer 520 can include, for example, the display element 550(i,j). The functional layer 720 can include, for example, the coloring film CF1 or the sensing element 775(g,h).

The functional layer 720 includes a region overlapping with the functional layer 520. Note that the functional layer 520 has a thickness of 2 μm, a Young's modulus of 100 GPa, and a Poisson's ratio of 0.25, for example. The functional layer 720 has a thickness of 1 μm, a Young's modulus of 100 GPa, and a Poisson's ratio of 0.25.

The bonding layer 709 includes a region between the functional layer 520 and the functional layer 720, and the bonding layer 709 has a thickness of T (μm). Note that the bonding layer 709 has a Young's modulus of 3 GPa and a Poisson's ratio of 0.3, for example.

The thickness T satisfies the relation with the curvature radius R as represented by a formula below. Note that the unit of the curvature radius R is mm, and the unit of the thickness T is μm. The thickness T is larger than or equal to 0.1 μm and smaller than or equal to 500 μm, preferably larger than or equal to 1 μm and smaller than or equal to 100 μm, for example.

$$R \geq 0.35T \quad \text{[Formula]}$$

For example, the input/output device 700TP1 including the bonding layer 709 that has a thickness of 13 μm can be used in combination with the housing that can be folded with a curvature radius of 5 mm or more.

As another example, the input/output device 700TP1 including the bonding layer 709 that has a thickness of 10 μm can be used in combination with the housing that can be folded with a curvature radius of 3 mm or more.

As another example, the input/output device 700TP1 including the bonding layer 709 that has a thickness of 8 μm can be used in combination with the housing that can be folded with a curvature radius of 3 mm or more.

As another example, the input/output device 700TP1 including the bonding layer 709 that has a thickness of 6 μm can be used in combination with the housing that can be folded with a curvature radius of 2 mm or more.

Note that the base 510B that has a thickness of 23 μm, a Young's modulus of 7 GPa, and a Poisson's ratio of 0.3 and the bonding layer 510C that has a thickness of 10 μm, a Young's modulus of 3 GPa, and a Poisson's ratio of 0.3 can be used in the base 510L.

The base 710B that has a thickness of 23 μm, a Young's modulus of 7 GPa, and a Poisson's ratio of 0.3 and the bonding layer 710C that has a thickness of 10 μm, a Young's modulus of 3 GPa, and a Poisson's ratio of 0.3 can be used in the base 710L.

Note that this embodiment can be combined with any of the other embodiments in this specification as appropriate.

Embodiment 2

In this embodiment, a structure of an input/output device of one embodiment of the present invention will be described with reference to FIGS. 7A, 7B-1, and 7B-2, FIGS. 8A and 8B, FIGS. 9A to 9C, FIG. 10, FIG. 11, FIG. 12, and FIGS. 13A to 13C.

Figure 7A:
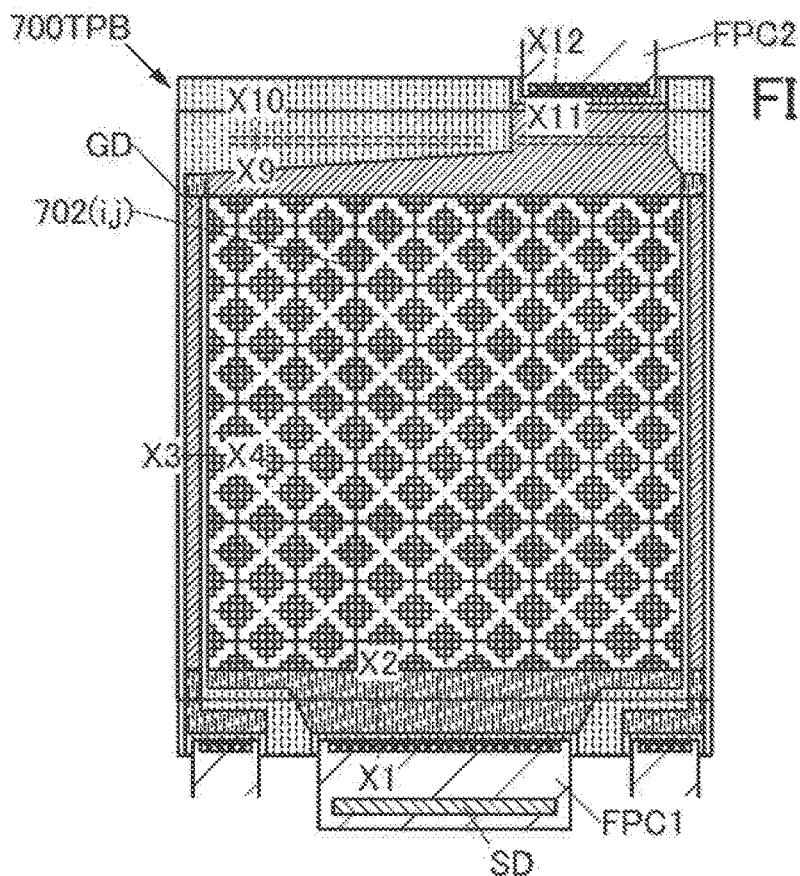
Figures 1, 7B:
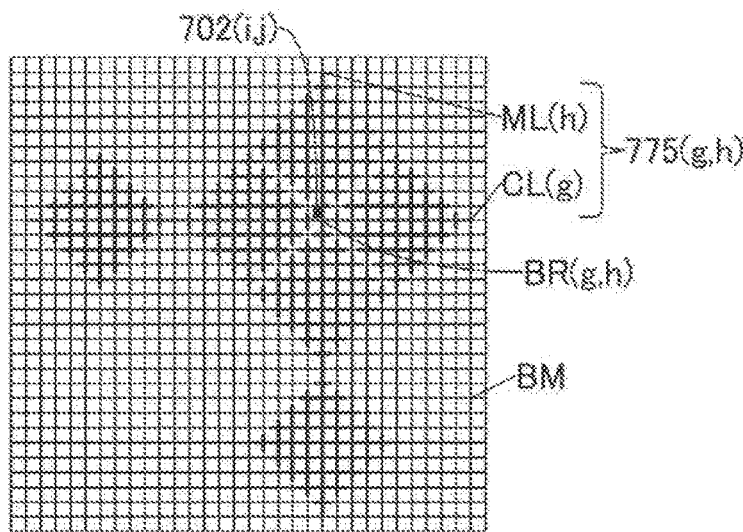
Figures 2, 7B:
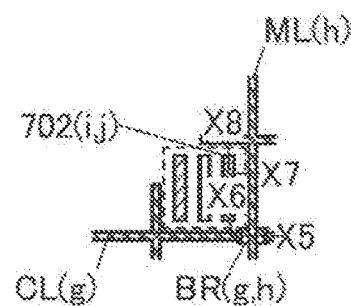

FIGS. 7A, 7B-1, and 7B-2 illustrate a structure of an input/output device of one embodiment of the present invention. FIG. 7A is a top view of the input/output device of one embodiment of the present invention. FIG. 7B-1 is a schematic view illustrating a part of an input portion of the input/output device of one embodiment of the present invention. FIG. 7B-2 is a schematic view illustrating a part of FIG. 7B-1.

Figure 8A:
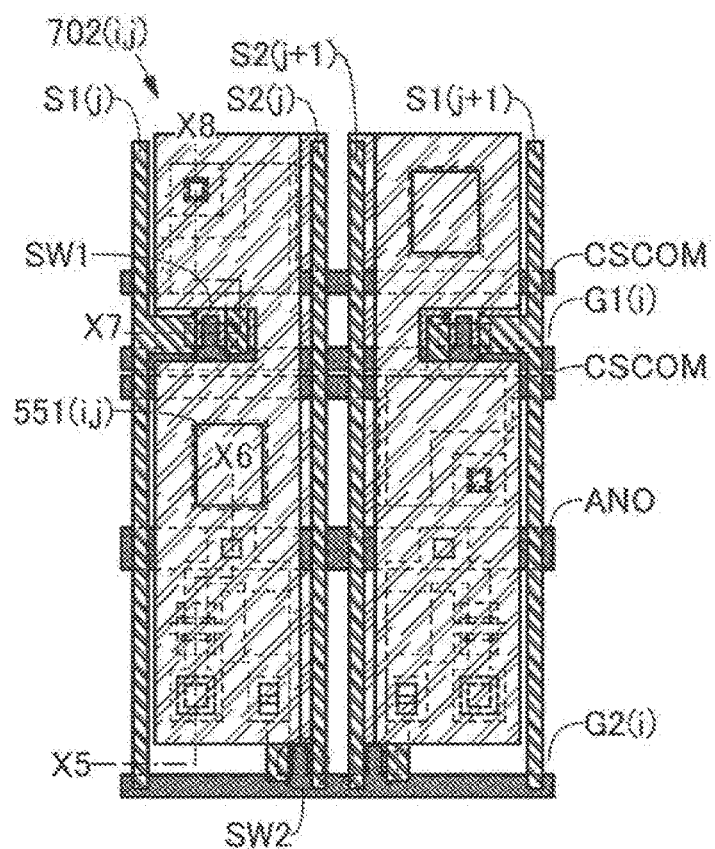
FIGS. 8A and 8B illustrate a structure of a pixel of an input/output device of one embodiment.
Figure 8B:
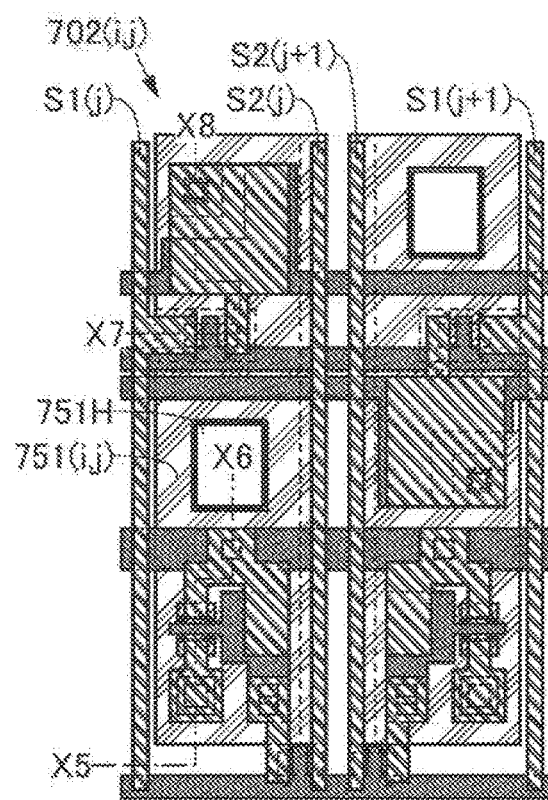

FIGS. 8A and 8B illustrate a pixel structure of the input/output device of one embodiment of the present invention. FIG. 8A is a top view of pixels of the input/output device of one embodiment of the present invention, and FIG. 8B illustrates a part of FIG. 8A.

Figure 9A:
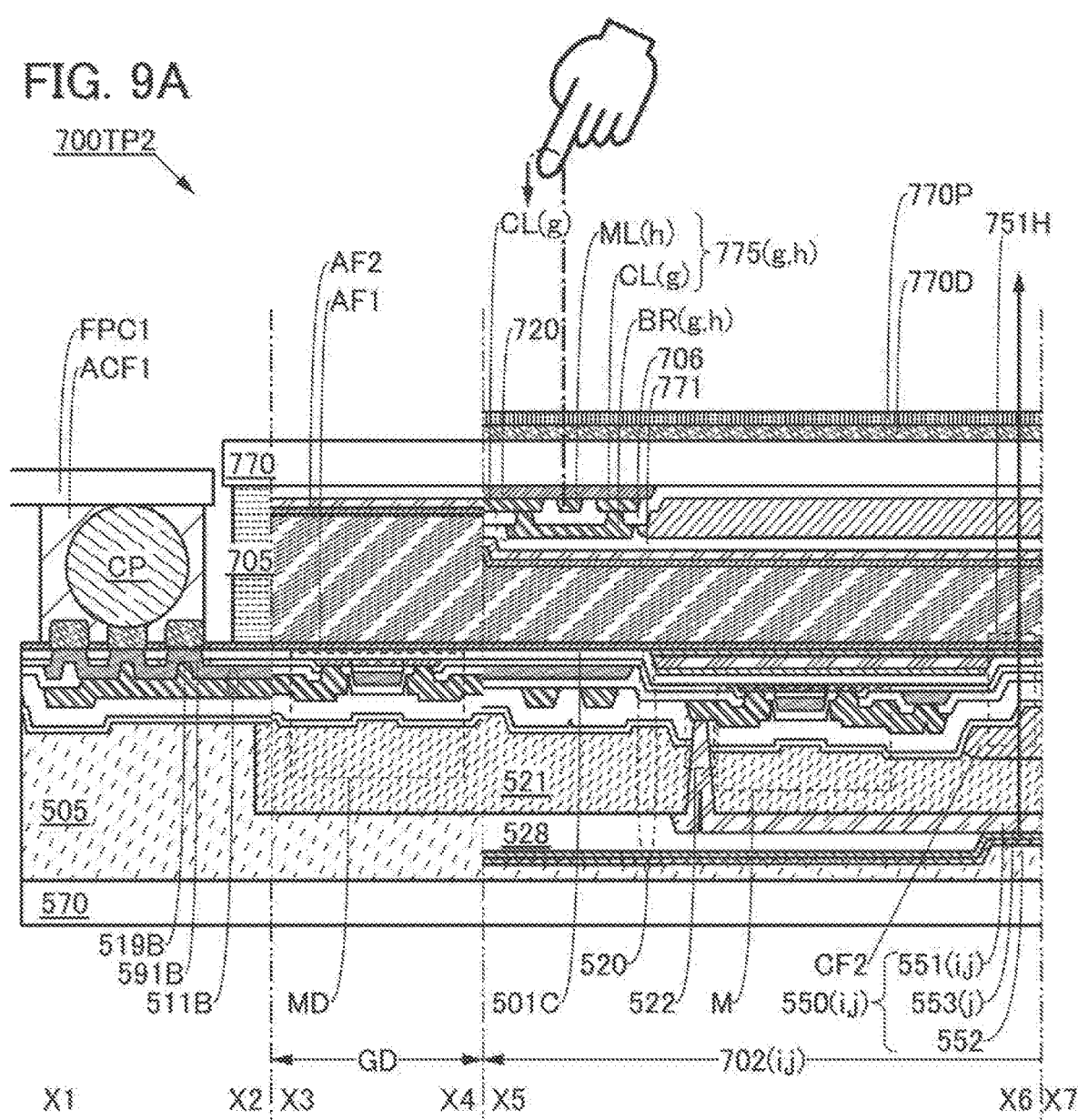
FIGS. 9A to 9C are cross-sectional views illustrating a structure of an input/output device of one embodiment.
Figure 9B:
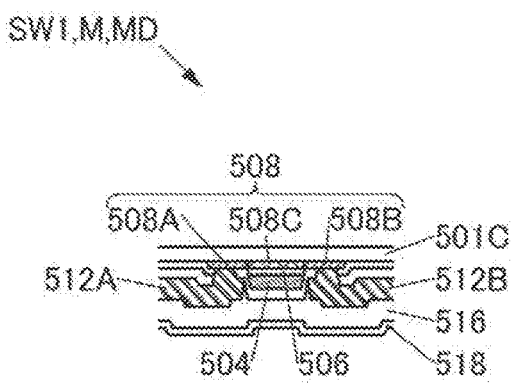
Figure 9C:
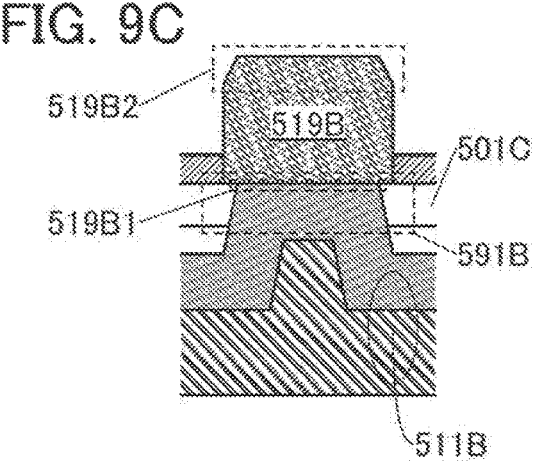

FIGS. 9A to 9C and FIG. 10 are cross-sectional views illustrating a structure of the input/output device of one embodiment of the present invention. FIG. 9A is a cross-sectional view taken along the cutting plane lines X1-X2 and X3-X4 in FIG. 7A and the cutting plane line X5-X6 in FIG. 7B-2. FIG. 9B illustrates a part of FIG. 9A. FIG. 9C is a schematic view illustrating a part of FIG. 9A.

Figure 10:
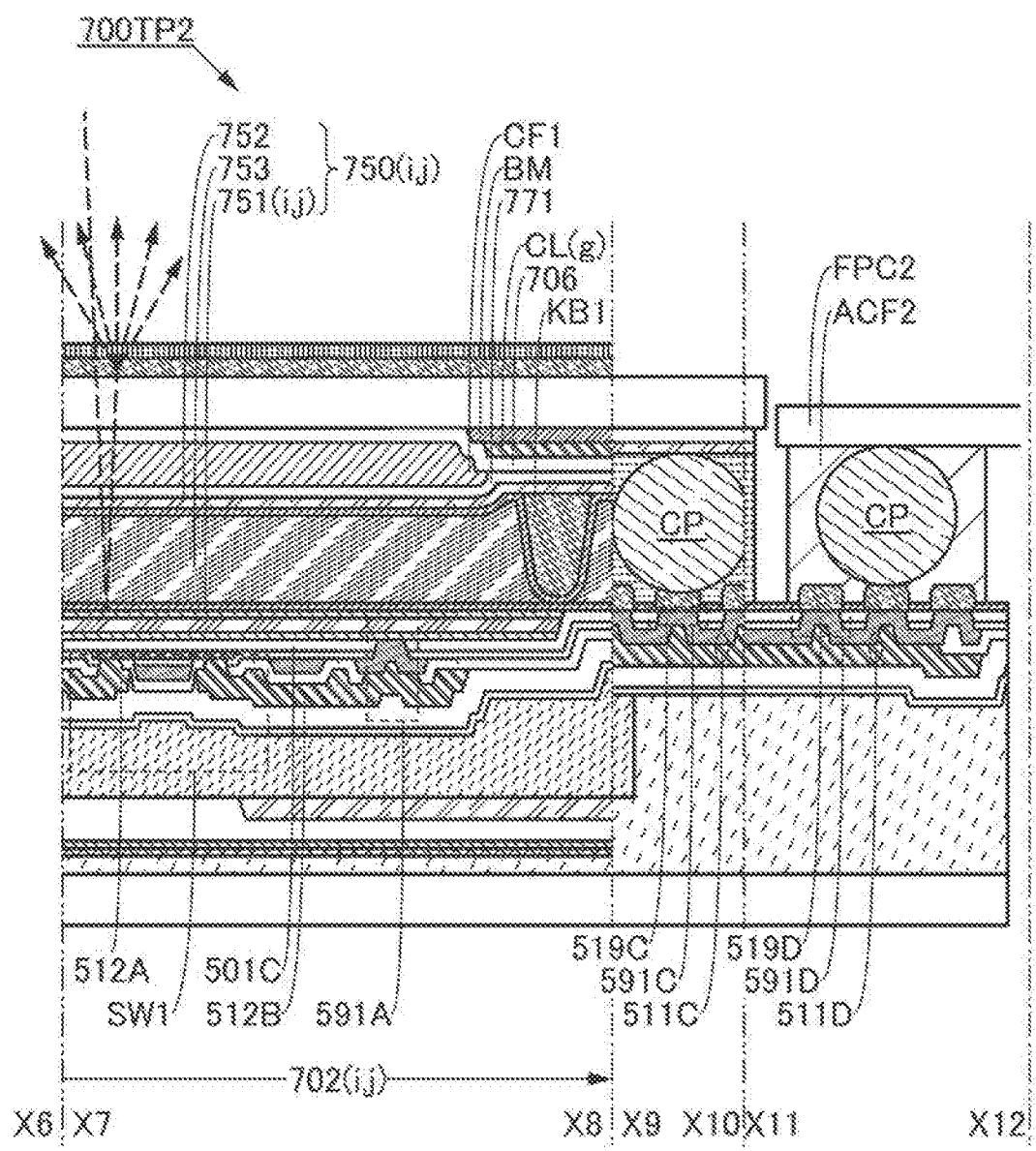
FIG. 10 is a cross-sectional view illustrating a structure of an input/output device of one embodiment.

FIG. 10 is a cross-sectional view taken along the cutting plane line X7-X8 in FIG. 7B-2 and the cutting plane lines X9-X10 and X11-X12 in FIG. 7A.

Figure 11:
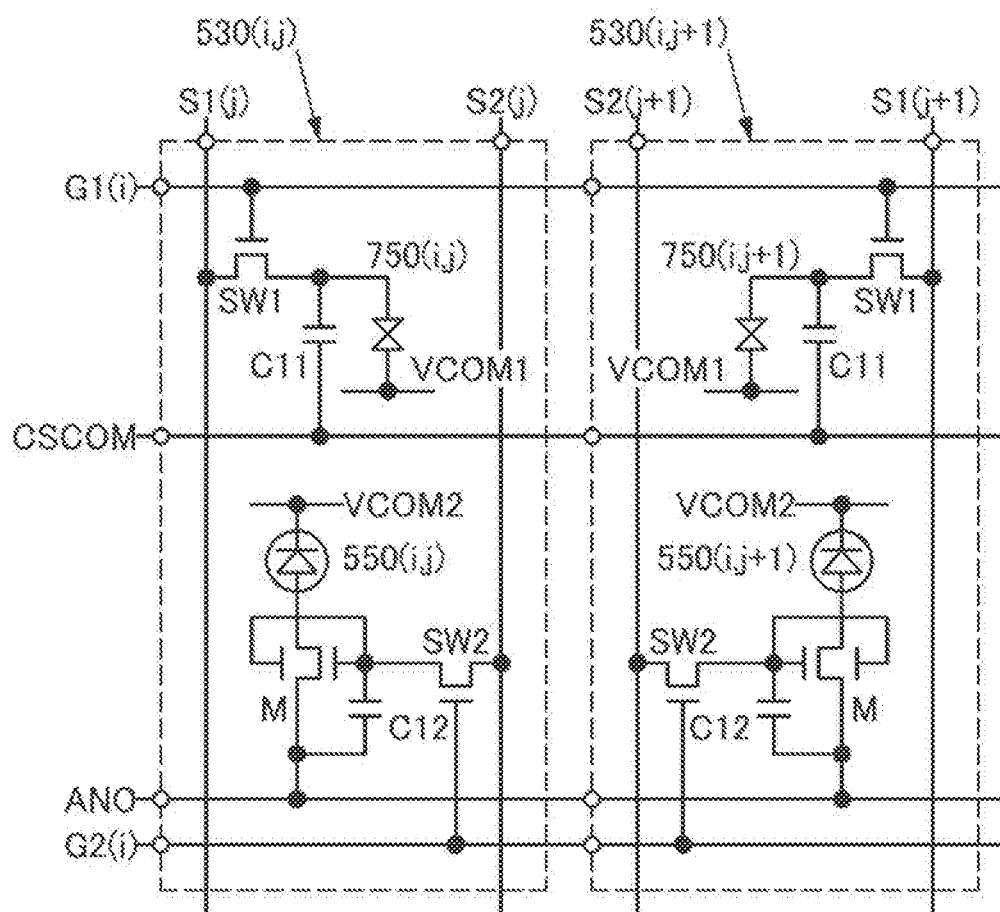
FIG. 11 is a circuit diagram illustrating a structure of a pixel circuit of an input/output device of one embodiment.

FIG. 11 is a circuit diagram illustrating a structure of pixel circuits of the input/output device of one embodiment of the present invention.

Figure 12:
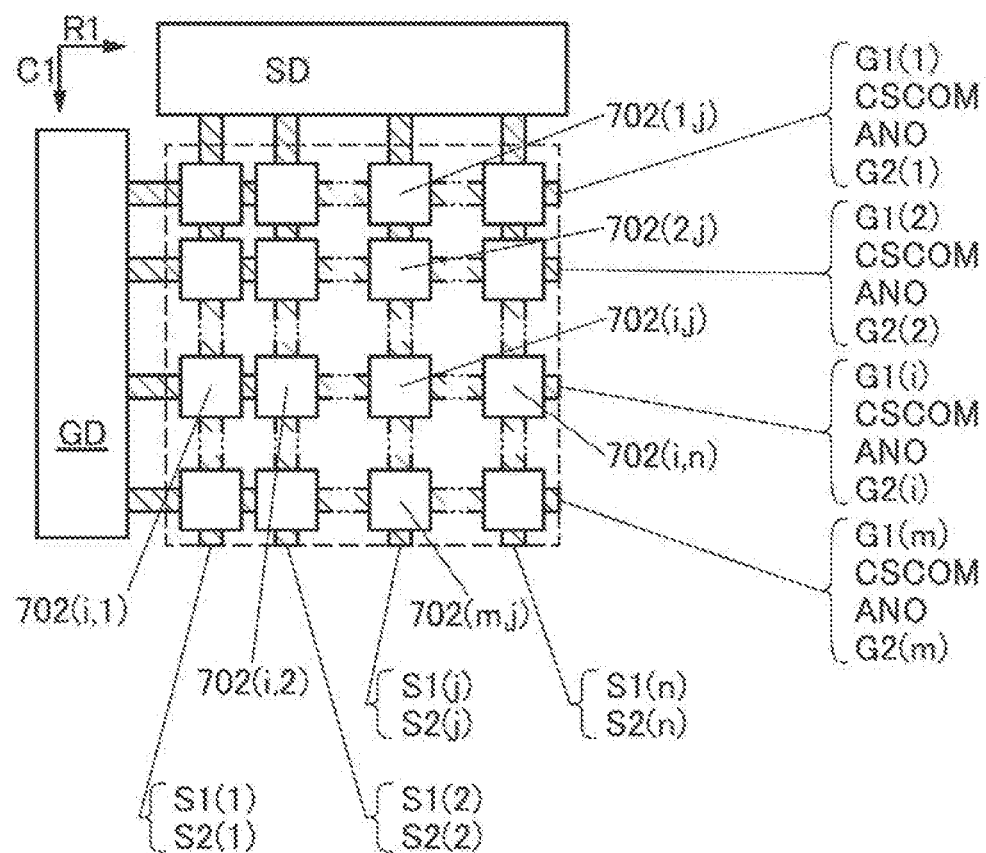
FIG. 12 is a block diagram illustrating a structure of an input/output device of one embodiment.

FIG. 12 is a block diagram illustrating a structure of the display panel included in the input/output device of one embodiment of the present invention.

Figure 13A:
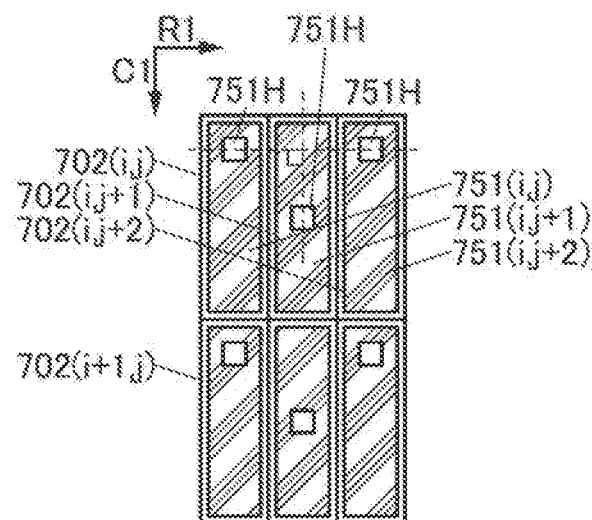
FIGS. 13A to 13C are schematic views each illustrating shapes of reflective films of a display panel of an input/output device of one embodiment.
Figure 13B:
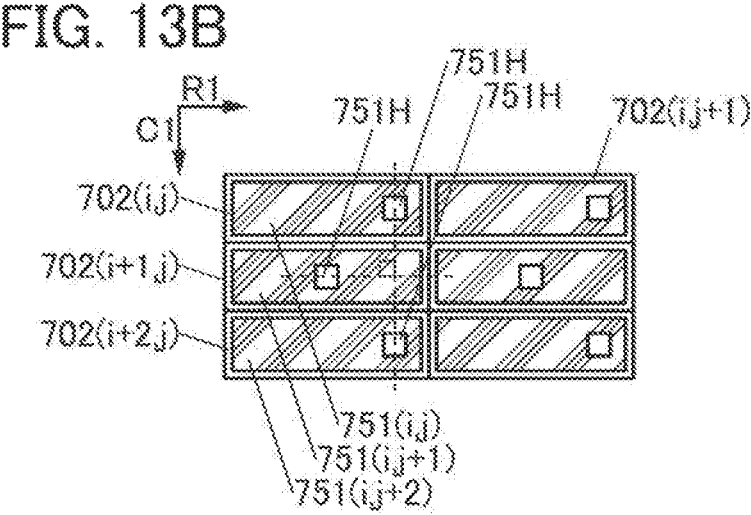
Figure 13C:
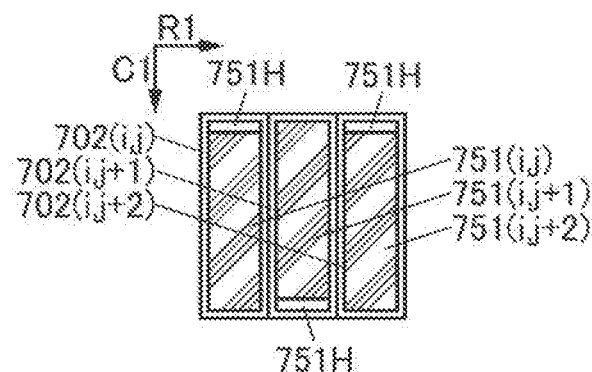

FIGS. 13A to 13C are schematic views each illustrating shapes of reflective films that can be used in pixels of the input/output device of one embodiment of the present invention.

Structure Example 1 of Input/Output Device

An input/output device 700TP2 described in this embodiment includes a display panel and an input portion (see FIGS. 7A, 7B-1, and 7B-2 or FIGS. 9A to 9C).

Structure Example of Display Panel

The display panel of the input/output device described in this embodiment includes the pixel 702(i,j), the insulating film 501C, the third conductive film 511B, and the electrode 519B (see FIG. 9A).

The insulating film 501C includes a region overlapping with the pixel 702(i,j). The insulating film 501C includes the opening portion 591B.

The third conductive film 511B is electrically connected to the pixel 702(i,j). The third conductive film 511B includes a region overlapping with the insulating film 501C. The third conductive film 511B includes a region overlapping with the opening portion 591B.

The electrode 519B is electrically connected to the third conductive film 511B. The electrode 519B includes the first region 519B1 and the second region 519B2 (see FIG. 9C).

The first region 519B1 is in contact with the third conductive film 511B. The second region 519B2 functions as a contact point. The opening portion 591B includes a region occupied by the third conductive film 511B or the electrode 519B. The third conductive film 511B or the electrode 519B that occupies a part of the opening portion 591B in the insulating film 501C can be referred to as through electrode.

In other words, the third conductive film 511B or the electrode 519B that fills a part of the opening portion 591B can be referred to as through electrode. The second region 519B2 has a shape projecting from a surface of the insulating film 501C, for example.

The insulating film 501C has a thickness larger than or equal to 0.2 μm and smaller than or equal to 1.5 μm and has a water vapor transmission rate lower than or equal to $10^{-3}$ g/($m^2$·day), preferably lower than or equal to $10^{-4}$ g/($m^2$·day), more preferably lower than or equal to $10^{-5}$ g/($m^2$·day).

The display panel of the input/output device described in this embodiment includes a first base 570 and a second base 770 (see FIG. 9A).

The first base 570 includes a region overlapping with the insulating film 501C. The second base 770 includes a region that is provided so that the insulating film 501C is positioned between the region of the second base 770 and the first base 570.

The display panel of the input/output device described in this embodiment includes the pixel, the third conductive film electrically connected to the pixel, the insulating film including the opening portion overlapping with the third conductive film, and the electrode including the first region in contact with the third conductive film and the second region functioning as a contact point. Thus, a signal, electric power, or the like can be supplied to the pixel protected by the insulating film. As a result, a novel display panel that is highly convenient or reliable can be provided.

The display panel of the input/output device described in this embodiment includes the one group of pixels 702(i,1) to 702(i,n), the other group of pixels 702(1,j) to 702(m,j), the signal line S2(j), and the scan line G2(i) (see FIG. 12). In addition, a signal line S1(j) and a scan line G1(i) are included. Note that i is an integer greater than or equal to 1 and less than or equal to m, j is an integer greater than or equal to 1 and less than or equal to n, and one of m and n is an integer greater than 1.

The one group of pixels 702(i,1) to 702(i,n) include the pixel 702(i,j). The one group of pixels 702(i,1) to 102(i,n) are arranged in a row direction (indicated by an arrow R1 in the drawing).

The other group of pixels 702(1,j) to 702(m,j) include the pixel 702(i,j). The other group of pixels 702(1,j) to 702(m,j) are arranged in a column direction (indicated by an arrow C1 in the drawing) that intersects with the row direction.

The scan line G2(i) is electrically connected to the one group of pixels 702(i,1) to 702(i,n). The scan line G1(i) is electrically connected to the one group of pixels 702(i,1) to 702(i,n).

The other group of pixels 702(1,j) to 702(m,j) are electrically connected to the signal line S2(j). The other group of pixels 702(1,j) to 702(m,j) are electrically connected to the signal line S1(j).

The scan line G2(i) or the signal line S2(j) is electrically connected to the third conductive film 511B. The scan line G1(i) or the signal line S1(j) is electrically connected to the third conductive film 511B.

The display panel of the input/output device described in this embodiment includes the driver circuit SD (see FIG. 12). The driver circuit SD has a function of supplying an image signal. The driver circuit SD is electrically connected to the second region 519B2. The signal line S2(j) is electrically connected to the third conductive film 511B. The signal line S1(j) is electrically connected to the third conductive film 511B.

The pixel 702(i,j) of the display panel of the input/output device described in this embodiment includes the pixel circuit 530(i,j), a first conductive film, a first display element 750(i,j), and a second display element 550(i,j).

The pixel circuit 530(i,j) is electrically connected to the signal line S2(j) (see FIG. 9A or FIG. 11). The pixel circuit 530(i,j) is also electrically connected to the signal line S1(j).

The first conductive film includes a region overlapping with a second conductive film. For example, the first conductive film can be used for a first electrode 751(i,j) of the first display element 750(i,j). The conductive film 512B functioning as a source electrode or a drain electrode of a transistor used as a switch SW1 of the pixel circuit 530(i,j) can be used for the second conductive film (see FIG. 9A and FIG. 10).

The first conductive film includes a region that is provided so that the insulating film 501C is positioned between the region and the second conductive film. The first conductive film includes a region that is provided so that the opening portion 591A is positioned between the region and the second conductive film. The first conductive film is electrically connected to the second conductive film in the opening portion 591A. The first electrode 751(i,j) is electrically connected to the conductive film 512B, for example. Note that the first conductive film electrically connected to the second conductive film in the opening portion 591A that is formed in the insulating film 501C can be referred to as through electrode. In other words, the first conductive film that fills a part of the opening portion 591A can be referred to as through electrode.

The first display element 750(i,j) is electrically connected to the first conductive film, and the second display element 550(i,j) is electrically connected to the pixel circuit 530(i,j).

The first display element 750(i,j) includes a reflective film and has a function of controlling the intensity of light reflected by the reflective film. Note that the first conductive film, the first electrode 751(i,j), or the like can be used as the reflective film of the first display element 750(i,j).

The second display element 550(i,j) has a function of emitting light toward the insulating film 501C (see FIG. 9A).

The reflective film has shape including a region that does not block light emitted from the second display element 550(i,j). For example, the reflective film includes one opening portion 751H or a plurality of opening portions 751H (see FIGS. 13A to 13C).

The second display element 550(i,j) has a function of emitting light toward the opening portion 751H. Note that light emitted from the second display element 550(i,j) passes through the opening portion 751H.

Thus, the first display element and the second display element that displays an image using a method different from that of the first display element can be driven using a pixel circuit that can be formed in one process. Specifically, a reflective display element is used as the first display element, whereby the power consumption can be reduced. In addition, an image with high contrast can be favorably displayed in an environment with bright external light. In addition, the second display element that emits light is used, whereby an image can be favorably displayed in a dark environment. Furthermore, using the insulating film, impurity diffusion between the first display element and the second display element or between the first display element and the pixel circuit can be suppressed. Moreover, part of light emitted from the second display element to which a voltage controlled on the basis of the control data is supplied is not blocked by the reflective film included in the first display element. Consequently, a novel display panel that is highly convenient or reliable can be provided.

The opening portion 751H of the pixel 702(i,j+1) which is adjacent to the pixel 702(i,j), is not provided on a line that extends in the row direction (the direction indicated by an arrow R1 in the drawing) through the opening portion 751H of the pixel 702(i,j) (see FIG. 13A). Alternatively, for example, the opening portion 751H of the pixel 702(i+1,j), which is adjacent to the pixel 702(i,j), is not provided on a line that extends in the column direction (the direction indicated by an arrow C1 in the drawing) through the opening portion 751H of the pixel 702(i,j) (see FIG. 13B).

For example, the opening portion 751H of the pixel 702(i,j+2) is provided on a line that extends in the row direction through the opening portion 751H of the pixel 702(i,j) (see FIG. 13A). In addition, the opening portion 751H of the pixel 702(i,j+1) is provided on a line that is perpendicular to the above-mentioned line between the opening portion 751H of the pixel 702(i,j) and the opening portion 751H of the pixel 702(i,j+2).

Alternatively, for example, the opening portion 751H of the pixel 702(i+2,j) is provided on a line that extends in the column direction through the opening portion 751H of the pixel 702(i,j) (see FIG. 13B). In addition, for example, the opening portion 751H of the pixel 702(i+1,j) is provided on a line that is perpendicular to the above-mentioned line between the opening portion 751H of the pixel 702(i,j) and the opening portion 751H of the pixel 702(i+2,j).

Thus, for example, a second display element that displays a color different from that displayed by the second display element provided in the pixel 702(i,j) can be provided easily in the pixel 702(i+1,j) adjacent to the pixel 702(i,j). As a result, a novel display panel that is highly convenient or reliable can be provided.

For example, the reflective film can be formed using a material having a shape in which an end portion is cut off so as to form a region 751E that does not block light emitted from the second display element 550(i,j) (see FIG. 13C). Specifically, the first electrode 751(i,j) whose end portion is cut off so as to be shorter in the column direction (the direction indicated by an arrow C1 in the drawing) can be used as the reflective film.

The second display element 550(i,j) of the display panel of the input/output device described in this embodiment is provided so that the display using the second display element 550(i,j) can be seen from part of a region from which the display using the first display element 750(i,j) can be seen. For example, dashed arrows shown in FIG. 10 denote the directions in which external light is incident on and reflected by the first display element 750(i,j) that performs display by controlling the intensity of external light reflection. In addition, a solid arrow shown in FIG. 9A denotes the direction in which the second display element 550(i,j) emits light to the part of the region from which the display using the first display element 750(i,j) can be seen.

Thus, the display using the second display element can be seen from part of the region from which the display using the first display element can be seen. Alternatively, a user can view the display without changing the attitude or the like of the display panel. Thus, a novel display panel that is highly convenient or reliable can be provided.

The pixel circuit 530(i,j) is electrically connected to the signal line S1(j). Note that the conductive film 512A is electrically connected to the signal line S1(j) (see FIG. 10 and FIG. 11). Furthermore, for example, the transistor in which the second conductive film is used as the conductive film 512B serving as a source electrode or a drain electrode can be used as the switch SW1 of the pixel circuit 530($i,j$).

The display panel described in this embodiment includes the scan line G2($i$), the wiring CSCOM, the conductive film ANO, and the signal line S2($j$) (see FIG. 11).

The second display element 550($i,j$) of the display panel described in this embodiment includes the third electrode 551($i,j$), the fourth electrode 552, and the layer 553($j$) containing a light-emitting material (see FIG. 9A).

The fourth electrode 552 includes a region overlapping with the third electrode 551($i,j$).

The layer 553($j$) containing a light-emitting material includes a region positioned between the third electrode 551($i,j$) and the fourth electrode 552.

The third electrode 551($i,j$) is electrically connected to the pixel circuit 530($i,j$) at the connection portion 522.

The first display element 750($i,j$) of the display panel described in this embodiment includes a layer 753 containing a liquid crystal material, the first electrode 751($i,j$), and a second electrode 752. The second electrode 752 is positioned such that an electric field which controls the alignment of the liquid crystal material is generated between the second electrode 752 and the first electrode 751($i,j$) (see FIG. 9A and FIG. 10).

The display panel described in this embodiment includes an alignment film AF1 and an alignment film AF2. The alignment film AF2 is provided such that the layer 753 containing a liquid crystal material is interposed between the alignment film AF1 and the alignment film AF2.

The display panel described in this embodiment includes the light-blocking film BM, the insulating film 771, the functional film 770P, and a functional film 770D. In addition, the coloring film CF1 and a coloring film CF2 are included.

The light-blocking film BM has an opening portion in a region overlapping with the first display element 750($i,j$). The coloring film CF2 includes a region provided between the insulating film 501C and the second display element 550($i,j$) and includes a region overlapping with the opening portion 751H (see FIG. 9A).

The insulating film 771 includes a region positioned between the coloring film CF1 and the layer 753 containing a liquid crystal material or between the light-blocking film BM and the layer 753 containing a liquid crystal material. Thus, unevenness due to the thickness of the coloring film CF1 can be avoided. Alternatively, impurities can be prevented from being diffused from the light blocking film BM, the coloring film CF1, or the like to the layer 753 containing a liquid crystal material.

The functional film 770P includes a region overlapping with the first display element 750($i,j$).

The functional film 770D includes a region overlapping with the first display element 750($i,j$). The functional film 770D is provided so that the base 770 lies between the functional film 770D and the first display element 750($i,j$). This can diffuse light reflected by the first display element 750($i,j$), for example.

The display panel described in this embodiment includes the base 570, the base 770, and the functional layer 520.

The base 770 includes a region overlapping with the base 570.

The functional layer 520 includes a region positioned between the base 570 and the base 770. The functional layer 520 includes the pixel circuit 530($i,j$), the second display element 550($i,j$), the insulating film 521, and the insulating film 528. The functional layer 520 includes the insulating film 518 and the insulating film 516 (see FIGS. 9A and 9B).

The insulating film 521 includes a region positioned between the pixel circuit 530($i,j$) and the second display element 550($i,j$).

The insulating film 528 includes a region positioned between the insulating film 521 and the base 570 and has an opening portion in a region overlapping with the second display element 550($i,j$).

The insulating film 528 formed along the periphery of the third electrode 551($i,j$) can prevent a short circuit between the third electrode 551($i,j$) and the fourth electrode.

The insulating film 518 includes a region positioned between the insulating film 521 and the pixel circuit 530($i,j$). The insulating film 516 includes a region positioned between the insulating film 518 and the pixel circuit 530($i,j$).

The display panel described in this embodiment also includes a bonding layer 505, a sealing material 705, and a structure body KB1.

The bonding layer 505 includes a region positioned between the functional layer 520 and the base 570, and has a function of bonding the functional layer 520 and the base 570 together.

The sealing material 705 includes a region positioned between the functional layer 520 and the base 770, and has a function of bonding the functional layer 520 and the base 770 together.

The structure body KB1 has a function of providing a certain space between the functional layer 520 and the base 770.

The display panel described in this embodiment includes the electrode 519B and the electrode 519C.

The electrode 519B is in contact with the conductive film 511B. The electrode 519B is electrically connected to the signal line S1($j$), for example.

The electrode 519C is in contact with the conductive film 511C. The conductive film 511C is electrically connected to the wiring VCOM1, for example.

The conductive material CP is positioned between the electrode 519C and the second electrode 752, and has a function of electrically connecting the electrode 519C to the second electrode 752. For example, a conductive particle can be used as the conductive material CP.

Moreover, the display panel described in this embodiment includes the driver circuit GD and the driver circuit SD (see FIGS. 7A, 7B-1, and 7B-2 or FIG. 12).

The driver circuit GD is electrically connected to the scan line G1($i$). The driver circuit GD includes the transistor MD, for example (see FIG. 9A). Specifically, a transistor including a semiconductor film that can be formed in the same process as the semiconductor film of the transistor included in the pixel circuit 530($i,j$) can be used as the transistor MD.

The driver circuit SD is electrically connected to the signal line S1($j$). The driver circuit SD is electrically connected to the electrode 519B, for example.

Structure Example of Input Portion

Note that the input portion described in this embodiment is different from the input portion of the input/output device, which is described with reference to FIGS. 1A, 1B-1, 1B-2, and 1C, FIGS. 2A and 2B, FIGS. 3A to 3C, FIG. 4, FIG. 5 and FIGS. 6A and 6B, in that: the electrode C(g) is provided with an opening portion in a region overlapping with a pixel; the electrode M(h) is provided with an opening portion in a region overlapping with the pixel; a conductive film 511D electrically connected to the control line CL(g) or the sensing signal line M(h) is included; and an electrode 519D electrically connected to the conductive film 511D is included. Different structures will be described in detail below, and the above description is referred to for the other similar structures.

In the input/output device described in this embodiment, the control line CL(g) is electrically connected to the electrode C(g) provided with the opening portion, and the sensing signal line ML(h) is electrically connected to the electrode ML(h) provided with the opening portion. The opening portions include the regions overlapping with the pixel. For example, an opening portion of a conductive film included in the control line CL(g) includes a region overlapping with the pixel 702(i,j) (see FIGS. 7B-1 and 7B-2 and FIG. 9A).

In the input/output device described in this embodiment, the gap between the control line CL(g) and the second electrode 752 or between the sensing signal line ML(h) and the second electrode 752 is greater than or equal to 0.2 μm and less than or equal to 16 μm, preferably greater than or equal to 1 μm and less than or equal to 8 μm, and further preferably greater than or equal to 2.5 μm and less than or equal to 4 μm.

The input/output device of one embodiment of the present invention includes the first electrode provided with the opening portion in the region overlapping with the pixel and the second electrode provided with the opening portion in the region overlapping with the pixel. Accordingly, an object that approaches a region overlapping with the display panel can be sensed without disturbing display of the display panel. Furthermore, the thickness of the input/output device can be reduced. As a result, a novel input/output device that is highly convenient or reliable can be provided.

In the input portion of the input/output device described in this embodiment, the functional layer 720 is provided in the region surrounded by the base 770, the insulating film 501C, and the sealing material 705. Thus, the input/output device can be formed without using the base 710 and the bonding layer 709.

The input/output device described in this embodiment includes the conductive film 511D (see FIG. 10).

Note that the conductive material CP or the like can be provided between the control line CL(g) and the conductive film 511D to electrically connect the control line CL(g) to the conductive film 511D. Alternatively, the conductive material CP or the like can be provided between the sensing signal line ML(h) and the conductive film 511D to electrically connect the sensing signal line ML(h) to the conductive film 511D.

The input/output device described in this embodiment includes the electrode 519D electrically connected to the conductive film 511D. The electrode 519D is electrically connected to the conductive film 511D (see FIG. 10). The electrode 519D includes a first region and a second region. The first region is in contact with the conductive film 511D, and the second region functions as a contact point. An opening portion 591D includes a region occupied by the conductive film 511D or the electrode 519D. The second region has a shape projecting from the surface of the insulating film 501C, for example.

Note that the electrode 519D can be electrically connected to the flexible printed circuit FPC2 using the conductive material ACF2, for example. Accordingly, a control signal can be supplied to the control line CL(g) using the electrode 519D, or a sensing signal can be supplied from the sensing signal line ML(h) using the electrode 519D, for example.

Structure Example

The input/output device of one embodiment of the present invention includes the display panel or the input portion.

The display panel of one embodiment of the present invention includes the base 570, the base 770, the functional layer 520, the structure body KB1, the sealing material 705, or the bonding layer 505.

The display panel of one embodiment of the present invention includes the signal line S1(j), the signal line S2(j), the scan line G1(i), the scan line G2(i), the wiring CSCOM, or the conductive film ANO.

The display panel of one embodiment of the present invention includes the first conductive film or the second conductive film.

The display panel of one embodiment of the present invention includes the electrode 519B, the electrode 519C, the conductive film 511B, or the conductive film 511C.

The display panel of one embodiment of the present invention includes the pixel circuit 530(i,j) or the switch SW1.

The display panel of one embodiment of the present invention includes the first display element 750(i,j), the first electrode 751(i,j), the reflective film, the opening portion, the layer 753 containing a liquid crystal material, or the second electrode 752.

The display panel of one embodiment of the present invention includes the alignment film AF1, the alignment film AF2, the coloring film CF1, the coloring film CF2, the light-blocking film BM, the insulating film 771, the functional film 770P, or the functional film 770D.

In addition, the display panel of one embodiment of the present invention includes the second display element 550(i,j), the third electrode 551(i,j), the fourth electrode 552, or the layer 553(j) containing a light-emitting material.

The display panel of one embodiment of the present invention includes the insulating film 501C.

The display panel of one embodiment of the present invention includes the driver circuit GD or the driver circuit SD.

The input portion includes the base 710, the functional layer 720, the bonding layer 709, and the terminal 719 (see FIG. 4 and FIG. 5).

The functional layer 720 includes a region positioned between the base 770 and the base 710. The functional layer 720 includes the sensing element 775(g,h) and the insulating film 706.

The bonding layer 709 includes a region positioned between the functional layer 720 and the base 770, and has a function of bonding the functional layer 720 to the base 770 together.

The terminal 719 is electrically connected to the sensing element 775(g,h).

Base 570

The base 570 or the like can be formed using a material having heat resistance high enough to withstand heat treatment in the manufacturing process. For example, the material that can be used for the base 510L or the like described in Embodiment 1 can be used.

Base 770

For example, a light-transmitting material can be used for the base 770. Specifically, a material selected from the materials that can be used for the base 570 can be used for the base 770.

Sealing Material 705

For the sealing material 705 or the like, an inorganic material, an organic material, a composite material of an inorganic material and an organic material, or the like can be used. For example, the material that can be used for the bonding layer 709 or the like described in Embodiment 1 can be used.

Insulating Film 521

For example, an insulating inorganic material, an insulating organic material, or an insulating composite material containing an inorganic material and an organic material can be used for the insulating film 521 or the like. For example, the material that can be used for the insulating film 521 or the like described in Embodiment 1 can be used.

Insulating Film 528

For example, any of the materials that can be used for the insulating film 521 can be used for the insulating film 528 or the like. Specifically, a 1-μm-thick polyimide-containing film can be used as the insulating film 528.

Insulating Film 501C

For example, any of the materials that can be used for the insulating film 521 can be used for the insulating film 501C. Specifically, a material containing silicon and oxygen can be used for the insulating film 501C. Thus, diffusion of impurities into the pixel circuit, the second display element 550($i,j$), or the like can be suppressed.

For example, a 200-nm-thick film containing silicon, oxygen, and nitrogen can be used as the insulating film 501C.

Wiring, Electrode, Terminal, and Conductive Film

A conductive material can be used for the wiring or the like. Specifically, the conductive material can be used for the signal line S1($j$), the signal line S2($j$), the scan line G1($i$), the scan line G2($i$), the wiring CSCOM, the conductive film ANO, the electrode 519B, the electrode 519C, the terminal 719, the conductive film 511B, the conductive film 511C, the conductive film 511D, or the like. For example, the material that can be used for the wiring or the like described in Embodiment 1 can be used.

Pixel Circuit 530($i,j$)

The pixel circuit 530($i,j$) is electrically connected to the signal line S1($j$), the signal line S2($j$), the scan line G1($i$), the scan line G2($i$), the wiring CSCOM, and the conductive film ANO (see FIG. 11).

The pixel circuit 530($i,j$) includes the switch SW1 and a capacitor C11.

The pixel circuit 530($i,j$) includes the switch SW2, the transistor M, and the capacitor C12.

For example, a transistor including a gate electrode electrically connected to the scan line G1($i$) and a first electrode electrically connected to the signal line S1($j$) can be used as the switch SW1.

The capacitor C11 includes a first electrode electrically connected to a second electrode of the transistor used as the switch SW1 and a second electrode electrically connected to the wiring CSCOM.

For example, a transistor including a gate electrode electrically connected to the scan line G2($i$) and a first electrode electrically connected to the signal line S2($j$) can be used as the switch SW2.

The transistor M includes a gate electrode electrically connected to the second electrode of the transistor used as the switch SW2 and includes a first electrode electrically connected to the conductive film ANO.

Note that a transistor including a conductive film including a region positioned so that a semiconductor film is positioned between the region and a gate electrode can be used as the transistor M. For example, as the conductive film, a conductive film electrically connected to a wiring that can supply the same potential as that of the gate electrode of the transistor M can be used.

The capacitor C12 includes a first electrode electrically connected to a second electrode of the transistor used as the switch SW2 and a second electrode electrically connected to the first electrode of the transistor M.

The first electrode and the second electrode of the first display element 750($i,j$) are electrically connected to the second electrode of the transistor used as the switch SW1 and the wiring VCOM1, respectively. This enables the first display element 750 to be driven.

Furthermore, the third electrode and the fourth electrode of the second display element 550($i,j$) are electrically connected to the second electrode of the transistor M and the fourth conductive film VCOM2, respectively. This enables the second display element 550($i,j$) to be driven.

Switch SW1, Switch SW2, Transistor M, and Transistor MD

For example, a bottom-gate or top-gate transistor or the like can be used as the switch SW1, the switch SW2, the transistor M, the transistor MD, or the like.

For example, a transistor including a semiconductor containing an element belonging to Group 14 in a semiconductor film can be used. Specifically, a semiconductor containing silicon can be used for a semiconductor film. For example, a transistor including single crystal silicon, polysilicon, microcrystalline silicon, amorphous silicon, or the like in a semiconductor film can be used.

For example, a transistor including an oxide semiconductor in a semiconductor film can be used. Specifically, an oxide semiconductor containing indium or an oxide semiconductor containing indium, gallium, and zinc can be used for a semiconductor film.

For example, a transistor whose leakage current in an off state is smaller than that of a transistor including amorphous silicon in a semiconductor film can be used as the switch SW1, the switch SW2, the transistor M, the transistor MD, or the like. Specifically, a transistor including an oxide semiconductor in the semiconductor film 508 can be used as the switch SW1, the switch SW2, the transistor M, the transistor MD, or the like.

Thus, a pixel circuit can hold an image signal for a longer time than a pixel circuit including a transistor that uses amorphous silicon for a semiconductor film. Specifically, a selection signal can be supplied at a frequency of lower than 30 Hz, preferably lower than 1 Hz, further preferably less than once per minute while flickering is suppressed. Consequently, eyestrain on a user of the data processing device can be reduced, and power consumption for driving can be reduced.

A transistor that can be used for the switch SW1, the transistor M, and the transistor MD include the conductive film 504 having a region overlapping with the insulating film 501C and the semiconductor film 508 having a region located between the insulating film 501C and the conductive film 504. Note that the conductive film 504 functions as a gate electrode (see FIG. 9B).

The semiconductor film 508 includes a first region 508A, a second region 508B, and a third region 508C. The first region 508A and the second region 508B do not overlap with the conductive film 504. The third region 508C is positioned between the first region 508A and the second region 508B and overlaps with the conductive film 504.

A transistor that can be used for the switch SW1, the transistor M, and the transistor MD include the insulating film 506 between the third region 508C and the conductive film 504. Note that the insulating film 506 functions as a gate insulating film.

The first region 508A and the second region 508B have a lower resistivity than the third region 508C, and function as a source region and a drain region.

Note that, for example, the method for controlling the resistivity of an oxide semiconductor film, which is described in detail in Embodiment 1, can be used to form the first region 508A and the second region 508B in the semiconductor film 508. Specifically, plasma treatment using a gas containing a rare gas can be used.

For example, the conductive film 504 can be used as a mask. The use of the conductive film 504 as a mask allows the shape of part of the third region 508C to be self-aligned with the shape of an end of the conductive film 504.

A transistor that can be used for the switch SW1, the transistor M, and the transistor MD include the conductive film 512A in contact with the first region 508A and the conductive film 512B in contact with the second region 508B. The conductive film 512A and the conductive film 512B function as a source electrode and a drain electrode.

A transistor that can be used for the switch SW1, the transistor M, and the transistor MD can be formed in the same step.

Light-Blocking Film BM

The light-blocking film BM can be formed of a material that prevents light transmission and can thus be used as a black matrix, for example.

Insulating Film 771

The insulating film 771 can be formed of polyimide, an epoxy resin, an acrylic resin, or the like, for example.

Functional Films 770P and 770D

For example, an anti-reflection film, a polarizing film, a retardation film, a light diffusion film, a condensing film, or the like can be used as the functional film 770P or the functional film 770D.

Specifically, a film containing a dichromatic pigment can be used as the functional film 770P or the functional film 770D. Furthermore, a material having a pillar-shaped structure with an axis in a direction that intersects with a surface of the base can be used as the functional film 770P or the functional film 770D. This makes it easy to transmit light in a direction along the axis and to scatter light in the other directions.

Alternatively, an antistatic film preventing the attachment of a foreign substance, a water repellent film suppressing the attachment of stain, a hard coat film suppressing a scratch in use, or the like can be used as the functional film 770P.

Specifically, a circularly polarizing film can be used as the functional film 770P. Furthermore, a light diffusion film can be used as the functional film 770D.

Second Display Element 550(i,j)

For example, the second display element 550(i,j) can be a light-emitting element. Specifically, a display element that can be used as the display element 550(i,j) or the like described in Embodiment 1 can be used.

Driver Circuit GD

Any of a variety of sequential circuits, such as a shift register, can be used as the driver circuit GD. For example, the transistor MD, a capacitor, and the like can be used in the driver circuit GD. Specifically, a transistor that includes a semiconductor film and can be formed in the same process as the transistor M can be used. For example, a transistor having the same structure as the transistor M can be used as the transistor MD. Alternatively, a transistor having a structure different from that of the transistor M can be used as the transistor MD.

Driver Circuit SD

The driver circuit SD has a function of supplying an image signal. For example, any of a variety of sequential circuits, such as a shift register, can be used as the driver circuit SD. Specifically, an integrated circuit formed over a silicon substrate can be used as the driver circuit SD.

For example, the driver circuit SD can be mounted on the electrode 519B by a chip on glass (COG) method. Specifically, an anisotropic conductive film can be used to mount an integrated circuit on the electrode 519B. Alternatively, a chip on film (COF) may be used to mount an integrated circuit on the electrode 519B.

Note that this embodiment can be combined with any of the other embodiments in this specification as appropriate.

Embodiment 3

In this embodiment, a method for manufacturing an input/output device of one embodiment of the present invention will be described with reference to FIGS. 14 to 22.

Figure 14:
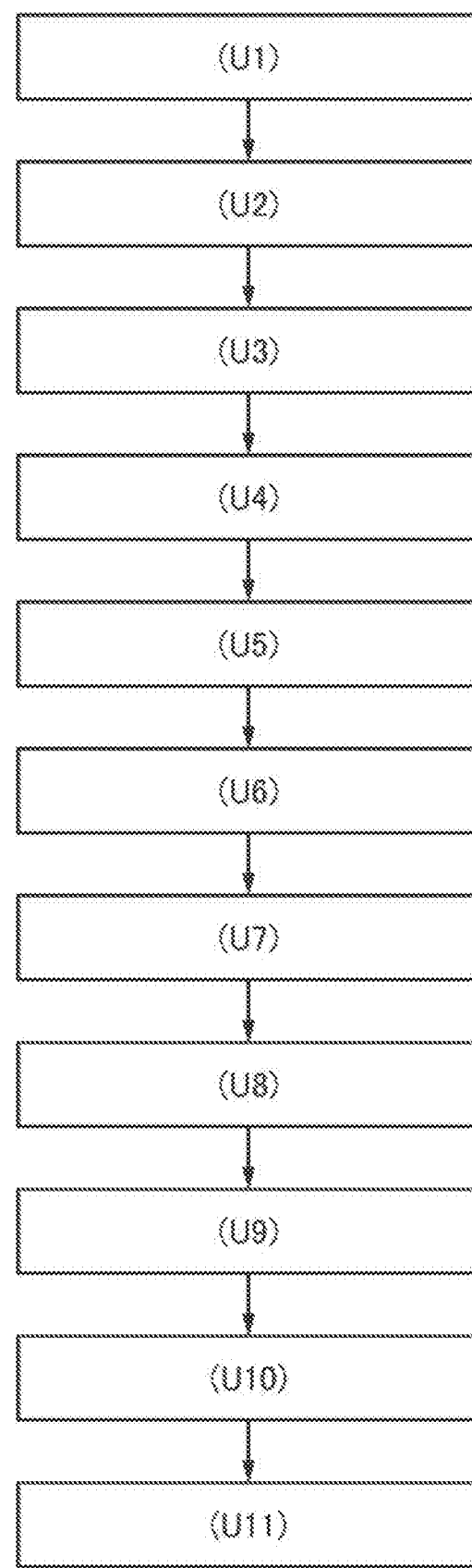
FIG. 14 is a flow chart illustrating a method for manufacturing an input/output device of one embodiment.

FIG. 14 is a flow chart showing the method for manufacturing the input/output device of one embodiment of the present invention.

FIGS. 15A to 22 illustrate structures of the display panel of one embodiment of the present invention in the manufacturing process. FIGS. 15A to 15C, FIGS. 17A to 17D, FIGS. 19A and 19B, and FIG. 21 are cross-sectional views taken along the cutting plane lines X1-X2, X3-X4, and X5-X6 in FIG. 1A. FIGS. 16A to 16C, FIGS. 18A to 18C, FIGS. 20A and 20B, and FIG. 22 are cross-sectional views taken along the cutting plane lines X7-X8, X9-X10, and X11-X12 in FIG. 1A. Note that a part of FIG. 17C is shown in FIG. 17D.

Method 1 for Manufacturing Input/Output Device

A method for manufacturing the input/output device described in this embodiment includes the following 11 steps (see FIG. 14).

First Step

In a first step, a separation film 510W is formed over a process substrate 510 (see U1 in FIG. 14).

For the separation film 510W, an inorganic material, an organic resin, or the like can be used, for example.

For example, a single-layer material or a layered material including a plurality of films can be used for the separation film 510W.

Specifically, an inorganic material such as a metal containing an element selected from tungsten, molybdenum, titanium, tantalum, niobium, nickel, cobalt, zirconium, zinc, ruthenium, rhodium, palladium, osmium, iridium, and silicon, an alloy including any of the elements, or a compound including any of the elements can be used for the separation film 510W.

A film containing tungsten or a material obtained by stacking a film containing tungsten and a film containing an oxide of tungsten can be used for the separation film 510W.

A film containing an oxide of tungsten can be formed using a method in which a film is stacked on a film containing tungsten. Specifically, a film containing silicon and oxygen is stacked on the film containing tungsten. For example, the film containing silicon and oxygen is stacked on the film containing tungsten with the use of a gas containing nitrous oxide ($N_2O$).

A surface of a film containing tungsten can be subjected to any of a variety of treatments to form a film containing an oxide of tungsten. For example, thermal oxidation treatment, oxygen plasma treatment, nitrous oxide ($N_2O$) plasma treatment, treatment using a solution with high oxidizing power (e.g., ozone water), or the like is performed.

Specifically, a 30-nm-thick film containing tungsten and having a surface subjected to plasma treatment in an atmosphere containing nitrous oxide ($N_2O$) can be used for the separation film 510W. Alternatively, a 30-nm-thick film containing tungsten and having a surface subjected to plasma treatment in an atmosphere containing silane and nitrous oxide ($N_2O$) can be used for the separation film 510W.

An organic material such as polyimide, polyester, polyolefin, polyamide, polycarbonate, or an acrylic resin can be used for the separation film 510W. Specifically, a film containing polyimide can be used for the separation film 510W. A film containing polyimide that can withstand a temperature higher than or equal to 200° C., preferably higher than or equal to 250° C., further preferably higher than or equal to 300° C., and still further preferably higher than or equal to 350° C. can be used for the separation film 510W.

The process substrate 510 can be formed using a material having heat resistance high enough to withstand heat treatment in the manufacturing process.

For example, a large-sized glass substrate having any of the following sizes can be used as the process substrate 510: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For example, an inorganic material such as glass, ceramic, or a metal can be used for the process substrate 510.

Specifically, non-alkali glass, soda-lime glass, potash glass, crystal glass, quartz, sapphire, or the like can be used for the process substrate 510. Specifically, an inorganic oxide film, an inorganic nitride film, an inorganic oxynitride film, or the like can be used for the process substrate 510. For example, a silicon oxide film, a silicon nitride film, a silicon oxynitride film, an aluminum oxide film, or the like can be used for the process substrate 510. For example, stainless steel or aluminum can be used for the process substrate 510.

Second Step

Figure 16A:
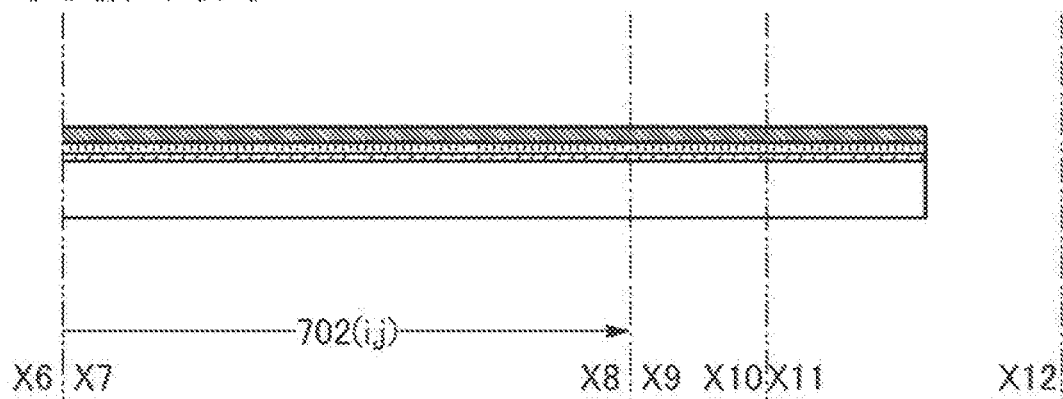
FIGS. 16A to 16C are cross-sectional views illustrating a method for manufacturing an input/output device of one embodiment.

In a second step, the insulating film 501A including a region overlapping with the separation film 510W is formed (see U2 in FIG. 14, FIG. 15A, and FIG. 16A).

Note that a material that can be separated from the process substrate 510 in a later step is used for the insulating film 501A. For example, a material that can be separated from the process substrate 510 with the separation film 510W left on the process substrate 510 side can be used for the insulating film 501A. Alternatively, a material that can be separated from the process substrate 510 along with the separation film 510W can be used for the insulating film 501A.

The insulating film 501A can be formed by a chemical vapor deposition method using silane or the like as a source gas, for example.

Specifically, a material in which a film 501A1 and a film 501A2 are stacked in this order can be used for the insulating film 501A.

A film with a thickness larger than or equal to 200 nm and smaller than or equal to 600 nm can be used for the film 501A1, for example. A material containing silicon and oxygen or a material containing silicon, oxygen, and nitrogen can be used for the film 501A1.

A film with a thickness of approximately 200 nm can be used for the film 501A2, for example. A material containing silicon and nitrogen can be used for the film 501A2.

The insulating film 501A has a function of supplying hydrogen when heated in a later step. The film 501A2 has a function of preventing hydrogen passage. Hydrogen supplied by heating the insulating film 501A in a later step is diffused toward an interface between the insulating film 501A and the separation film 510W.

Third Step

In a third step, the insulating film 501A is heated (see U3 in FIG. 14).

By the heating, for example, the insulating film 501A supplies hydrogen, and hydrogen reaches the separation film 510W. Thus, a structure with which the insulating film 501A can be separated from the process substrate 510 in a later step is formed between the insulating film 501A and the process substrate 510.

Fourth Step

Figure 16B:
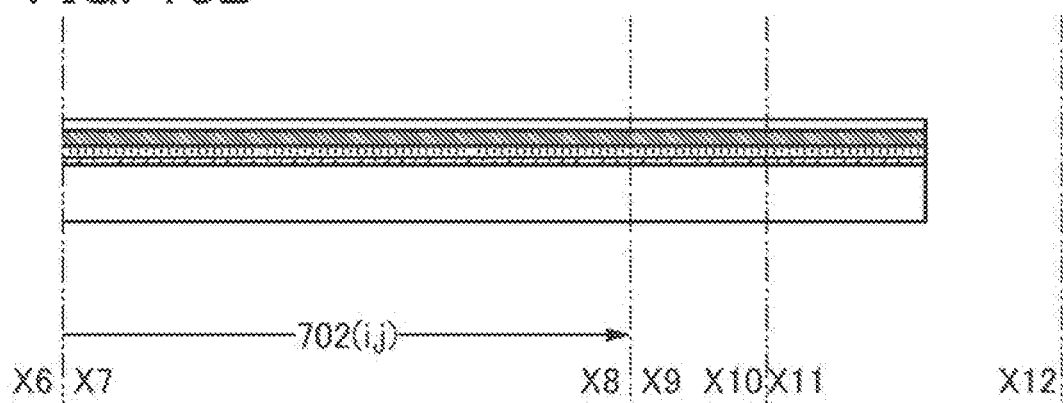

In a fourth step, the insulating film 501C including a region overlapping with the insulating film is formed (see U4 in FIG. 14, FIG. 15B, and FIG. 16B).

Fifth Step

Figure 16C:
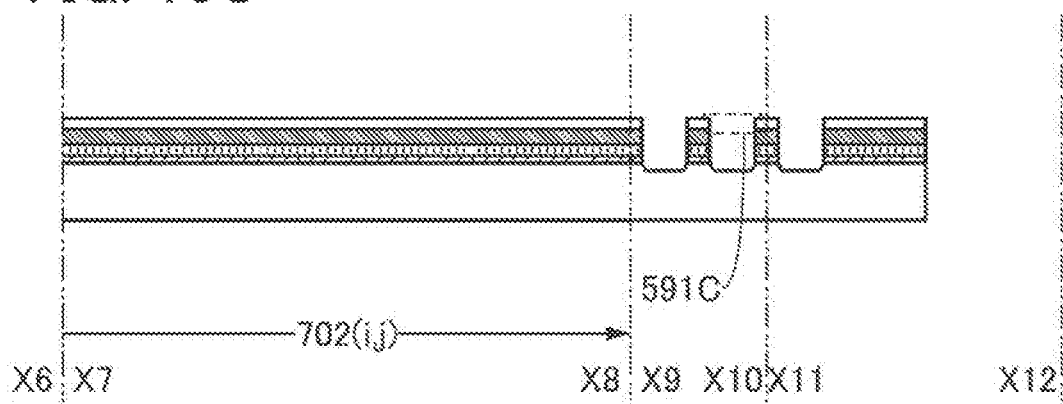

In a fifth step, the opening portion 591B is formed in the insulating film 501C, and an opening portion overlapping with the opening portion 591B is formed in the insulating film 501A and the separation film 510W (see U5 in FIG. 14, FIG. 15C, and FIG. 16C).

The insulating film 501C, the insulating film 501A, and the separation film 510W are made to have a predetermined shape by a photolithography method and an etching method, for example. Note that in some cases, a recessed portion is formed in a region of the process substrate 510 that overlaps with the opening portion 591B.

Sixth Step

In a sixth step, the electrode 519B in contact with the process substrate 510 is formed in the opening portion 591B (see U6 in FIG. 14, FIG. 17A, FIG. 17B, FIG. 18A, and FIG. 18B). The electrode 519B that occupies a part of the opening portion 591B in the insulating film 501C can be referred to as through electrode. In other words, the electrode 519B that fills a part of the opening portion 591B can be referred to as through electrode.

For example, an electroless plating method or a sputtering method can be used for forming the electrode 519B. The electrode 519B can have a predetermined shape by, for example, removing an unnecessary portion thereof. Specifically, a chemical mechanical polishing method or the like can be used, or a photolithography method and an etching method can be used.

Note that the electrode is formed using a material that can be separated from the process substrate 510 in a later step. In the case where the process substrate 510 is formed using glass, for example, the electrode can be formed using a material having poor adhesion to glass. Specifically, copper or the like can be used for the electrode.

Seventh Step

Figure 17A:
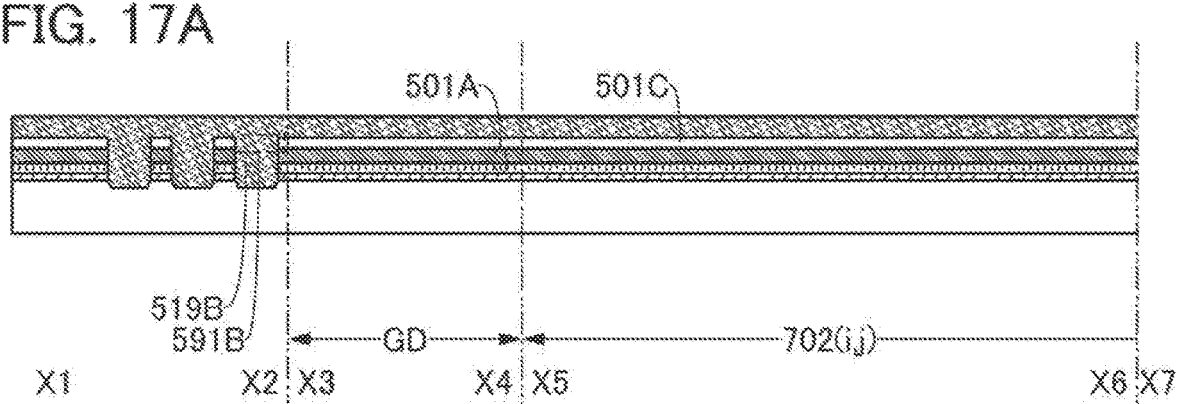
FIGS. 17A to 17D are cross-sectional views illustrating a method for manufacturing an input/output device of one embodiment.
Figure 17B:
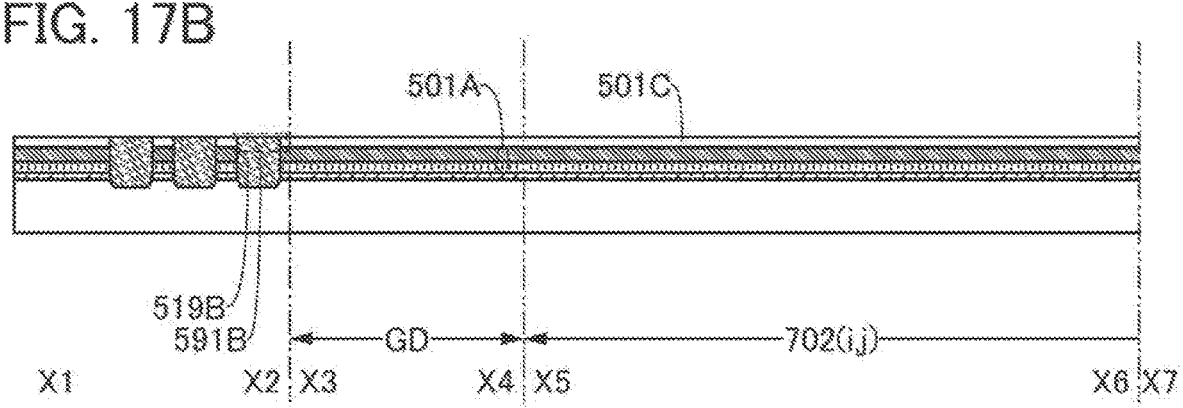
Figure 17C:
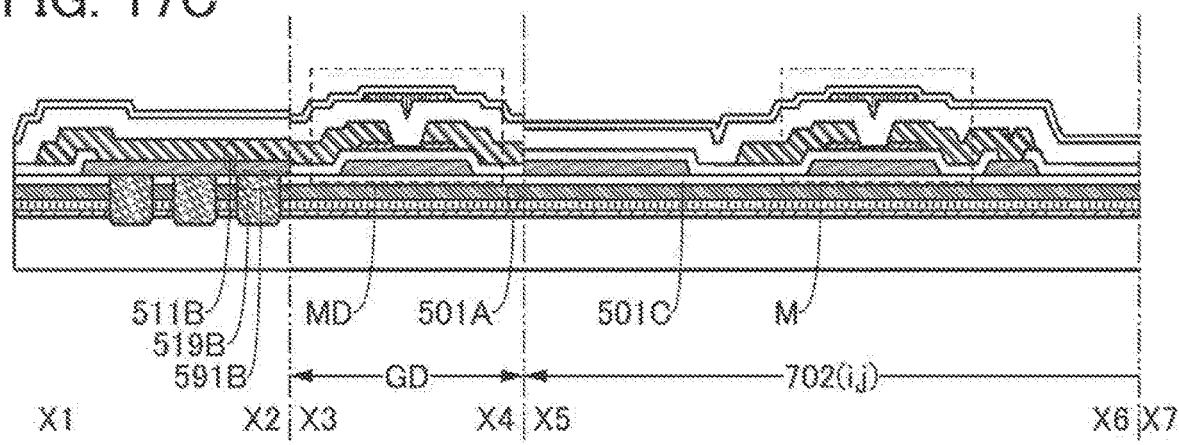
Figure 17D:
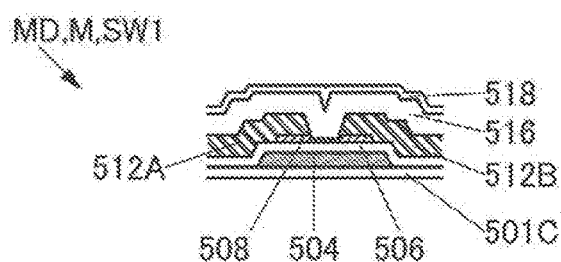
Figure 18A:
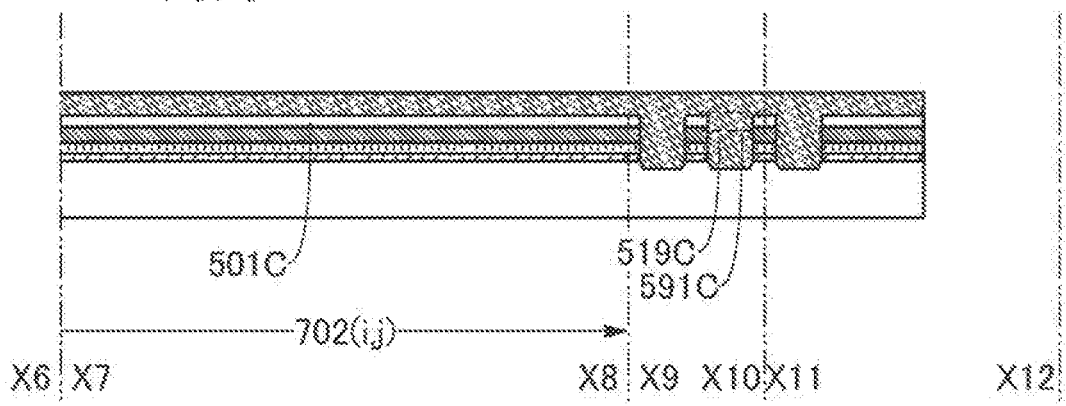
FIGS. 18A to 18C are cross-sectional views illustrating a method for manufacturing an input/output device of one embodiment.
Figure 18B:
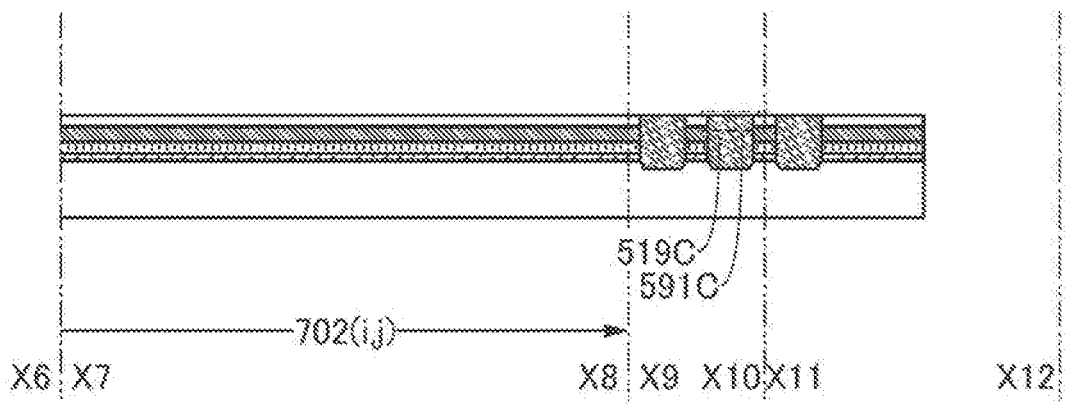
Figure 18C:
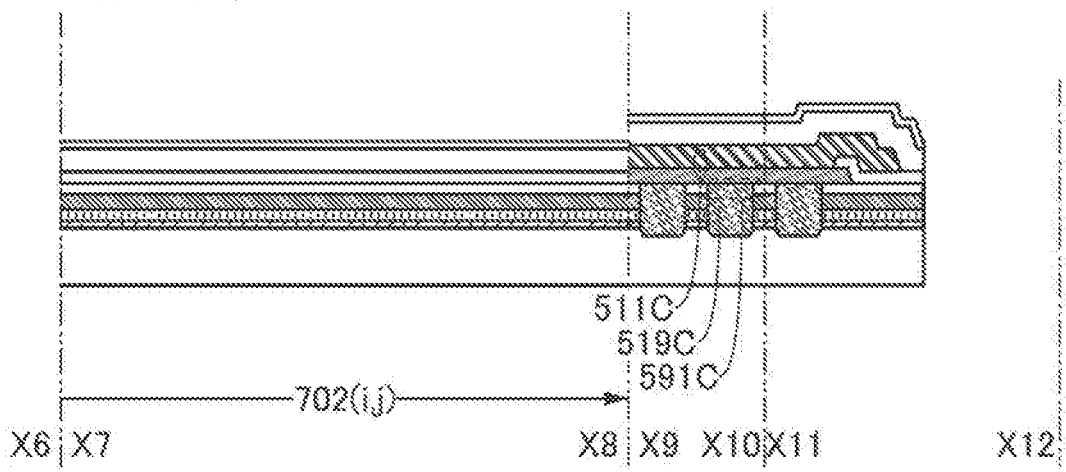

In a seventh step, the conductive film 511B in contact with the electrode 519B and the pixel circuit 530(i,j) electrically connected to the conductive film 511B are formed (see U7 in FIG. 14, FIG. 17C, and FIG. 18C). Note that the conductive film 511B includes a region overlapping with the insulating film 501C and the opening portion 591B. The conductive film 511B includes a region in contact with the electrode 519B.

The conductive film 511B can be formed using, for example, a conductive film formed in the same step as the conductive film 512B functioning as a source electrode or a drain electrode of the transistor M.

Eighth Step

Figure 19A:
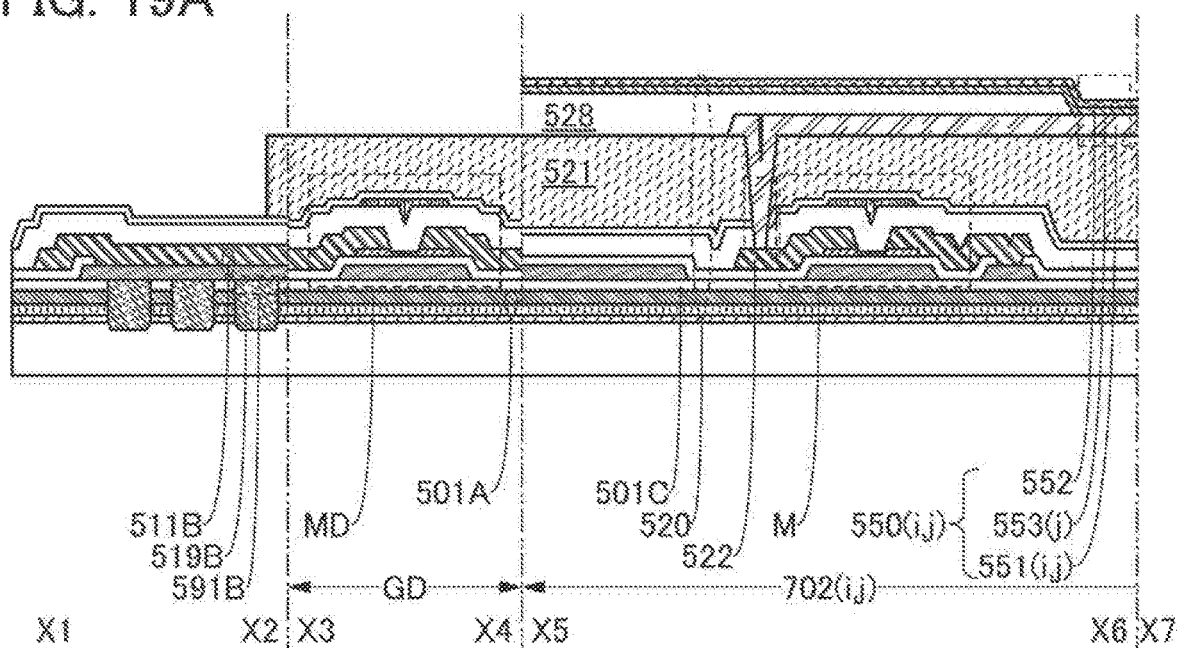
FIGS. 19A and 19B are cross-sectional views illustrating a method for manufacturing an input/output device of one embodiment.
Figure 20A:
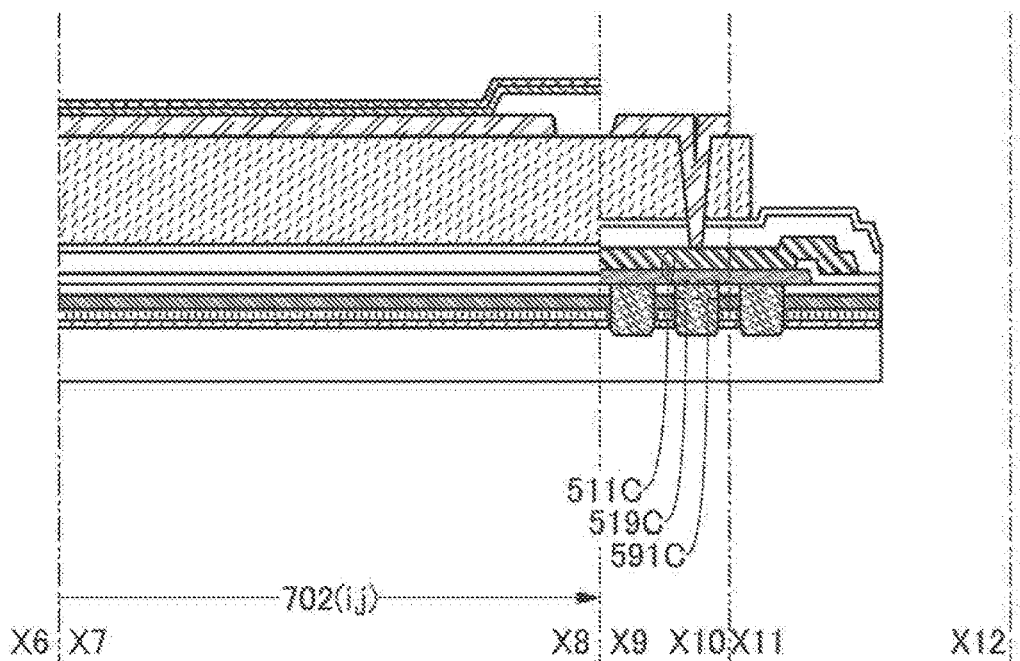
FIGS. 20A and 20B are cross-sectional views illustrating a method for manufacturing an input/output device of one embodiment.

In an eighth step, the display element 550(i,j) to be electrically connected to the pixel circuit 530(i,j) is formed (see U8 in FIG. 14, FIG. 19A, and FIG. 20A).

Ninth Step

In a ninth step, the second base 710L is stacked to overlap with the insulating film 501C (see U9 in FIG. 14).

For example, the holding layer 709 is formed by a printing method, a coating method, or the like, and the second base 710L is bonded to the functional layer 520 using the bonding layer 709.

Tenth Step

Figure 19B:
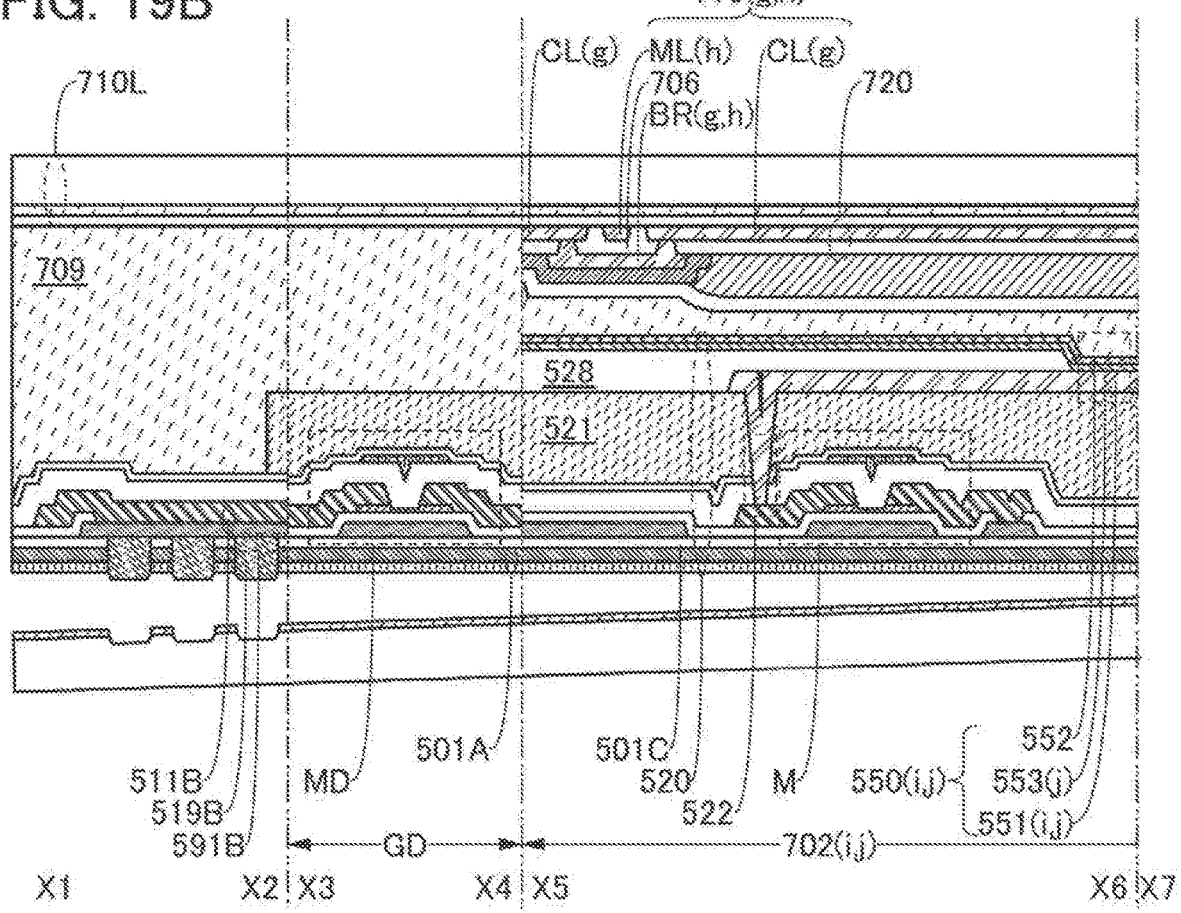
Figure 20B:
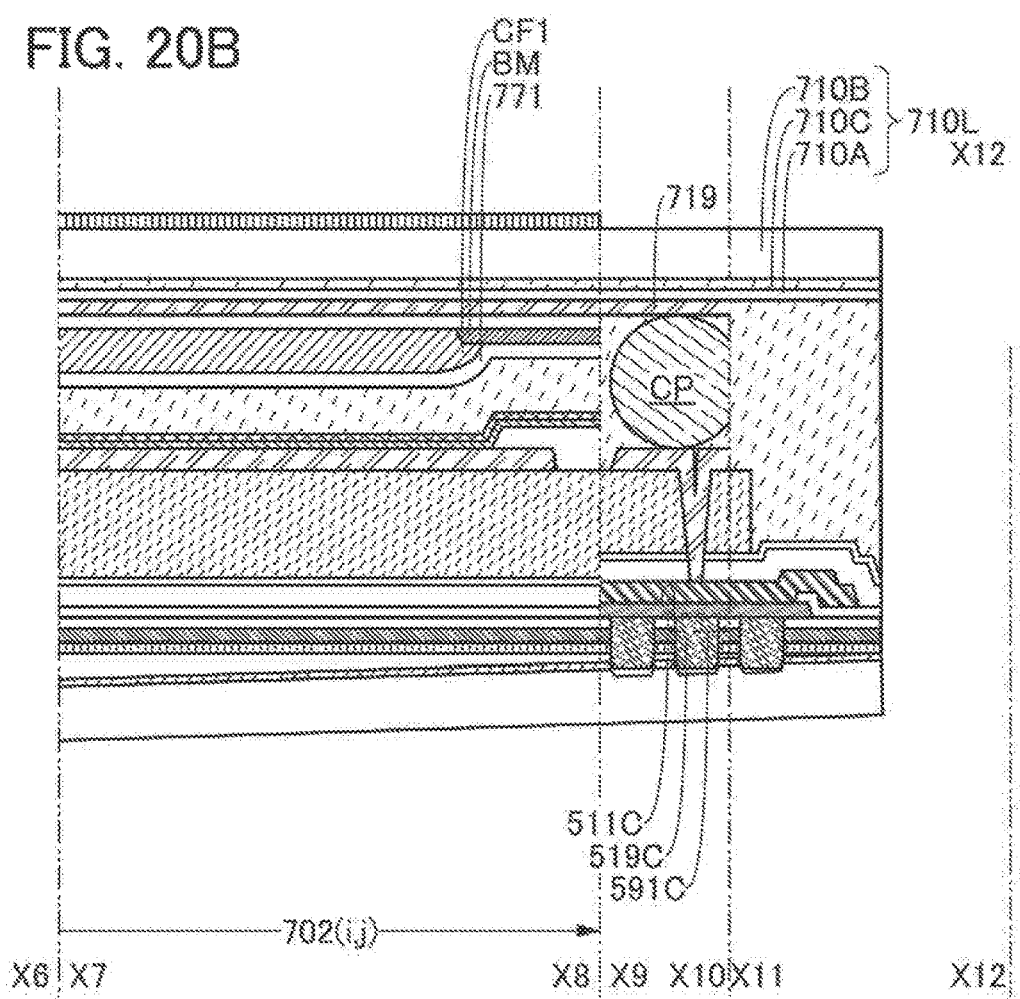

In a tenth step, separation from the process substrate 510 is performed (see U10 in FIG. 14, FIG. 19B, and FIG. 20B).

For example, a separation starting point at which a part of the insulating film 501A is separated from the process substrate 510 is formed. Then, a region where the insulating film 501A is separated from the process substrate 510 is gradually extended from the separation starting point; as a result, the insulating film 501A is separated from the process substrate 510.

The separation starting point can be formed by, for example, a method using a laser (specifically, a laser ablation method) or a method using a cutter with a sharp tip. Furthermore, for example, the insulating film 501A is separated from the process substrate 510 while a liquid is injected between the process substrate 510 and the insulating film 501A. Specifically, the insulating film 501A is separated while a liquid containing water is injected between the separation film 510W and the insulating film 501A. Accordingly, the stress applied to the insulating film 501A at the time of the separation can be reduced, and the breakdown of the insulating film 501A in the process can be prevented.

For example, when the insulating film 501A is separated from the separation film 510W, a part of the separation film 510W in contact with the insulating film 501A is separated from the other part and remains on the insulating film 501A in some cases. In such cases, the part of the separation film 510W remaining on the insulating film n 501A can be removed by an etching method. Thus, the insulating film 501A can be exposed.

Eleventh Step

Figure 21:
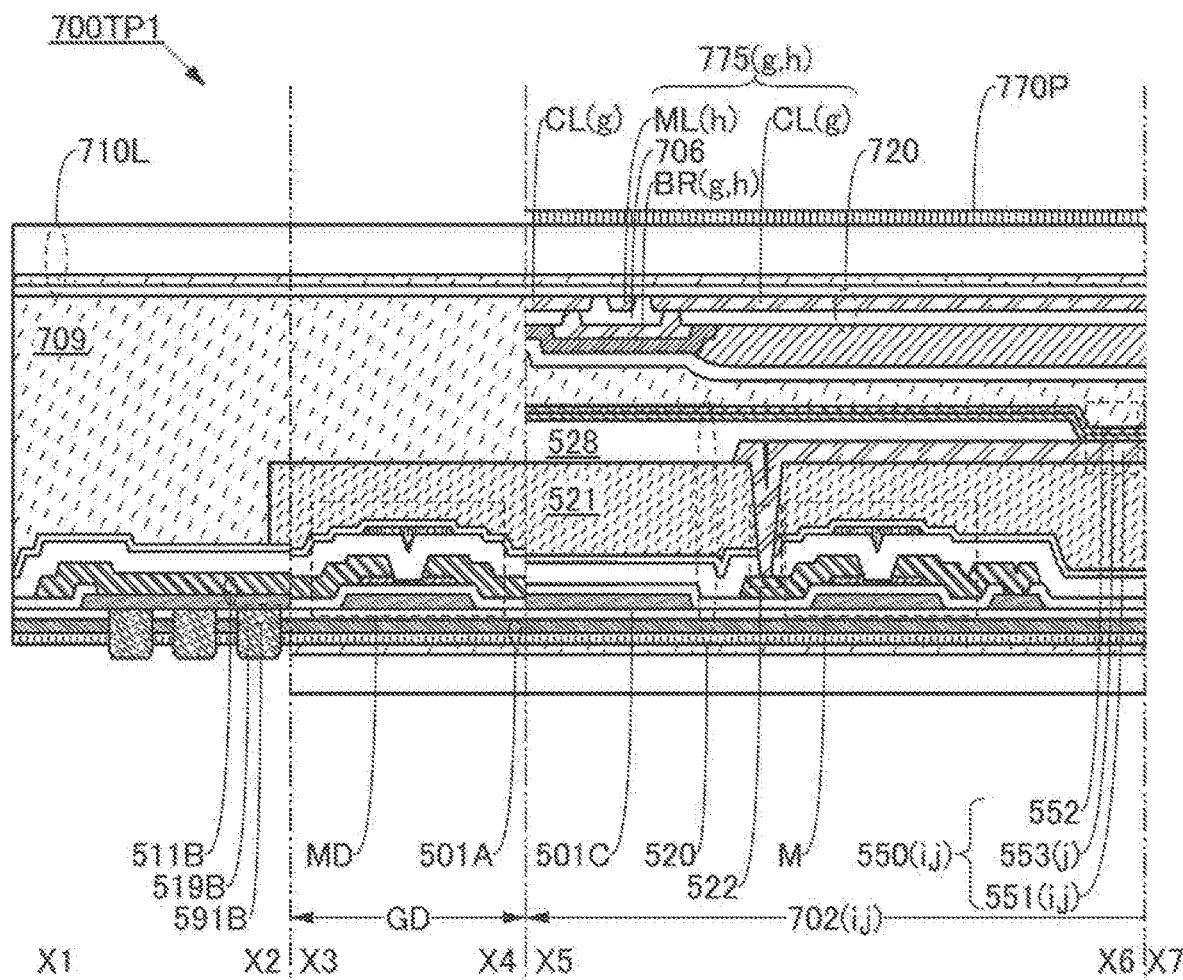
FIG. 21 is a cross-sectional view illustrating a method for manufacturing an input/output device of one embodiment.
Figure 22:
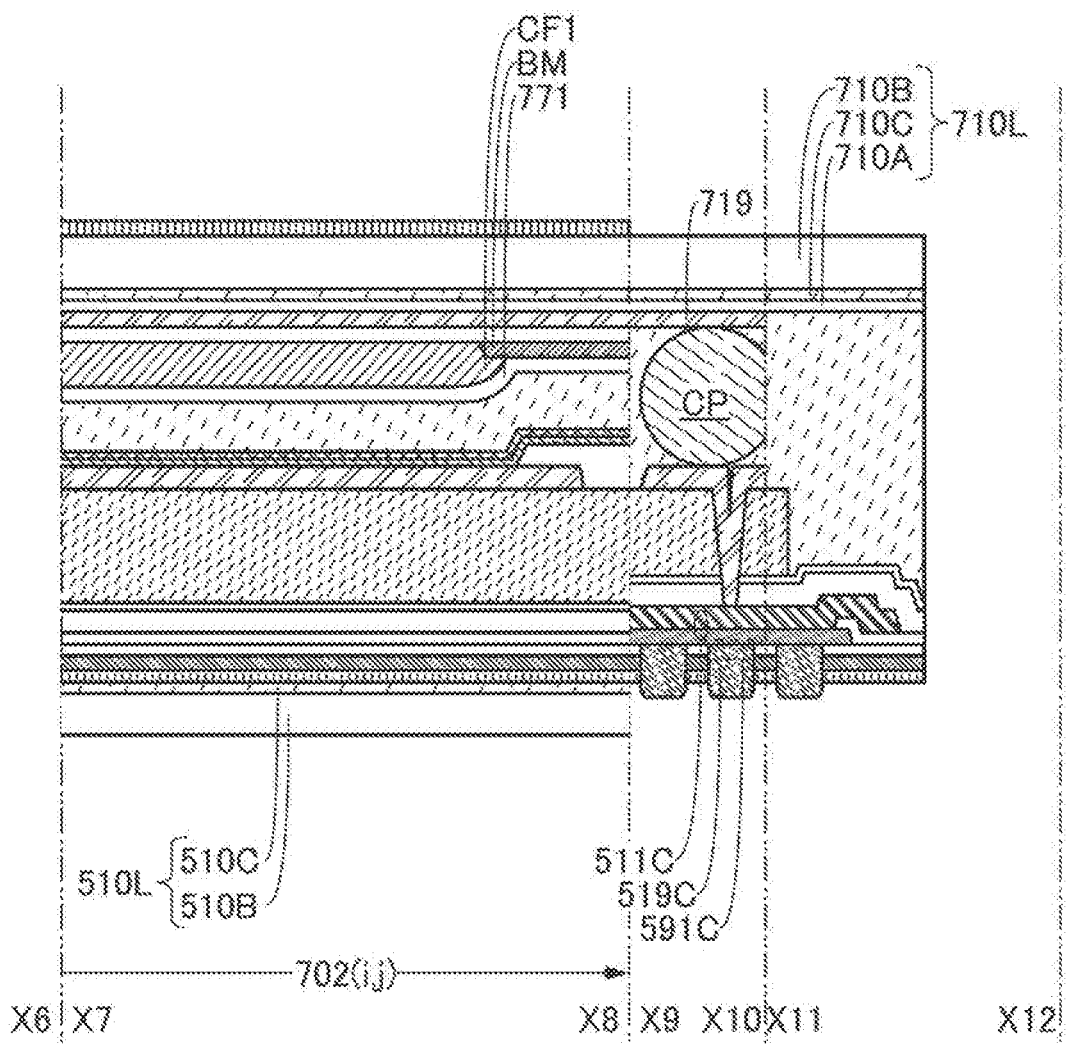
FIG. 22 is a cross-sectional view illustrating a method for manufacturing an input/output device of one embodiment.

In an eleventh step, the first base 510L is stacked (see U11 in FIG. 14, FIG. 21, and FIG. 22).

The method for manufacturing the display panel described in this embodiment includes the following steps: forming a separation film over a process substrate; forming an opening portion in an insulating film and an opening portion overlapping with the opening portion in the separation film; forming an electrode in contact with the process substrate in the opening portion; forming a conductive film in contact with the electrode, a pixel circuit electrically connected to the conductive film, and a display element electrically connected to the pixel circuit; and performing separation from the process substrate. Thus, the electrode can have one end in contact with the conductive film and the other end exposed at the opening portion. As a result, a method for manufacturing a novel display panel that is highly convenient or reliable can be provided.

Method 2 for Manufacturing Input/Output Device

Another method for manufacturing the input/output device of one embodiment of the present invention will be described with reference to FIGS. 23 to 29.

Figure 23:
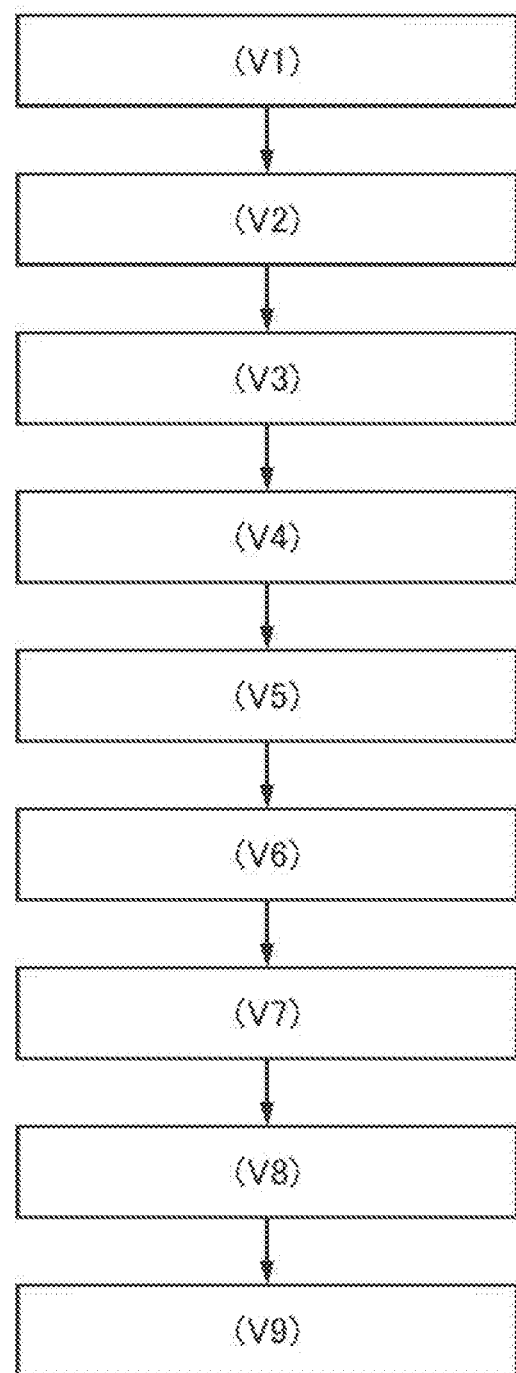
FIG. 23 is a flow chart illustrating a method for manufacturing an input/output device of one embodiment.

FIG. 23 is a flow chart showing the method for manufacturing the input/output device of one embodiment of the present invention.

FIGS. 24A to 29 each illustrate a structure of the display panel of one embodiment of the present invention in a manufacturing process. FIGS. 24A to 24C, FIGS. 26A and 26B, and FIG. 28 are cross-sectional views taken along the cutting plane lines X1-X2, X3-X4, and X5-X6 in FIG. 7A. FIGS. 25A to 25C, FIGS. 27A and 27B, and FIG. 29 are cross-sectional views taken along the cutting plane lines X7-X8, X9-X10, and X11-X12 in FIG. 7A.

Note that the method for manufacturing the input/output device that is described with reference to FIGS. 23 to 29 is different from the method for manufacturing the input/output device that is described with reference to FIGS. 14 to 22 in the following points, for example: the insulating film 501A is not used; the separation film 510W is also separated from the process substrate 510; the alignment film AF1 is formed; and the first display element 750(i,j) is formed. Different steps are described in detail below, and the above description is referred to for portions where the same method can be employed.

The method for manufacturing the input/output device described in this embodiment includes the following 12 steps (see FIG. 23).

First Step

In a first step, the separation film 510W is formed over the process substrate 510 (see V1 in FIG. 23).

For the separation film 510W, an inorganic material, an organic resin, or the like can be used, for example. Specifically, a film containing polyimide can be used for the separation film 510W. For the process substrate 510, non-alkali glass substrate can be used, for example.

Second Step

In a second step, an opening portion is formed in the separation film 510W (see V2 in FIG. 23).

For example, the opening portion can be formed in a photosensitive polyimide or the like by using a photolithography method. As another example, the opening portion can be formed in a polyimide or the like by using a hard mask and an ashing method.

Third Step

Figure 24A:
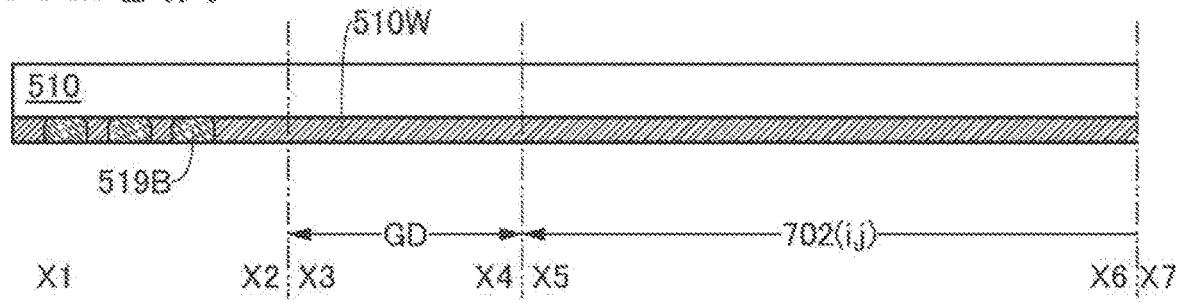
FIGS. 24A to 24C are cross-sectional views illustrating a method for manufacturing an input/output device of one embodiment.
Figure 25A:
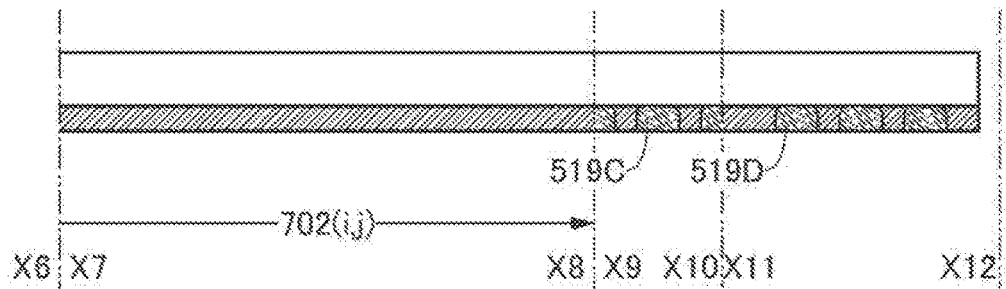
FIGS. 25A to 25C are cross-sectional views illustrating a method for manufacturing an input/output device of one embodiment.

In a third step, the electrode 519B in contact with the process substrate 510 is formed in the opening portion (see V3 in FIG. 23, FIG. 24A, and FIG. 25A).

For example, an electroless plating method or a sputtering method can be used for forming the electrode 519B. The electrode 519B can have a predetermined shape by, for example, removing an unnecessary portion thereof. Specifically, a chemical mechanical polishing method or the like can be used, or a photolithography method and an etching method can be used.

Note that the electrode is formed using a material that can be separated from the process substrate 510 in a later step. In the case where the process substrate 510 is formed using glass, for example, the electrode can be formed using a material having poor adhesion to glass. Specifically, copper or the like can be used for the electrode.

Fourth Step

Figure 24B:
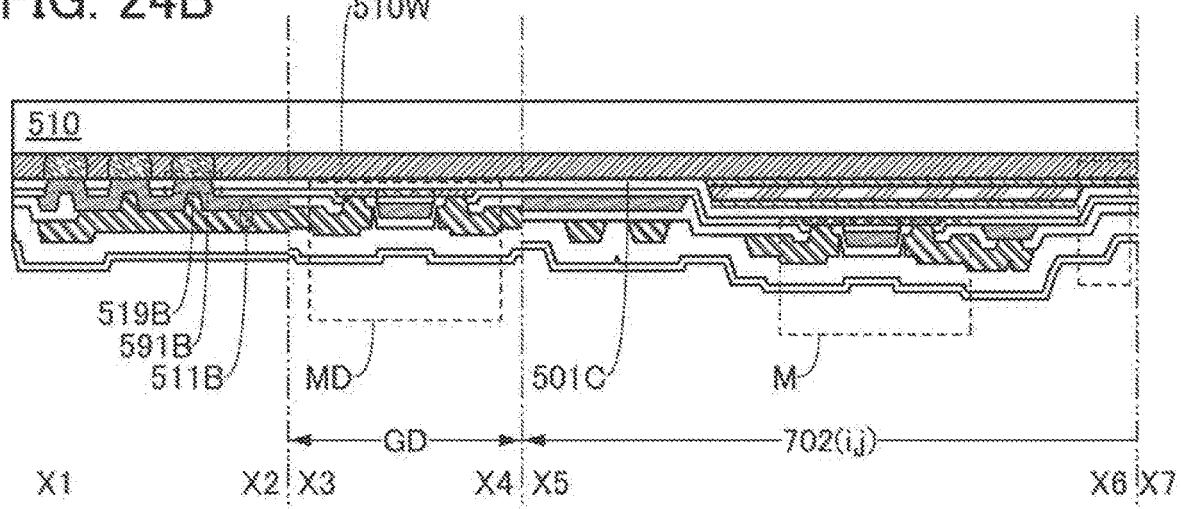
Figure 25B:
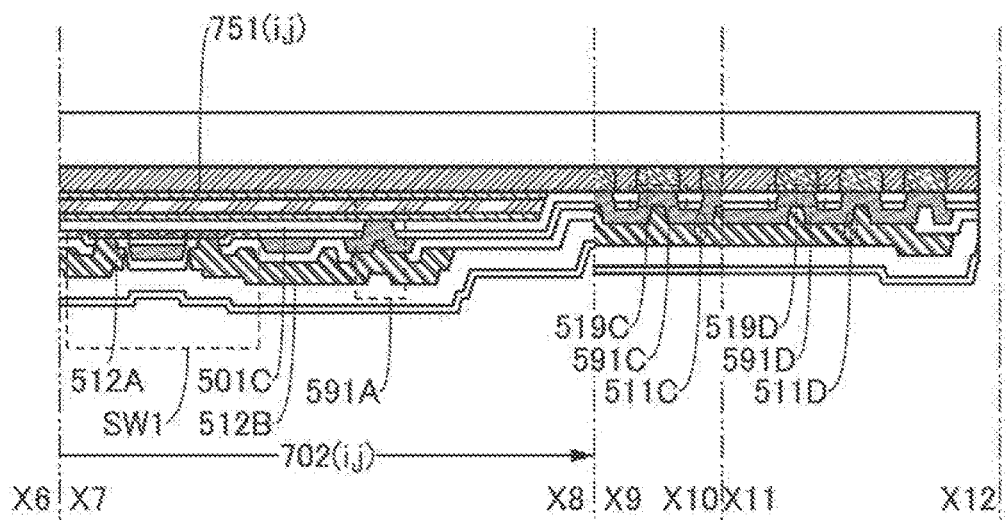

In a fourth step, the first electrode 751(i,j), the insulating film 501C including the opening portion 591B, the conductive film 511B in contact with the electrode 519B, and the pixel circuit 530(i,j) electrically connected to the conductive film 511B are formed (see V4 in FIG. 23, FIG. 24B, and FIG. 25B). Note that the conductive film 511B includes a region overlapping with the insulating film 501C and the opening portion 591B. The conductive film 511B includes a region in contact with the electrode 519B.

The conductive film 511B can be formed using, for example, a conductive film formed in the same step as the conductive film 512B functioning as a source electrode or a drain electrode of the transistor M. The conductive film 511B that occupies a part of the opening portion 591B in the insulating film 501C can be referred to as through electrode. In other words, the conductive film 511B that fills a part of the opening portion 591B can be referred to as through electrode.

Fifth Step

Figure 24C:
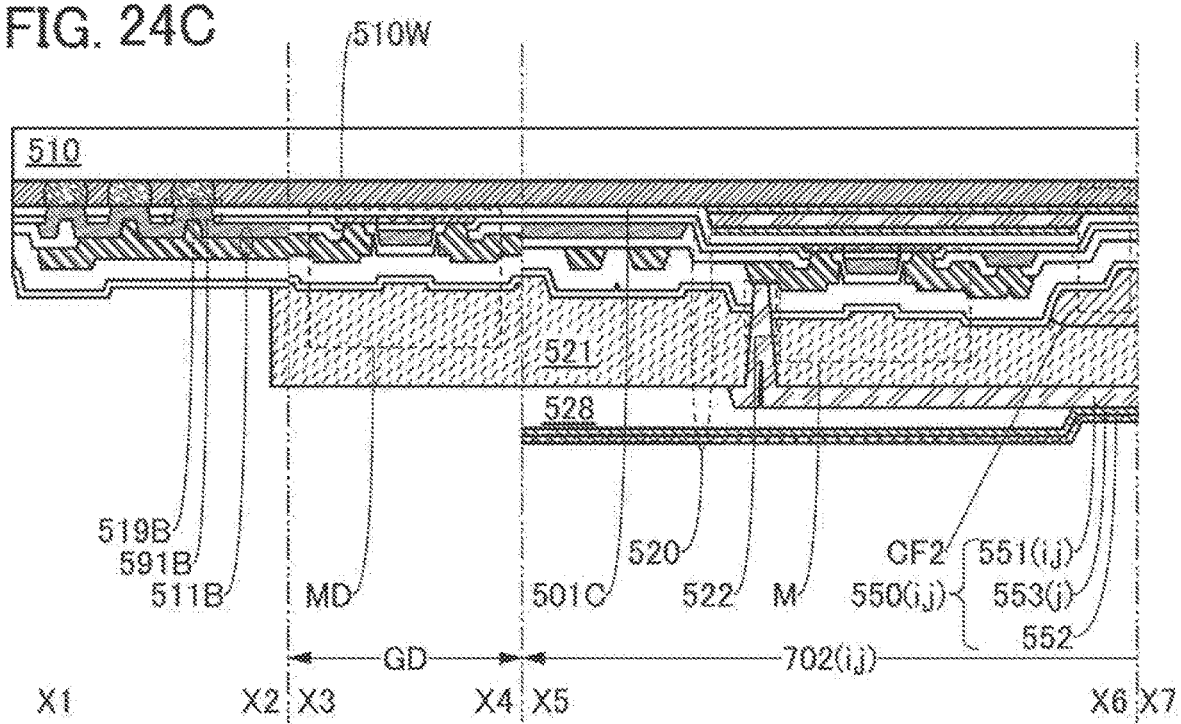
Figure 25C:
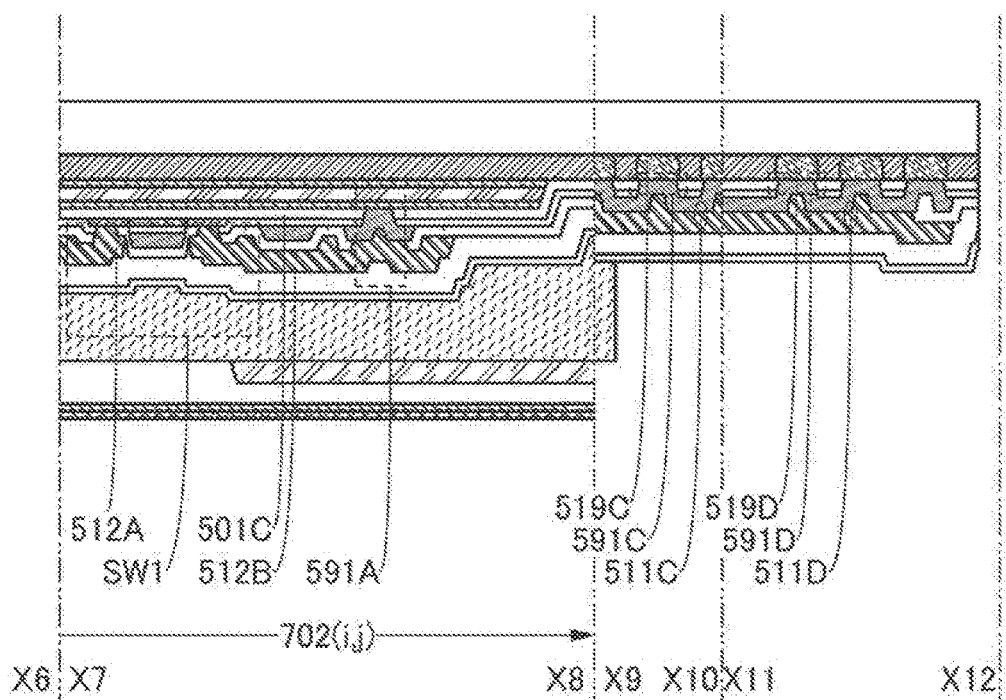

In a fifth step, the second display element 550(i,j) electrically connected to the pixel circuit 530(i,j) is formed (see V5 in FIG. 23, FIG. 24C and FIG. 25C)

Sixth Step

In a sixth step, the second base 710L is stacked to overlap with the insulating film 501C (see V6 in FIG. 23).

For example, the bonding layer 709 is formed by a printing method, a coating method, or the like, and the second base 710L is bonded to the functional layer 520 using the bonding layer 709.

Seventh Step

Figure 26A:
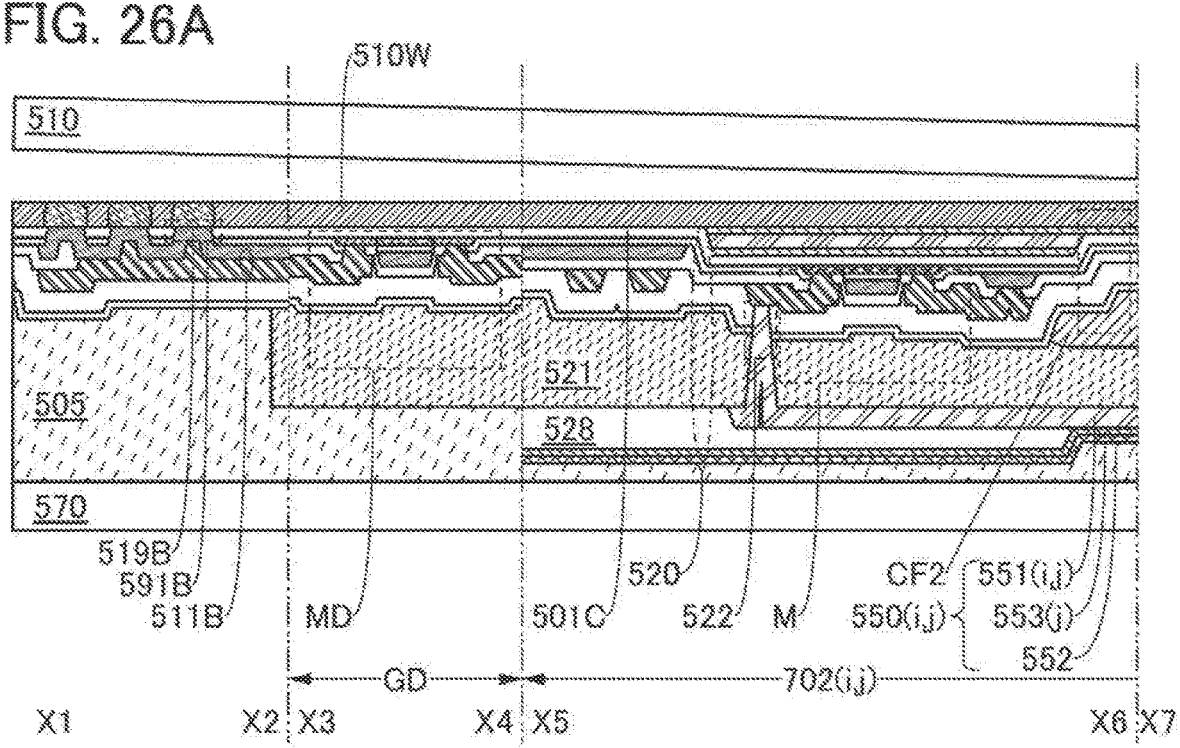
FIGS. 26A and 26B are cross-sectional views illustrating a method for manufacturing an input/output device of one embodiment.
Figure 27A:
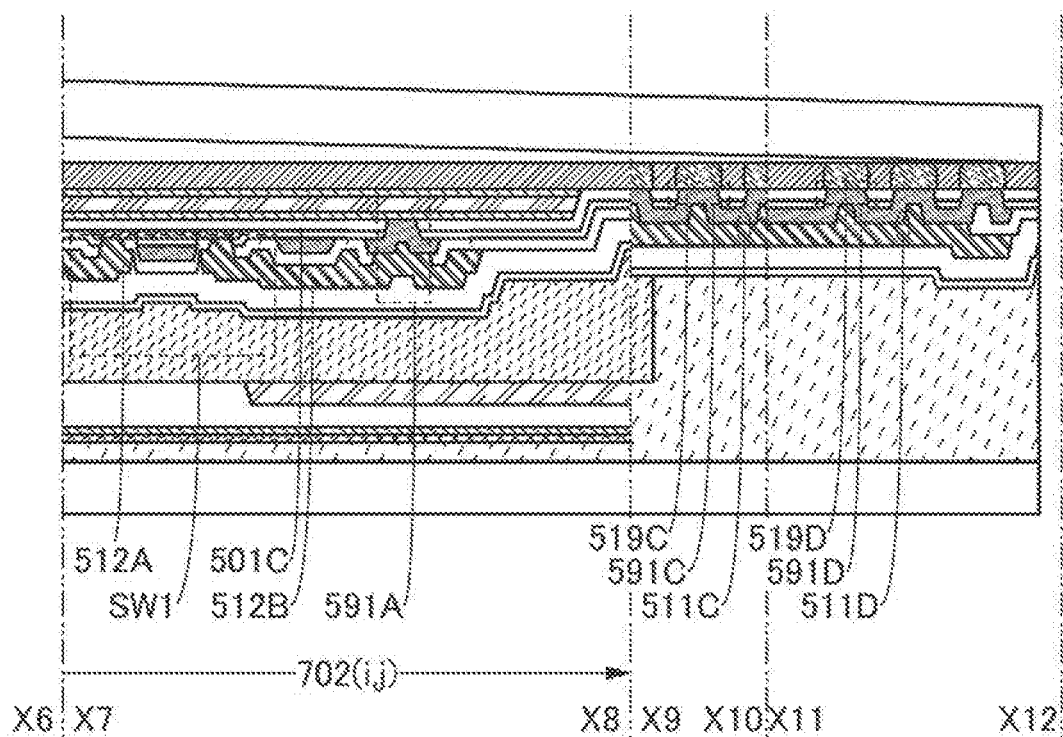
FIGS. 27A and 27B are cross-sectional views illustrating a method for manufacturing an input/output device of one embodiment.

In a seventh step, separation from the process substrate 510 is performed (see V7 in FIG. 23, FIG. 26A, and FIG. 27A).

For example, the separation film 510W is irradiated with laser light from the process substrate 510 side to separate the separation film 510W from the process substrate 510. Specifically, the separation film 510W containing polyimide is irradiated with excimer laser light. Laser light having a wavelength of 355 nm or laser light having a wavelength of 308 nm can be used, for example.

Eighth Step

Figure 26B:
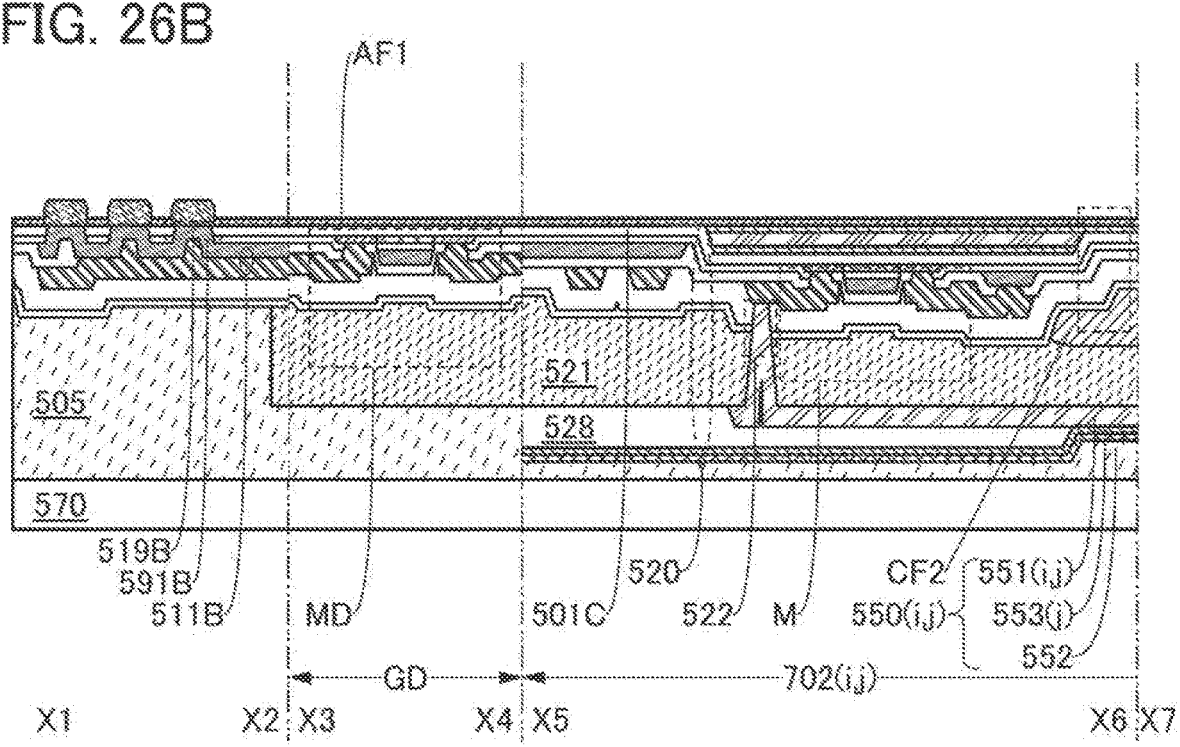
Figure 27B:
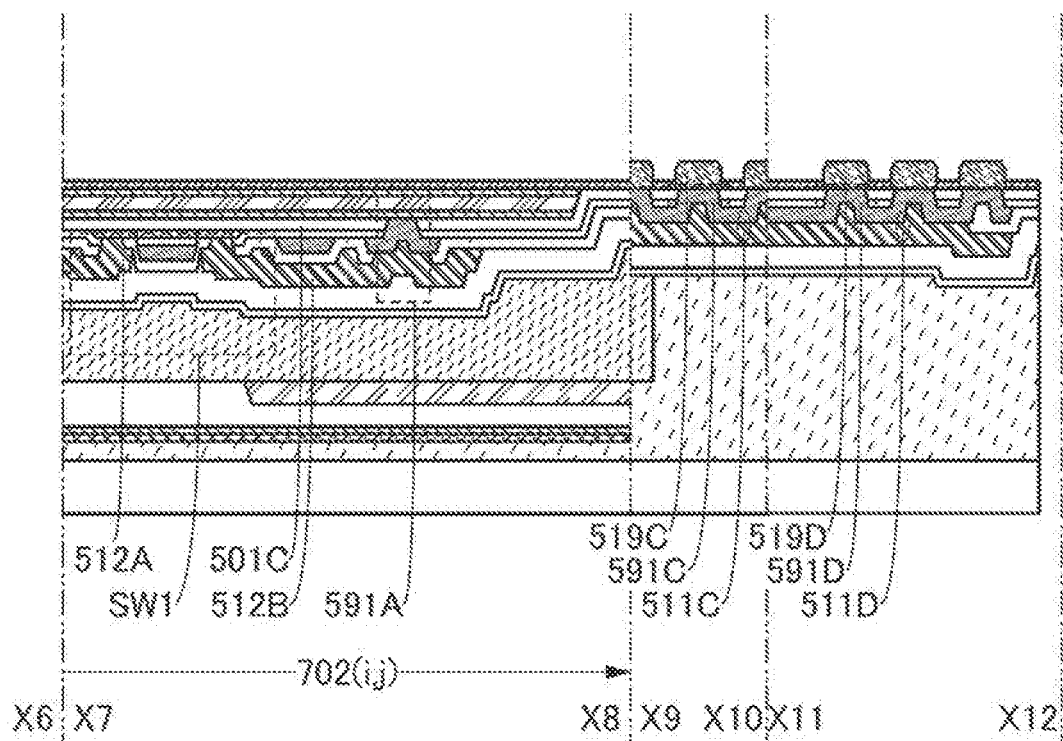

In an eighth step, the alignment film AF1 is formed (see V8 in FIG. 23, FIG. 26B, and FIG. 27B).

For example, a polyimide film to be used as the alignment film AF1 is formed. Specifically, the separation film 510W containing polyimide can be thinned by an ashing method or the like and used as the alignment film AF1. More specifically, the separation film 510W containing polyimide can be thinned to a thickness of 70 nm and used as the alignment film AF1. As another example, soluble polyimide can be formed in a predetermined region by a printing method after the separation film 510W is removed.

Ninth Step

Figure 28:
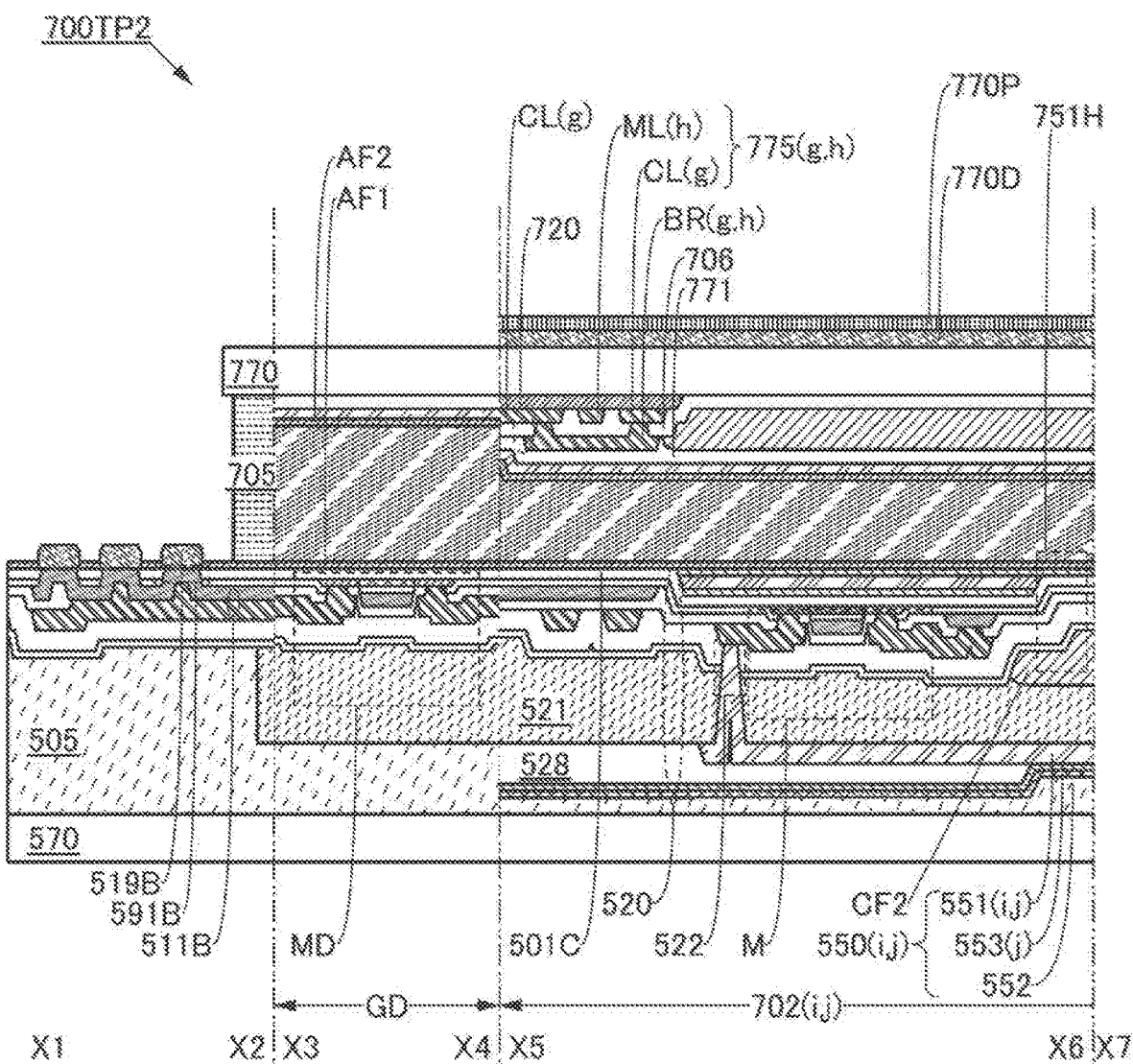
FIG. 28 is a cross-sectional view illustrating a method for manufacturing an input/output device of one embodiment.
Figure 29:
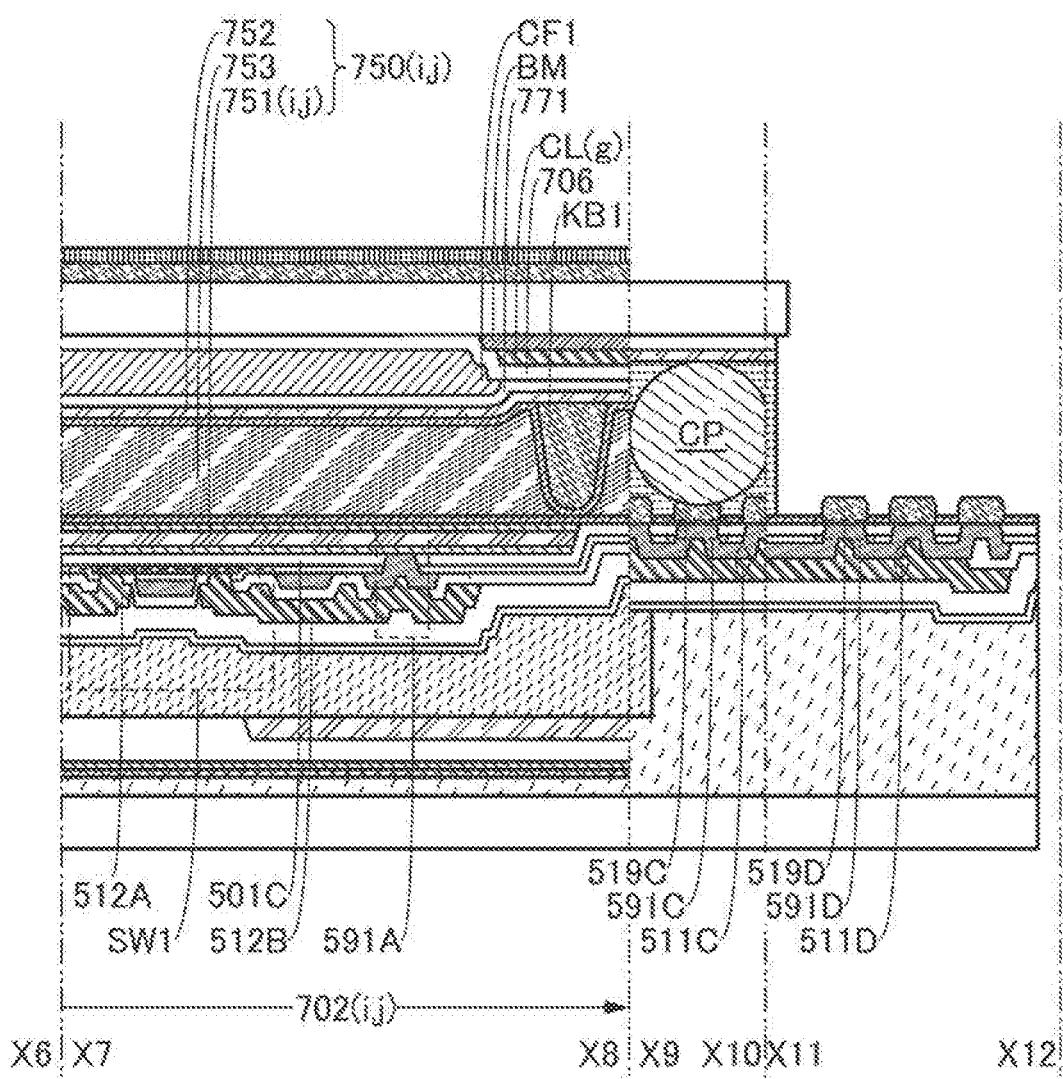
FIG. 29 is a cross-sectional view illustrating a method for manufacturing an input/output device of one embodiment.

In a ninth step, the base 770 is stacked so that the layer 753 containing a liquid crystal material is positioned between the alignment film AF1 and the base 770, and the layer 753 is sealed using the sealing material 705; thus, the first display element is formed (see V9 in FIG. 23, FIG. 28, and FIG. 29). Note that a material over which the second electrode 752, the coloring film CF1, the light-blocking film BM, the sensing element 775(g,h), and the like are formed in advance is used as the base 770.

At least part of this embodiment can be implemented in combination with any of the other embodiments described in this specification as appropriate.

Embodiment 4

In this embodiment, a display module and electronic devices that include a display panel of one embodiment of the present invention are described with reference to FIGS. 30A to 30H.

FIGS. 30A to 30H illustrate electronic devices. These electronic devices can include housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 30A:
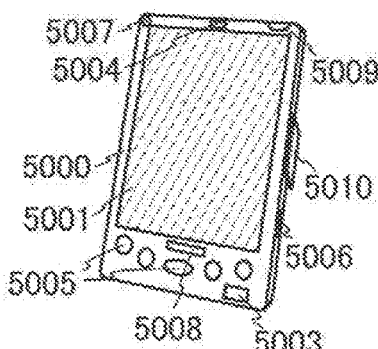
FIGS. 30A to 30H illustrate structures of electronic devices of one embodiment.
Figure 30B:
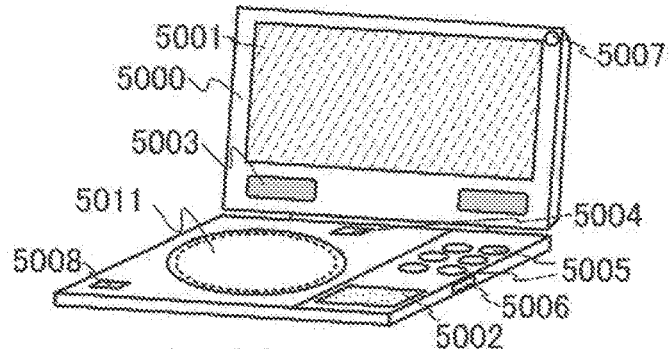
Figure 30C:
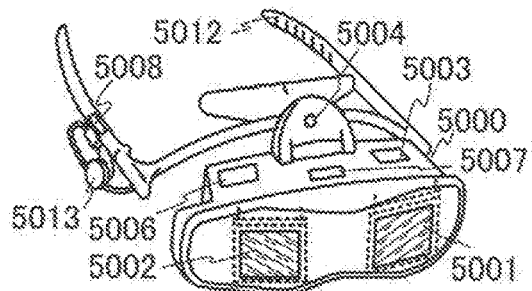
Figure 30D:
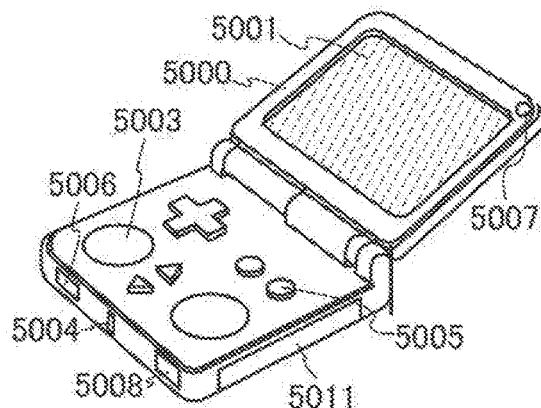
Figure 30E:
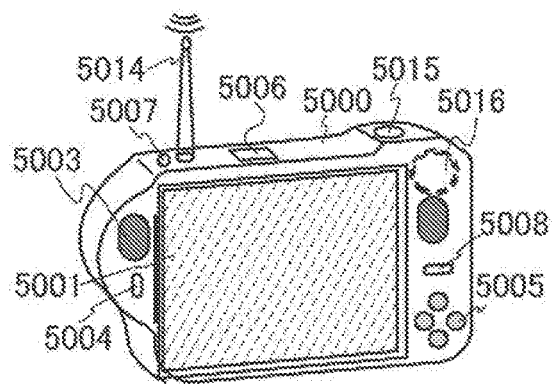
Figure 30F:
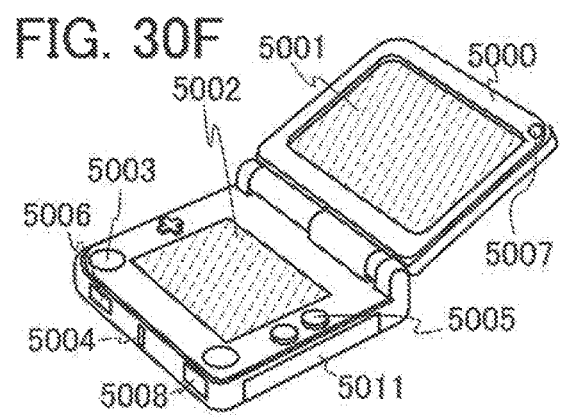
Figure 30G:
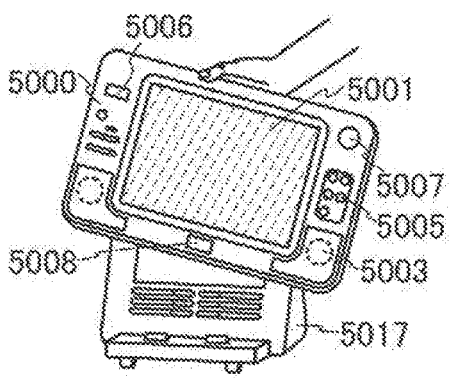

FIG. 30A illustrates a mobile computer that can include a switch 5009, an infrared port 5010, and the like in addition to the above components. FIG. 30B illustrates a portable image reproducing device (e.g., a DVD reproducing device) provided with a recording medium, and the portable image reproducing device can include a second display portion 5002, a recording medium reading portion 5011, and the like in addition to the above components. FIG. 30C illustrates a goggle-type display that can include the second display portion 5002, a support portion 5012, an earphone 5013, and the like in addition to the above components. FIG. 30D illustrates a portable game console that can include the recording medium reading portion 5011 and the like in addition to the above components. FIG. 30E illustrates a digital camera with a television reception function, and the digital camera can include an antenna 5014, a shutter button 5015, an image receiving portion 5016, and the like in addition to the above components. FIG. 30F illustrates a portable game console that can include the second display portion 5002, the recording medium reading portion 5011, and the like in addition to the above components. FIG. 30G illustrates a portable television receiver that can include a charger 5017 capable of transmitting and receiving signals, and the like in addition to the above components.

The electronic devices in FIGS. 30A to 30G can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image data mainly on one display portion while displaying text data mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 30A to 30G are not limited thereto, and the electronic devices can have a variety of functions.

Figure 30H:
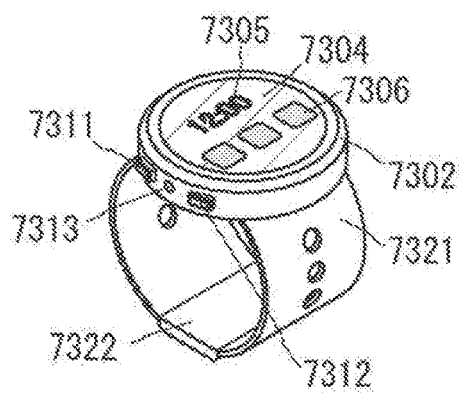

FIG. 30H illustrates a smart watch, which includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

The smart watch in FIG. 30H can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The housing 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using the light-emitting element for the display panel 7304.

This embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit, a memory circuit; or a control circuit) can be connected between X and Y. For example, even when another circuit is interposed between X and Y, X and Y are functionally connected if a signal output from X is transmitted to Y. Note that the case where X and Y and are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween). X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

EXPLANATION OF REFERENCE

CL(g): control line, CP: conductive material, ML(h): sensing signal line, ANO: conductive film, BR: conductive film, C(g): electrode, M(h): electrode, CSCOM: wiring, BM: light-blocking film, 510W: separation film, ACF1: conductive material, ACF2: conductive material, AF1: alignment film, AF2: alignment film, C11: capacitor, C12: capacitor, CF1: coloring film, CF2: coloring film, G1: scan line, G2: scan line, KB1: structure body, S1: signal line, S2: signal line, SW1: switch, SW2: switch, VCOM1: wiring, VCOM2: conductive film, FPC1: flexible printed circuit, FPC2: flexible printed circuit, 501A: insulating film, 501A1: film, 501A2: film, 501C: insulating film, 504: conductive film, 505: bonding layer, 506: insulating film, 508: semiconductor film, 508A: region, 508B: region, 508C: region, 510: process substrate, 510B: base, 510C: bonding layer, 510L: base, 511B: conductive film, 511C: conductive film, 511D: conductive film, 512A: conductive film, 512B: conductive film, 516: insulating film, 518: insulating film, 519B: electrode, 519B1: region, 519B2: region, 519C: electrode, 519D: electrode, 520: functional layer, 521: insulating film, 522: connection portion, 524: conductive film, 528: insulating film, 530: pixel circuit, 550: display element, 551: electrode, 552: electrode, 552C: electrode, 553: layer, 570: base, 591A: opening portion, 591B: opening portion, 591C opening portion, 591D: opening portion, 700TP1: input/output device, 700TP2: input/output device, 702: pixel, 705: sealing material, 706: insulating film, 709: bonding layer, 710: base, 710A: insulating film, 710B: base, 710C: bonding layer, 710L: base, 719: terminal, 720: functional layer, 750: display element, 751: electrode, 751E: region, 751H: opening portion, 752: electrode, 753: layer, 770: base, 770D: functional film, 770P: functional film, 771; insulating film, 775: sensing element, 800TP1: input/output device, 801: region, 820: housing, 821: component, 822: component, 823: hinge portion, 5000: housing, 5001: display portion, 5002: display portion, 5003: speaker, 5004: LED lamp, 5005: operation key, 5006: connection terminal, 5007: sensor, 5008: microphone, 5009: switch, 5010: infrared port, 5011: memory medium reading portion, 5012: support, 5013: earphone, 5014: antenna, 5015: shutter button, 5016: image receiving portion, 5017: charger, 7302: housing, 7304: display panel, 7305: icon, 7306: icon, 7311: operation button, 7312: operation button: 7313: connection terminal, 7321: band, 7322: clasp.

This application is based on Japanese Patent Application serial no. 2015-247412 filed with Japan Patent Office on Dec. 18, 2015, the entire contents of winch are hereby incorporated by reference.

What is claimed is:

1. A method for manufacturing a display panel, comprising:
   a first step of forming a separation film over a process substrate;
   a second step of forming a first insulating film including a region overlapping with the separation film;
   a third step of heating the first insulating film;
   a fourth step of forming a second insulating film including a region overlapping with the first insulating film;
   a fifth step of forming a first opening portion in the second insulating film and forming, in the first insulating film and the separation film, a second opening portion overlapping with the first opening portion;
   a sixth step of forming, in the second opening portion, an electrode in contact with the process substrate;
   a seventh step of forming a conductive film in contact with the electrode and forming a pixel circuit electrically connected to the conductive film;
   an eighth step of forming a display element electrically connected to the pixel circuit;
   a ninth step of stacking a second base to overlap with the second insulating film;
   a tenth step of performing separation from the process substrate; and
   an eleventh step of stacking a first base.

2. The method for manufacturing the display panel according to claim 1, wherein the separation film comprises an element selected from tungsten, molybdenum, titanium, tantalum, niobium, nickel, cobalt, zirconium, zinc, ruthenium, rhodium, palladium, osmium, iridium, and silicon, or an alloy including the element.

3. The method for manufacturing the display panel according to claim 1, wherein the separation film comprises a stack of a first film comprising tungsten and a second film comprising an oxide of tungsten.

4. The method for manufacturing the display panel according to claim 1, wherein the separation film comprises polyimide, polyester, polyolefin, polyimide, polycarbonate, or an acrylic resin.

5. The method for manufacturing the display panel according to claim 1, wherein the first insulating film comprises silicon, oxygen, and nitrogen.

6. The method for manufacturing the display panel according to claim 1, wherein the first insulating film comprises a hydrogen blocking layer.

7. The method for manufacturing the display panel according to claim 1, wherein the electrode comprises copper.

8. The method for manufacturing the display panel according to claim 1, further comprising in the fifth step forming a recessed portion in the process substrate overlapping with the first opening portion.

9. A method for manufacturing a display panel, comprising:
   a first step of forming a separation film over a process substrate;
   a second step of forming a first insulating film over the separation film;
   a third step of heating the first insulating film so that hydrogen diffuses from the first insulating film to the separation film;
   a fourth step of forming a second insulating film over the first insulating film;
   a fifth step of forming an opening in the second insulating film, the first insulating film and the separation film;
   a sixth step of forming an electrode in contact with the process substrate through the opening;
   a seventh step of forming a conductive film in contact with the electrode and forming a pixel circuit electrically connected to the conductive film;
   an eighth step of forming a display element electrically connected to the pixel circuit;
   a ninth step of stacking a second base over the second insulating film;
   a tenth step of performing separation from the process substrate; and
   an eleventh step of stacking a first base to overlap with the second base with the display element and the pixel circuit placed between the first base and the second base.

10. The method for manufacturing the display panel according to claim 9, wherein the separation film comprises an element selected from tungsten, molybdenum, titanium, tantalum, niobium, nickel, cobalt, zirconium, zinc, ruthenium, rhodium, palladium, osmium, iridium, and silicon, or an alloy including the element.

11. The method for manufacturing the display panel according to claim 9, wherein the separation film comprises a stack of a first film comprising tungsten and a second film comprising an oxide of tungsten.

12. The method for manufacturing the display panel according to claim 9, wherein the separation film comprises polyimide, polyester, polyolefin, polyamide, polycarbonate, or an acrylic resin.

13. The method for manufacturing the display panel according to claim 9, wherein the first insulating film comprises silicon, oxygen, and nitrogen.

14. The method for manufacturing the display panel according to claim 9, wherein the first insulating film comprises a hydrogen blocking layer.

15. The method for manufacturing the display panel according to claim 9, wherein the electrode comprises copper.

16. The method for manufacturing the display panel according to claim 9, further comprising in the fifth step forming a recessed portion in the process substrate overlapping with the opening.

\* \* \* \* \*